US010479707B2

(12) United States Patent
Tappen

(10) Patent No.: US 10,479,707 B2
(45) Date of Patent: Nov. 19, 2019

(54) SYSTEMS AND METHODS FOR ION SEPARATION IN AN AQUEOUS SOLUTION

(71) Applicant: John B. Tappen, Bainbridge Island, WA (US)

(72) Inventor: John B. Tappen, Bainbridge Island, WA (US)

(*) Notice: Subject to any disclaimer, the term of this patent is extended or adjusted under 35 U.S.C. 154(b) by 53 days.

(21) Appl. No.: 15/601,778

(22) Filed: May 22, 2017

(65) Prior Publication Data

US 2017/0260068 A1    Sep. 14, 2017

Related U.S. Application Data

(63) Continuation of application No. 14/724,795, filed on May 28, 2015, now Pat. No. 9,656,885.

(60) Provisional application No. 62/003,967, filed on May 28, 2014.

(51) Int. Cl.

| C02F 1/469 | (2006.01) |
|---|---|
| C02F 1/461 | (2006.01) |
| C02F 1/48 | (2006.01) |
| C02F 101/00 | (2006.01) |
| C02F 103/06 | (2006.01) |
| C02F 103/16 | (2006.01) |
| C02F 103/32 | (2006.01) |
| C02F 103/34 | (2006.01) |
| C02F 103/36 | (2006.01) |

(52) U.S. Cl.
CPC ........ *C02F 1/4691* (2013.01); *C02F 1/46109* (2013.01); *C02F 1/484* (2013.01); *C02F 2001/46152* (2013.01); *C02F 2101/006* (2013.01); *C02F 2103/06* (2013.01); *C02F 2103/16* (2013.01); *C02F 2103/32* (2013.01); *C02F 2103/343* (2013.01); *C02F 2103/346* (2013.01); *C02F 2103/365* (2013.01); *C02F 2201/46175* (2013.01)

(58) Field of Classification Search
CPC .... C02F 1/4691; C02F 1/46109; C02F 1/484; C02F 2101/006; C02F 2001/46152; C02F 2103/06; C02F 2103/16; C02F 2201/46175; C02F 2103/365; C02F 2103/346; C02F 2103/343; C02F 2103/32
See application file for complete search history.

(56) References Cited

U.S. PATENT DOCUMENTS

| 4,066,893 A | 1/1978 | Dawson |
|---|---|---|
| 5,304,302 A | 4/1994 | Bossert |
| 6,277,258 B1 | 8/2001 | Ivory et al. |
| 7,634,903 B2 | 12/2009 | Phillips |
| 9,656,885 B2 | 5/2017 | Tappen |
| 2003/0213903 A1 | 11/2003 | Ichimura et al. |
| 2004/0007452 A1 | 1/2004 | Warren et al. |
| 2014/0098919 A1* | 4/2014 | Kumakhov ............ G21K 1/087 376/199 |

FOREIGN PATENT DOCUMENTS

RU    2466940 C2 *  11/2012

* cited by examiner

*Primary Examiner* — J. Christopher Ball
(74) *Attorney, Agent, or Firm* — David B. Tingey; Bryant J. Keller; Kirton McConkie

(57) ABSTRACT

Systems and methods for providing a deionization chamber having a plurality of electrodes corresponding to a plurality of register levels thereby forming a gradient of electrical amplitudes and frequencies within the deionization chamber.

19 Claims, 43 Drawing Sheets

| Step # | R0 | R1 | R2 | R3 | R4 | R5 |
|---|---|---|---|---|---|---|
| 0 | 1.5 | -6.1 | 3.1 | 30.7 | -47.6 | -153.6 |
| 1 | 1.5 | -4.6 | -3.1 | 33.8 | -16.9 | -201.2 |
| 2 | 1.5 | -3.1 | -7.7 | 30.7 | 16.9 | -218.1 |
| 3 | 1.5 | -1.5 | -10.8 | 23.0 | 47.6 | -201.2 |
| 4 | 1.5 | 0 | -12.3 | 12.3 | 70.7 | -153.6 |
| 5 | 1.5 | 1.5 | -12.3 | 0.0 | 82.9 | -82.9 |
| 6 | 1.5 | 3.1 | -10.8 | -12.3 | 82.9 | 0.0 |
| 7 | 1.5 | 4.6 | -7.7 | -23.0 | 70.7 | 82.9 |
| 8 | -1.5 | 6.1 | -3.1 | -30.7 | 47.6 | 153.6 |
| 9 | -1.5 | 4.6 | 3.1 | -33.8 | 16.9 | 201.2 |
| 14 | -1.5 | 3.1 | 7.7 | -34.7 | -16.9 | 218.1 |
| 11 | -1.5 | 1.5 | 10.8 | -23.0 | -47.6 | 201.2 |
| 12 | -1.5 | 0 | 12.3 | -12.3 | -70.7 | 153.6 |
| 13 | -1.5 | -1.5 | 12.3 | 0.0 | -82.9 | 82.9 |
| 14 | -1.5 | -3.1 | 10.8 | 12.3 | -82.9 | 0.0 |
| 15 | -1.5 | -4.6 | 7.7 | 23.0 | -70.7 | -82.9 |
| 16 | 1.5 | -6.1 | 3.1 | 30.7 | -47.6 | -153.6 |

Figure 3

SYSTEMS AND METHODS FOR ION SEPARATION IN AN AQUEOUS SOLUTION

RELATED APPLICATIONS

This is a continuation of U.S. Utility patent application Ser. No. 14/724,795, filed May 28, 2015, entitled "SYSTEMS AND METHODS FOR ION SEPARATION IN AN AQUEOUS SOLUTION," which claims priority to U.S. Provisional Patent Application Ser. No. 62/003,967, entitled "SYSTEMS AND METHODS FOR ION SEPARATION IN AN AQUEOUS SOLUTION," filed May 28, 2014; the entire disclosures of which are each expressly incorporated herein by reference.

BACKGROUND OF THE INVENTION

Field of the Invention

The present invention relates generally to systems and methods for ion separation in an aqueous solution. In particular, the present invention relates to systems and methods for using electrical forces to remove impurities from an aqueous solution.

Background Information

Ion-exchange is an exchange of ions between two electrolytes or between an electrolyte solution and a complex. The term is commonly used to denote the processes of purification, separation, and decontamination of aqueous and other ion-containing solutions with solid polymeric or mineralic 'ion-exchangers'.

Typical ion-exchangers are ion-exchange resins (functionalized porous or polymer), zeolites, montmorillonite, clay, and soil humus. Ion-exchangers are either cation exchangers that exchange positively charged ions (cations) or anion exchangers that exchange negatively charged ions (anions). There are also amphoteric exchangers that are able to exchange both cations and anions simultaneously. However, the simultaneous exchange of cations and anions can be more efficiently performed in mixed beds that contain a mixture of anion and cation exchange resins, or by passing the treated solution through several different ion-exchange materials.

Ion-exchangers can be unselective or have binding preferences for certain ions or classes of ions, depending on their chemical structure. This may be dependent on the size of the ions, their charge, or their structure. Typical examples of ions that can bind to ion-exchangers are $H+$ (proton) and $OH-$ (hydroxide), single-charged monatomic ions like $Na+$, $K+$, and $Cl+$, double-charged monatomic ions like $Ca2+$ and $Mg2+$, polyatomic inorganic ions like $SO4 2-$ and $PO4 3-$, organic bases, usually molecules containing the amino functional group $-NR2H+$, organic acids, often molecules containing $-COO-$(carboxylic acid) functional groups, and biomolecules that are capable of ionization, such as amino acids, peptides and proteins.

Ion-exchange is widely used in the food & beverage, hydrometallurgical, metals finishing, chemical & petrochemical, pharmaceutical, sugar & sweeteners, ground & potable water, nuclear, softening & industrial water, semiconductor, power, and a host of other industries. For example, ion separation is commonly used to prepare high purity water for power engineering, electronic and nuclear industries. Ion-exchange is a method widely used in household (laundry detergents and water filters) to produce soft water. This is accomplished by exchanging calcium $Ca2+$ and magnesium $Mg2+$ cations against $Na+$ or $H+$ cations.

Industrial and analytical chromatography is a further area where ion-exchange is used. Ion-exchange chromatography is a chromatographical method that is widely used for chemical analysis and separation of ions. For example, in biochemistry it is widely used to separate charged molecules such as proteins. An important area of the application is extraction and purification of biologically produced substances such as proteins (amino acids) and DNA/RNA. Ion-exchange processes are also used to separate and purify metals, including separating uranium from plutonium and other actinides, including thorium, and lanthanum, neodymium, ytterbium, samarium, lutetium, from each other and the other lanthanides.

The ion-exchange process generally requires that the desired ligand or constituent be bound to an ion-exchange resin or gel which may result in the ligand undergoing an undesirable physical transformation. For example, when using ion-exchangers to separate proteins, the proteins are often required to partially unfold or denature upon binding with the ion-exchange material. Binding between the ligand and the ion-exchange material further requires that the ligand be partially removed from its aqueous environment. Once eluted from the ion-exchange material, the protein must refold. It is uncertain whether the ligand will refold correctly upon being eluted.

Thus, although methods currently exist for separating ions from aqueous solutions, challenges still exist. Accordingly, it would be an improvement in the art to augment or even replace current techniques with other techniques.

SUMMARY OF THE INVENTION

The present invention relates generally to systems and methods for ion separation in an aqueous solution. In particular, the present invention relates to systems and methods for using electrical forces to remove impurities from an aqueous solution.

Dissociating dissolved salts from water is complex. The indifferent success of typical, low-velocity, ion-entrapment schemes is hardly a cause for amazement. Such methods embrace inherent sequential limitations in decelerating, rather than accelerating particle residues. Each particle in such methods is separated later than the particle in front of it. Further, the methods provide insufficient space to negotiate between necessary, opposing activities—sorting metallic from nonmetallic ions, or, collecting residues instead of purging. One sequential process is capacitive deionization (CDI). It is a single layer, electrode method of removing ions. Multiple electrode layers can make physical space in this process to process in parallel, instead of serially, at every point of a wave bed.

Implementations of the present invention embrace packetizing, sorting and disposal of ions in a sinusoidal network of finite differences. Ions are directed, charged particles with electrical properties. Parallel processing can compound acceleration to produce exponential results. The exponential rate exceeds every other algebraic processing rate, including sequential. The finite differences method structures polarized deionizing, just as a matrix structures a sheaf of multiplications and additions. Serial ion separation models have bypassed the compounding operation. Finite differences embrace linear compounding as part of exponential deionizing. A sinusoidal waveform negotiates between necessary, contending exponential processes. What is sure is that when an ion gun performs, it succeeds in a network;

likewise, if the gun does not perform, it will fail in a network. The sinusoid pattern of finite differences provides a networked, solution for this practical problem. Laws of thermodynamics indicate that it is far easier to extract metallic ions from seawater using finite differences, than to wrest those ions forcibly from their chemical bonds. Sodium fuel compares to carbon as an arc lamp compares to a candle. Accordingly, a new fuel can be produced electrically, without paying an energy debt from the second law. The difference in power from combustion less production is practically like getting something for nothing, as in a dream of powered flight. One beneficent side effect of sodium extraction is the ability to purge unprecipitated mineral salts from the filter output. However, the main contribution is a significant output of purified water. The combustion products are practically pollution-free, and are far more disposable than those of carbon fuels. Such are reasons enough to implement this method above, and in comparison to, any of the other current desalinization methods.

At least some implementations of the present invention comprise a deionization chamber which includes a plurality of electrodes which are operably coupled to a computer device or system. The computer device further includes a computer-executable software program and hardware configured to apply alternating electrical currents to each node of a three dimensional array. Each node is held at an electrical potential dictated by a table of sinusoids in forward, finite differences. The table is generated by the computer program and software. The computer device further includes hardware configured to supply each node with alternating current at that assigned potential, such that the plurality of nodes forms a gradient of electrical currents along the length of the deionization chamber. The frequency and phase of the alternating current is also assigned by the computer program.

A method using forward finite difference equations is capable of approximating a polynomial evaluated at equal intervals of its independent variable. An alternating sequence of constant values, applied to the difference equations, produces an approximation of a sinusoid. Selecting appropriate values for initializing the difference equations and for their input sequence determine the sinusoidal waveform's amplitude, frequency and phase. An algorithm to simulate these sinusoids using difference equations is available. Accordingly, systems and methods of the present invention are used to digitally synthesize approximated sine waves when amplitudes and number of data points are known.

Some implementations of the present invention further include valves to remove concentrated mineral residues, as well as deionized water within the deionization chamber. Some implementations further include systems and methods based upon the dissociation and reuniting of ions in a solution, wherein the process of ion separation is accomplished based upon the methods and teachings of embodiments of the present invention.

These and other features and advantages of embodiments of the present invention will be set forth or will become more fully apparent in the description that follows. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 3 shows a representative forward finite differences table in accordance with an embodiment of the present invention;

DETAILED DESCRIPTION OF THE INVENTION

The present invention relates generally to systems and methods for ion separation in an aqueous solution. In particular, the present invention relates to systems and methods for using electrical forces to remove impurities from an aqueous solution.

The present invention may be embodied in forms besides the specific embodiments presented here without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

To better set forth the concepts and scope of the described systems and methods, the following more detailed description is separated into four sections. The first section pertains to a representative computer system for use in association with embodiments of the present invention. The second section pertains to systems and methods for ion separation. The third section pertains to additional systems and methods for ion separation. The fourth section pertains to a technical discussion. Although the described systems and methods utilize one or more components of some embodiments of the described systems, other components, embodiments, methods, intended uses, etc., are contemplated and intended to be within the scope of the described systems and methods.

Representative Computer System Configuration

Figure 1:
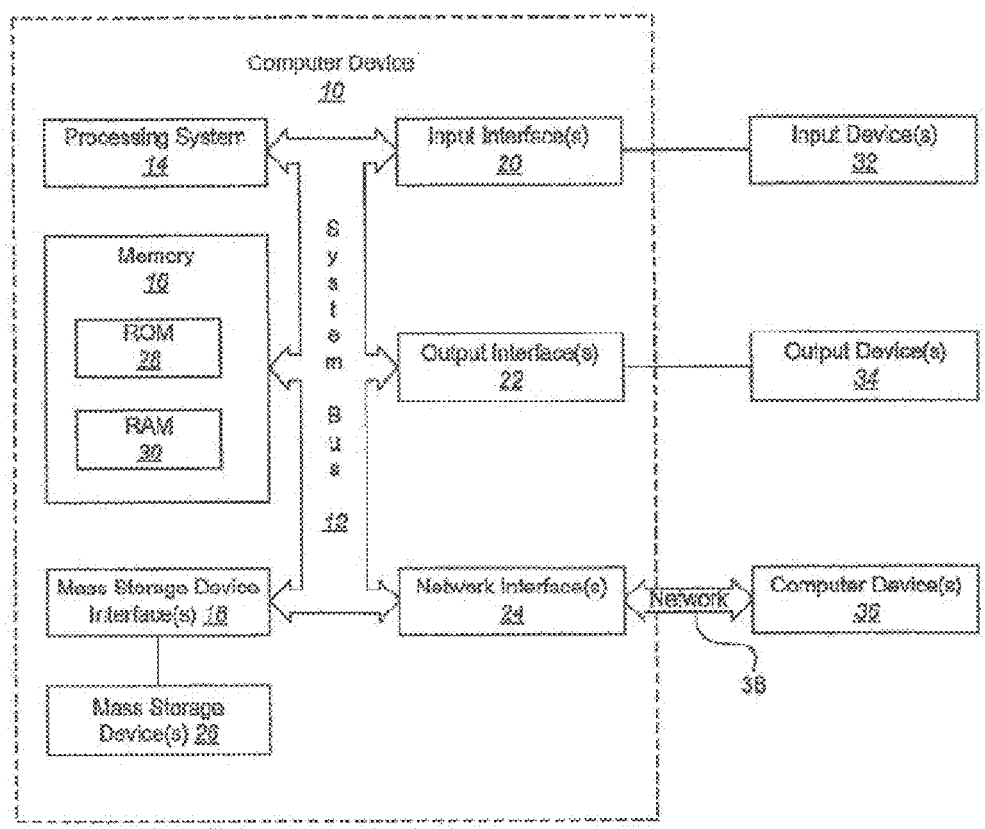
FIG. 1 shows a flow chart of a representative system that provides a suitable operating environment in which various embodiments of the present invention may be implemented.
Figure 2:
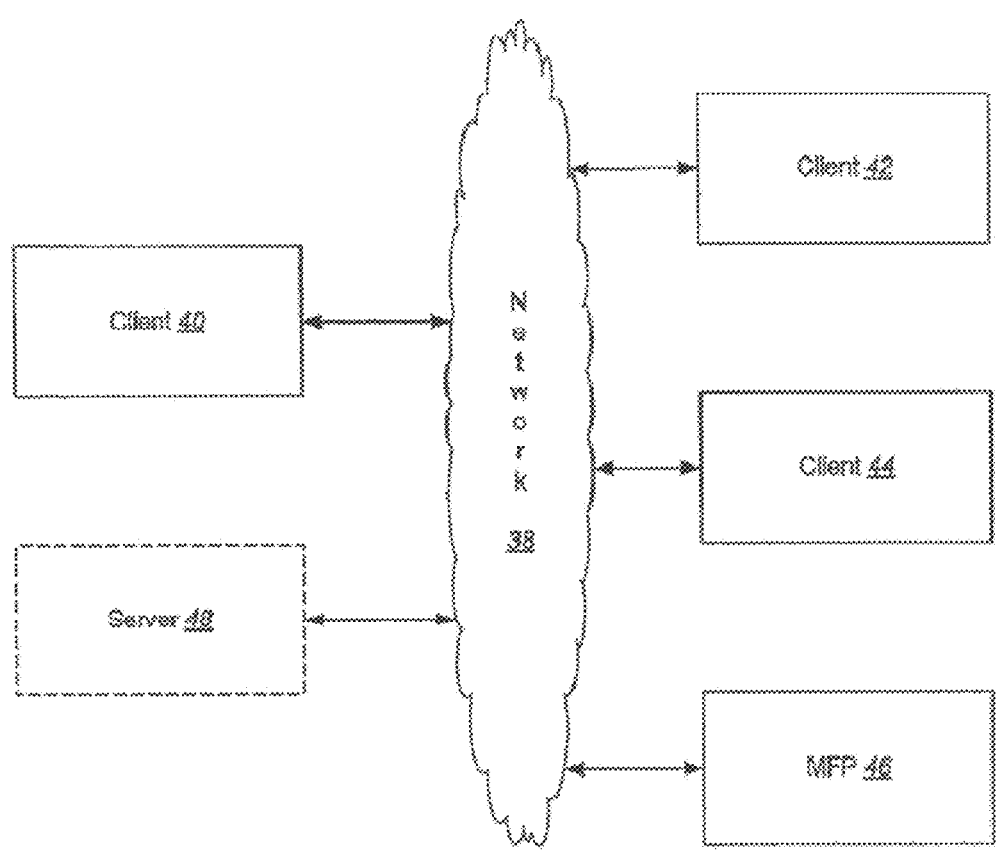
FIG. 2 shows a flow chart of a representative networking system that provides a suitable environment in which various embodiments of the present invention may be implemented.

Referring now to FIG. 1 and FIG. 2 and the corresponding discussion, which is intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), standalone electronic devices, and other such electronic environments.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, a smart phone, a position identifier, a ball collector, or the like.

Computer device 10 may include a system bus 12, may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, thumb drives, solid state memory, a universal serial bus or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, thumb drive tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Systems and Methods for Ion Separation

As provided herein, embodiments of the present invention relate generally to systems and methods for ion separation in an aqueous solution. In particular, embodiments of the present invention relate to systems and methods for using electrical forces to remove impurities from an aqueous solution.

Some implementations of the present invention comprise a deionization chamber which includes a plurality of electrodes which are operably coupled to the computer device. The computer device further includes a computer-executable software program and hardware configured to apply alternating electrical currents to each node of a three dimensional array. Each node is held at an electrical potential dictated by a table of sinusoids in forward, finite differences. The table is generated by the computer program and software. The computer device further includes hardware configured to supply each node with alternating current at that assigned potential, such that the plurality of nodes forms a gradient of electrical currents along the length of the deionization chamber. The frequency and phase of the alternating current is also assigned by the computer program.

A method using forward finite difference equations is capable of approximating a polynomial evaluated at equal intervals of its independent variable. An alternating sequence of constant values, applied to the difference equations, produces an approximation of a sinusoid. Selecting appropriate values for initializing the difference equations and for their input sequence determine the sinusoidal waveform's amplitude, frequency and phase. An algorithm to simulate these sinusoids using difference equations is available. Accordingly, systems and methods of the present invention are used to digitally synthesize approximated sine waves when amplitudes and number of data points are known.

The computer device further includes hardware configured to supply each node with alternating current at that assigned potential, such that the plurality of nodes forms a gradient of electrical currents along the length of the deionization chamber. The frequency and phase of the alternating current are used to digitally synthesize approximated sine waves when amplitudes and number of data points are known.

When an alternating sequence of constant values and appropriate initial values are presented to a system of linear difference equations, sinusoids approximations may be generated in a table of forward finite differences (FFD) These sinusoids are expressed in terms of registers, and register levels. A table of forward, finite differences levels is a table with multiple register levels. Each register level of forward finite difference expressions compounds a lower register level.

The tabled points of forward finite differences differ from points upon a geographic map, as follows: Intervals between points on a path of a map are summed to a distance between origin and destination points. On a finite differences table, point values of table entries on a path are summed to the value of the destination point. Data points are ordered in steps along a path and numbered in register layers, (R0 . . . R5, for example), in a second dimension. The value of an element at a step and of a register layer is the sum of values on a path beginning at an element in a lower register layer. A sample forward finite differences table having 16 steps, 5 levels and 80 entries is shown in FIG. 3.

Figure 4:
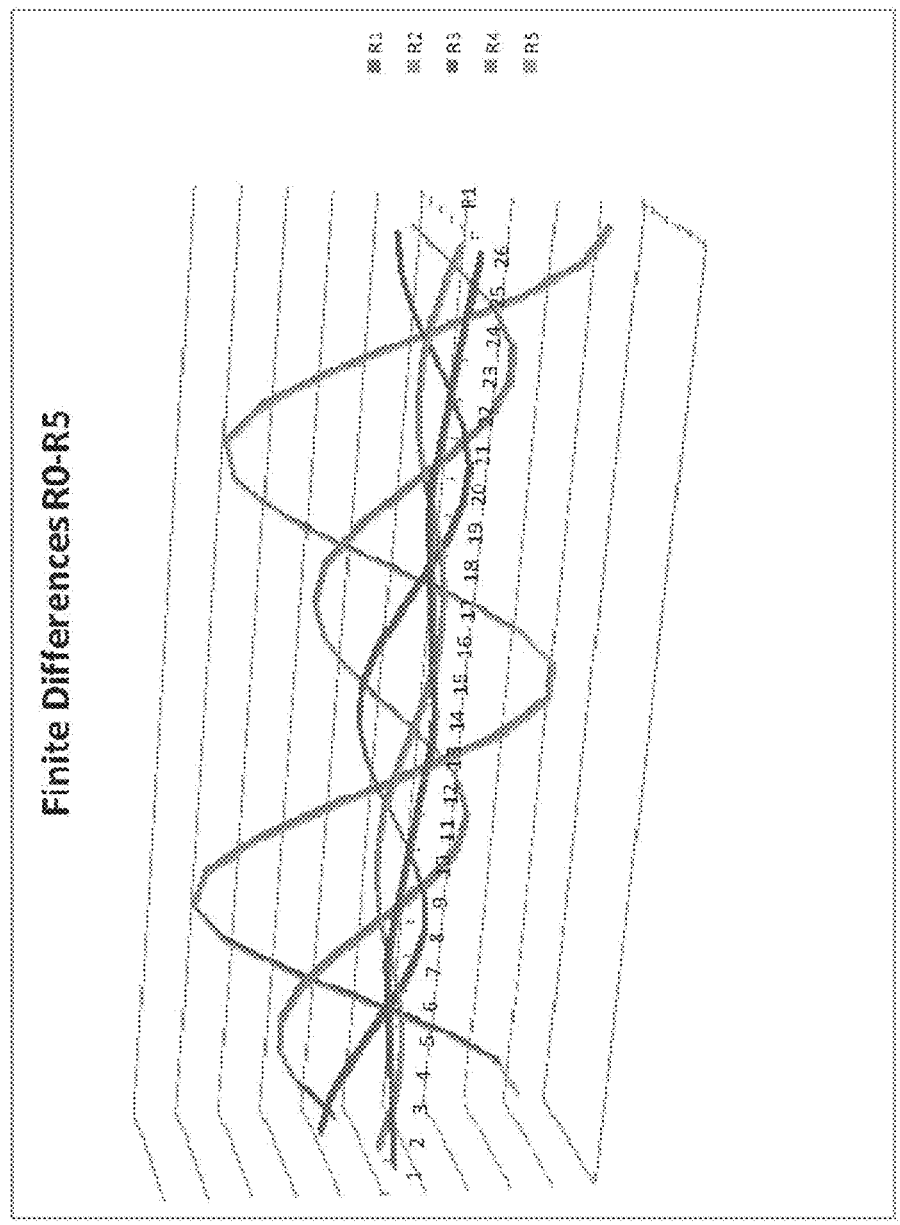
FIG. 4 shows a representative cosine table in accordance with an embodiment of the present invention.

Linear compounding in a finite differences table produces exponential growth. The numeric proportions between lowest and highest register layers are shown in the sample of a cosine table provided as FIG. 4.

Selecting values for initializing the difference equations and their alternating, input sequence determine the sinusoidal waveform's amplitude, frequency and phase.

The sine-cosine relationships place the maximum or minimum value in one layer adjacent to the zero point of an adjacent layer, so that phase points in adjacent layers are offset from each other by half a half-cycle.

Particles receive accelerations on every possible path from lowest to highest layer. A physical network of nodes fashioned according to the forward finite differences method, enforces particle motions. A network extends the influence of a single node element to an entire array, just as a matrix organizes multiplications and additions into a linear transformation.

An ion accelerator, termed, an ion gun, is a combination of an electret and two electromagnets. An electret is composed of adjacent wires, oppositely polarized. An electret is the source of an electrostatic field. An electromagnet has a hollow core, around which the spool of wire provides an electromagnetic field. Electrons move across the magnetic lines of force inside the electromagnet, on bridges, or chain of ions. Such chains are built by an electret within its electrostatic field. These chains behave as wires. Ions move as wires, pulled or pushed by the electromagnets.

An ion gun enables (i) attraction into an electromagnetic core, (ii) passage through an electret, (iii) generation of new transverse ion chains, and (iv) repulsion out of the ion gun. Polarities of the two electromagnet components are aligned in the same direction. The electromagnets move ions of both polarities outward, through the electromagnet hollow cores. An ion gun is diagrammed below. Arrows in the diagram represent one type of electrical and magnetic polarity of an ion. Ions of opposing polarities travel in opposite directions.

Figure 5:
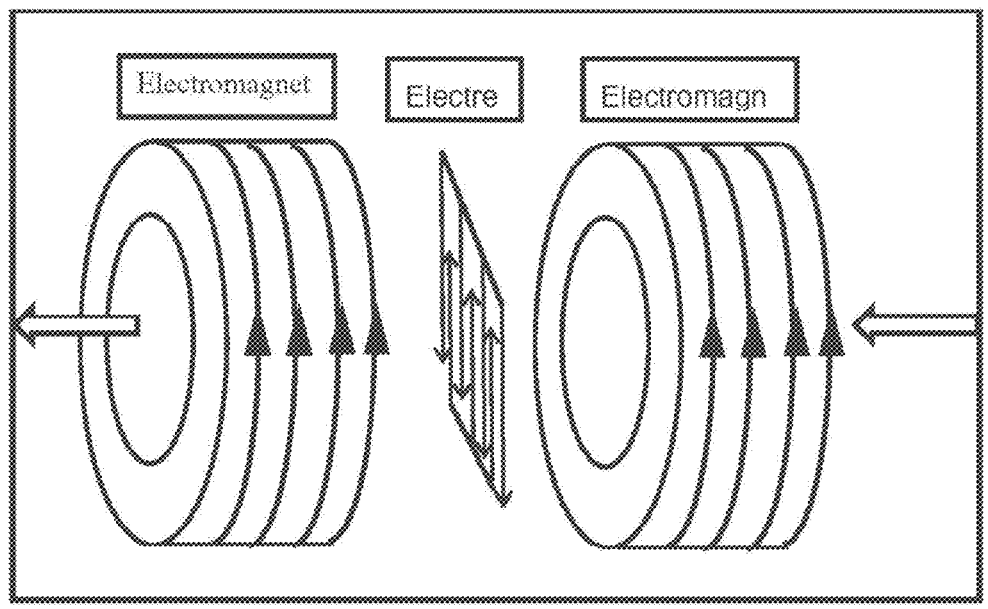
FIG. 5 shows a representative ion gun in accordance with an embodiment of the present invention.

The power requirement for an ion gun is an alternating sinusoidal current, biased with direct current. The frequency of power pulses is determined by the ion travel distance through one of the two electromagnets of the ion gun. Potential applied to the components of the ion gun ranges between zero and the maximum DC voltage for that particular component. The maximum DC voltage for an electret is that for which water electrolysis is initiated. Electrolysis indicates that the outward, longitudinal movement of ions into the electromagnets has been overpowered by transverse formation of ion chains by the electret. The maximum DC voltage for an electromagnet is its current-carrying capacity. Thus, a delicate balance is preserved between the sinusoidal pulses applied to both electromagnets and electret. Reference is made to FIG. 5, which provides a diagram of a representative ion gun.

Sinusoidal pulses are applied to components of the ion gun. The timing of a pulse is synchronized to the speed of ions, so that the time of a pulse is the same time required for an ion chain to travel from out the electret to beyond the boundary of influence of the electromagnet. This timing establishes a resonant frequency of an ion wave. It is determined by experiment and negotiation between the behaviors of ions in solution.

Ion guns are mounted within cubicles, one gun for each dimension of height, width, and depth. Cubicles provide the mechanical mounting and insulation for these guns. A cubicle is the basis of a network within an electromagnetic finite differences force field.

Figure 6:
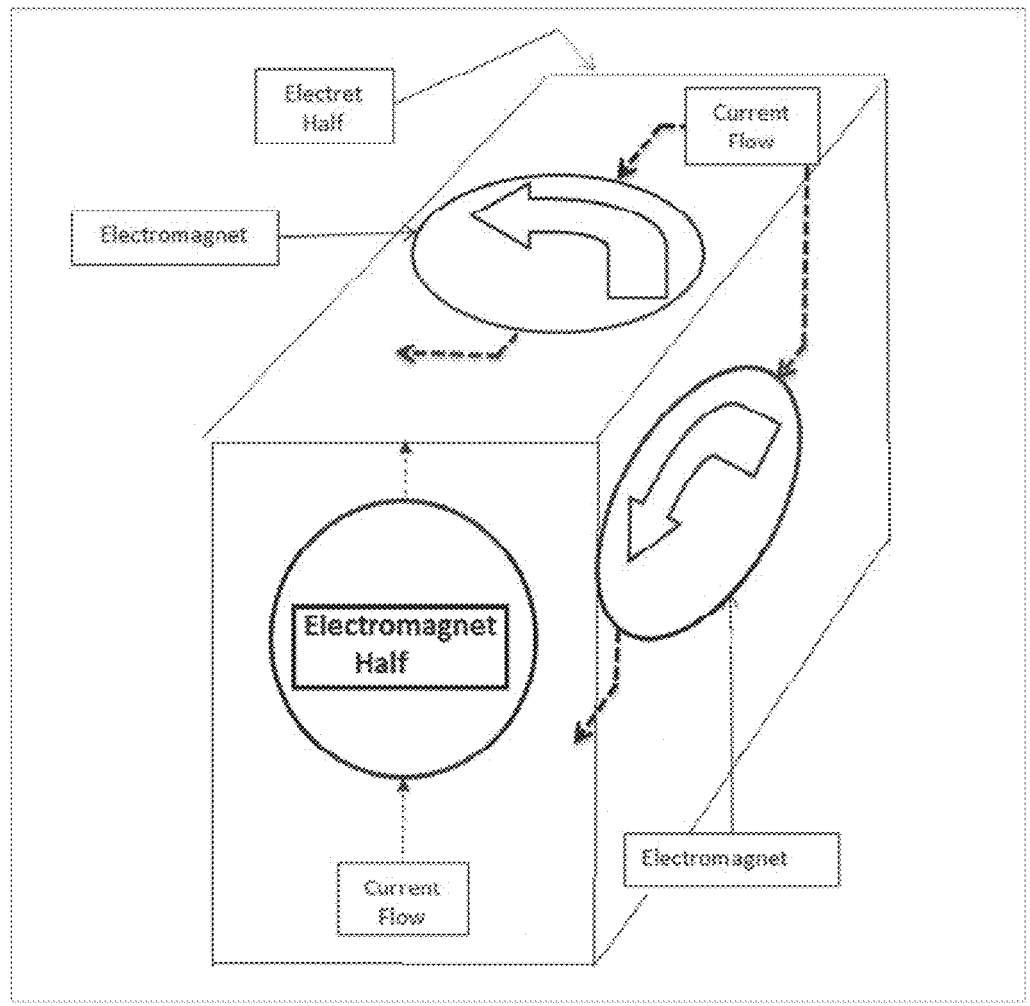
FIG. 6 shows a representative cubicle with three ion guns in accordance with an embodiment of the present invention.

FIG. 6 illustrates a representative cubicle with three ion guns. In FIG. 6, three ion guns, comprised of electret/electromagnet combinations, are mounted on three of six sides of a cubicle: roof, front door, and one side wall. Adjoining cubicles support ion flow at floor, back door and the other side wall. Ions enter in through the floor, door or one side of each cubicle and leave, with phased acceleration, through the roof, door or other side. The electrical and magnetic potentials of each ion gun in a cubicle are assigned by a finite differences table for that dimension. Impervious boards form ceilings and walls for mechanical mounting and insulation for these guns. Three network elements fill a cubicle with their finite differences force fields.

Ion guns work inside of cubicles as follows. A flow of charge commences between the wires of an electret. A charge path within an electret simulates a physical wire. This simulated wire moves through the electromagnet cores of the ion gun, out from cubicle into another. Cubicle openings are at tops, bottoms, and ends of the cubicle. Thus ion movement is initiated by electrostatic forces and accelerated onward and upward by electromagnetic forces. Movement between electrostatic and electromagnetic polarities is synchronized by the resonant frequency of the applied potentials. Pulses commence and continue the aggregated ion movement, up and out (two lateral directions) for metallic, or correspondingly down and out for non-metallic ions. Ions are sorted by their accelerations and directed by the mesh of finite differences nodes.

Several multi-level network of cubicles accelerates particles within a three-dimensional, sinusoidal force field in patterns of forward finite differences. The cubicles of each network are fastened upon impervious, insulating boards which are suspended in parallel in a cylinder. A separate finite differences table dictates the electrical potentials for a network. For each dimension, there is another network. For n number of boards there are n3 separate networks and finite difference tables.

Figure 7:
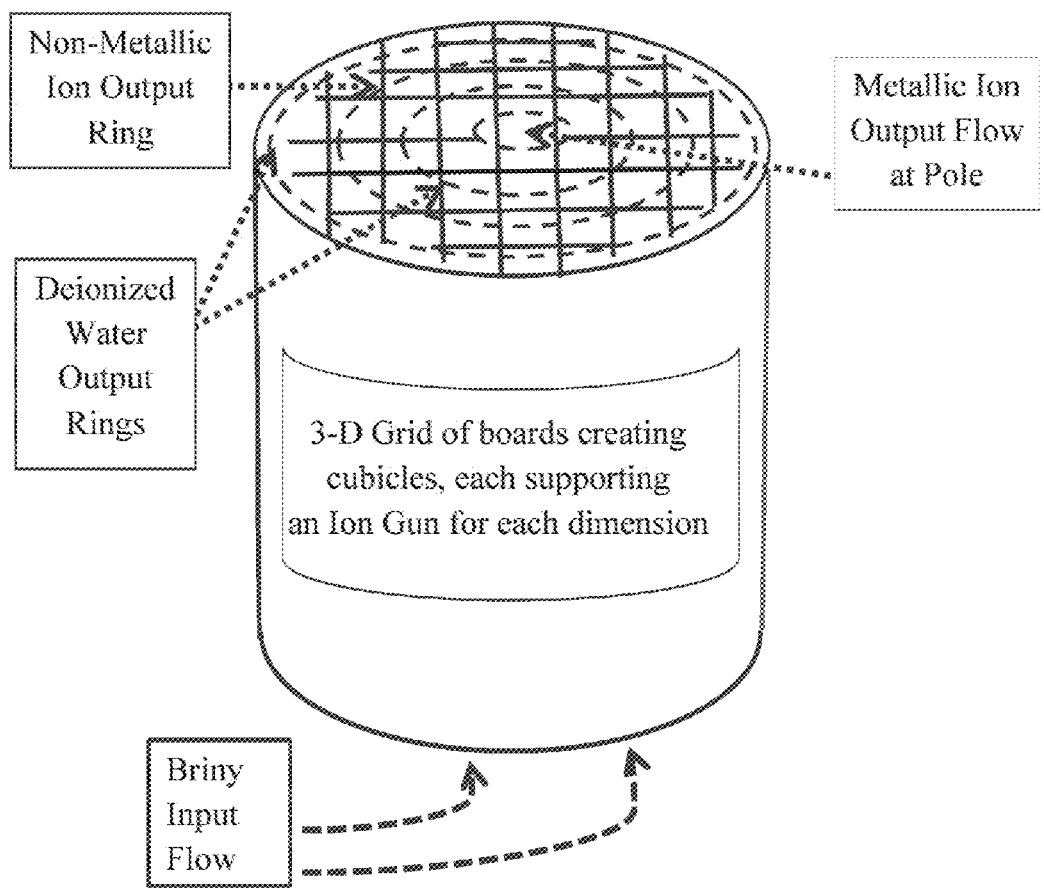
FIG. 7 shows a diagram of mounting boards inside the cylinder in accordance with an embodiment of the present invention.

The physical appearance of this device is a cylinder. Within the cylinder are the boards mounting the cubicles. With reference to FIG. 7, a diagram of the mounting boards inside the cylinder shows the planar input port for brine and ringed output ports for deionized water, metallic ions and non-metallic ions.

Figure 8:
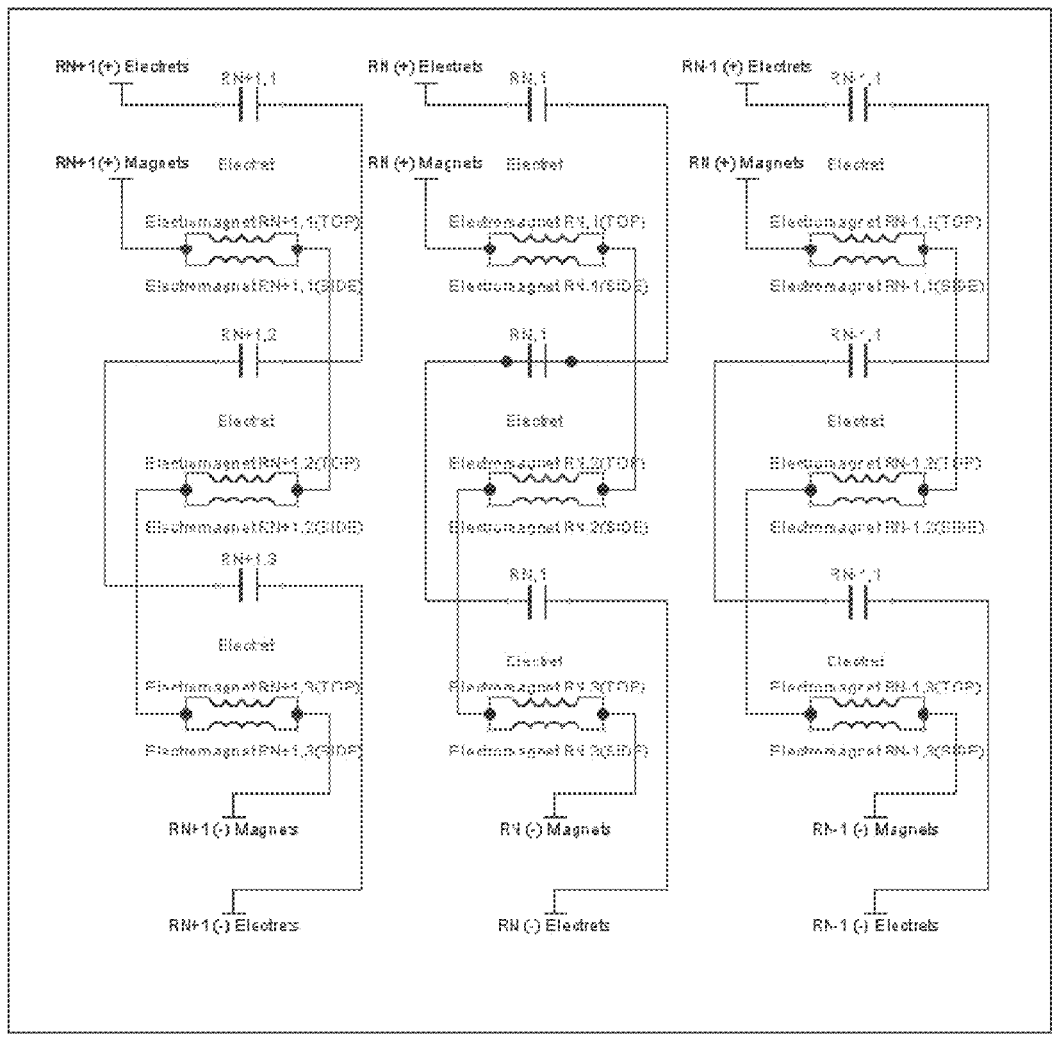
FIG. 8 shows a representative diagram in accordance with an embodiment of the present invention.

After calculating electrical impedances of each component of every ion gun, the networks are wired according to the representative diagram illustrated in FIG. 8.

Electromagnets are wired in parallel to assure current flow and electrets are wired in series to assure proportional voltage potential.

Figure 9A:
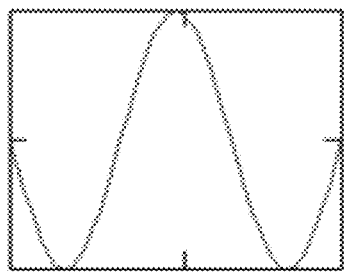
FIGS. 9A-9B respectively show a representative illustration of a height profile and a representative illustration of a length and depth profile.
Figure 9B:
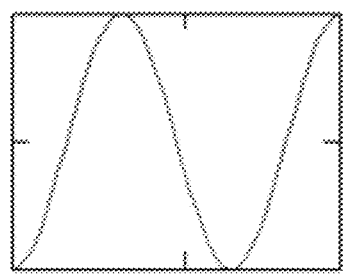

Spacing of cubicles is determined from spacing d between them and radius R of the cylinder. Unit angle $\varnothing = \sin^{-1}(d/R)$ and number n steps per table is $$n = R * \frac{\cos(d)}{d}$$

to assure equidistant spacing among cubicles. Equidistant cubicle spacing and finite difference tables per number of steps allow finite difference tables to be chosen for each network and for all dimensions The electrical profile of a cubicle shows that each ion gun is part of a separate network for each dimension. With reference now to FIGS. 9A and 9B, height has the profile on the left and length and depth the one on the right.

Width and depth dimensions share the same cosine waveform, from 0 to 3 pi radians. Height dimension uses a sine waveform from 0 to 3 pi radians.

Figure 10:
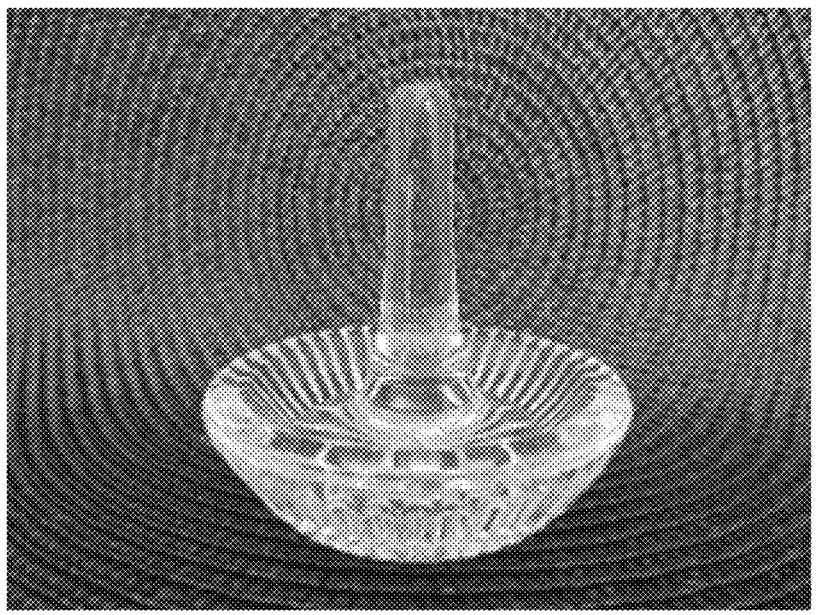
FIG. 10 shows a three dimensional electrical sinusoid profile in accordance with an embodiment of the present invention.

The two electrical cosine patterns for length and depth dimensions complement the electrical sine pattern for the height dimension. Ions of each polarity exit ports at maxima and minima of a three-dimensional sinusoid. The three dimensional electrical profile of that sinusoid is provided in FIG. 10.

Paths of ions accelerated by ion guns extend from the lowest register layer at the bottom of the cylinder to electrical sinusoidal maxima or minima the highest register layer at the top of the cylinder. Ion guns at the resonant frequency forge ion trajectories of separate polarity through cubicles of the networks. Output ports are rings, centered around the cylinder axis. Metallic ion flow exits at the port overlaying this axis.

Forward finite differences allow the smoothest possible integration of cubicles into a network. The finite differences network supplies power to ion guns. Each gun exerts proportional force in every cubicle and affects every other cubicle proportionally. The finite differences mesh eliminates singularities; because each node of the web "pulls its own weight and contributes its own influence without arrogating or subverting the influence of any other node. Gradual gradient changes within the mesh purge cubicles of ions while filling cubicles with oppositely polarized ions.

Proximity to an ion gun, affinity to other particles, and ion polarity force particles to move. Potentials in outer register layers dominate those of inner layers, because finite differences dictate that the difference of forces at a point of a higher layer matches the force applied to that point at a lower layer. Particles must move to the right and up, or to the left and up. The register layers of the FFD method implement a progressive particle circulation from binary-valued base potentials towards the potentials of an outer sinusoid waveform. Particles accelerate toward attracting neighbor nodes and away from repelling neighbor nodes. Finite difference forces within register layers cause the particles to disperse into sinusoidal concentrations.

Capacitive deionization technology (CDI) has one layer of electrodes (two rows of electrodes with opposing charges); or at least, having only one voltage potential between sets of electrodes. CDI technology entraps ions skimming past surfaces of oppositely charged plates. CDI technology differs from mechanical ion exchange methods using resins and aqueous hydrolysis. Typically speaking, mechanisms such as, ion exchange columns rely on means other than electricity to separate ions.

Figure 11:
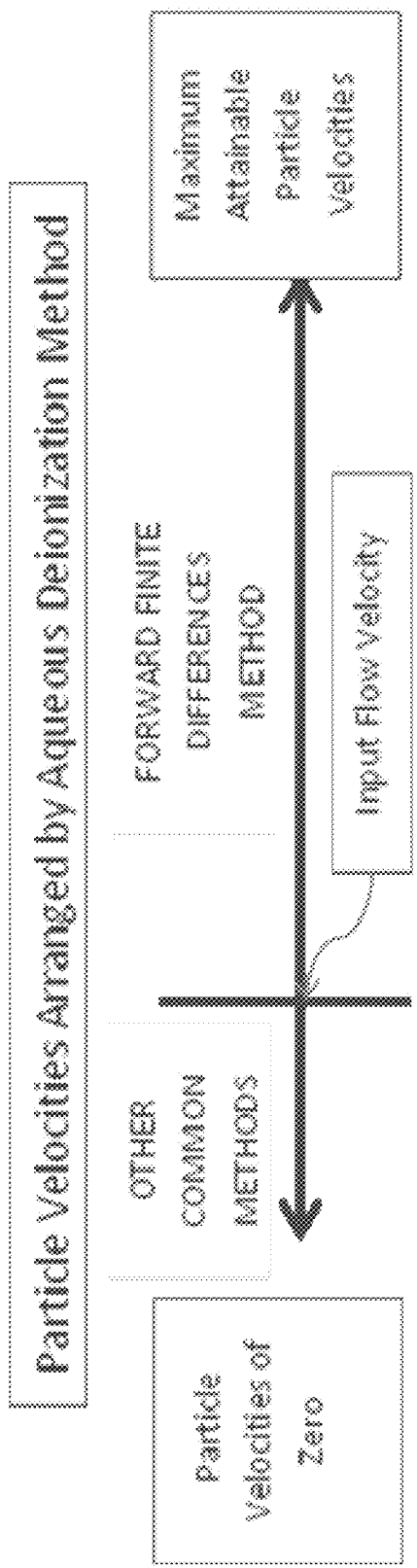
FIG. 11 shows a representative diagram in accordance with an embodiment of the present invention.

Embodiments of the present invention employ the forward finite differences method (FFD). The inherent advantages of the FFD method suggest that it is a preferred alternative to capacitive deionization. Most conventional deionization methods are low-velocity, ion entrapment schemes. These non-FFD methods rely on reducing the time derivatives of particle motion to zero; in particular, the acceleration and velocity of residue ions. These exhibit linear decelerations, contrasted the possibility of exponential accelerations of the FFD method. Electrically increasing the derivatives of particle motion opens a way to increase particle motion positively over a much larger interval of numbers; namely, that interval between derivatives of entering particles and the physically possible maxima of those derivatives That possibility is diagrammed in FIG. 11.

Capacitive deionization (CDI) is a single layer, electrode method of moving ions. CDI technology is confined to being sequential; ions are separated each one following another. Other deionization methods are, likewise, sequential processes. No particle in these processes can be separated before separating the particle in front of it. The FFD method improves CDI single layer technology by adding multiple layers. Ion separation can then be done in parallel. Parallel processing automatically opens the possibility of compounding the acceleration of every particle simultaneously, in the fashion of compounding monetary interest. The FFD method is the only parallel process which incorporates compounding to produce exponential results. Mathematically speaking, the rate of exponential processing exceeds in magnitude each and every other algebraic rate, including sequential processing.

CDI particle accretion and flushing are contending processes. Ions adhere to the electrodes, in effect, shielding those electrodes from electrostatic influence. Electrical or mechanical purging of a set of electrodes is necessary to enable subsequent accretion. Ion accretion requires systemic reversals, interrupting the accumulating to purge the electrodes. Ion collection and purging mechanisms are incompatible opposites. Termination and reversal of these processes requires significant temporal overhead. The FFD method discards ion collecting on electrodes in favor of accelerating ion flow out of the device.

Ion separation should be done as smoothly as possible in order to minimize the work done. The sinusoidal waveform produced by the FFD method is the least turbulent model to apply to a multilevel, multi-electrode CDI system. A sinusoidal wave approximation is the "smoothest" fit (based upon the fact that a circle is the smoothest of all polygons). Sinusoidal waves separate positive from negative ions in the most efficient manner. A sinusoid overlaps contending processes such as final residue collection and purging, into a continuous process.

The FFD method provides physical spaces for ion acceleration. Conventional CDI methods cannot provide enough of this kind of space. If there were layers of multiple electrodes, adequate space for collaborative processes could be discovered between innermost and outermost layers. Space could also be found between the poles of differing polarities. Confining water purification to single levels and reversible processes contrasts with the FFD method, which provides multiple accelerations at multiple sinusoidal charge levels.

Sinusoidal pulses induce simple, harmonic motion of ions in a resonant, wavelike manner. Wave motion originates from alternating build-ups and build-downs of alternate electrical and magnetic fields. Every particle (of either polarity) moves one step towards some local finite differences zenith (or away from a nadir), regardless of its present position.

Embodiments of the present invention produce streams of metallic and non-metallic ions. The cylindrical geometry opens two collection ports for deionized water, and one port each for metallic and non-metallic ions. In the special case of seawater (brine), the metallic ion output is a fast-moving concentrate at the cylinder axis and a chlorine-oxygen gas mixture in an outer ring. Post-processing of these output products is done by neutralizing the charges of the ions with external, oppositely charged electrodes. Non-metallic ions are converted into chemical oxidizing agents. Metallic ions unite their own charges, with externally applied current on electrodes, to electroplate them into solid and portable forms for disposal.

The metallic ion stream proceeds (without chemical interference from the external environment) toward a charged electrode for electroplating. This electrode is bathed in a chemically inert environment. In the case of sodium, metallic ions accrete, layer by layer, successively and methodically. The high conductivity of sodium minimizes the exponential decay of the electroplating process. Anhydrous mineral oil or kerosene serves as a fluid medium surrounding the electroplating anode, to eliminate bonding with water. The high speed of the charged ion prevents interaction of sodium with water, in favor of collision with the charged deionizing anode. When full collecting capacity has been reached, electroplated sodium is removed, and oil residue is separated, cleaned and dried for subsequent recirculation. Complete evacuation of air from an electroplating deionizer plate allows subsequent, safe handling of this highly reactive material. It is economically worthwhile to retrieve sodium by electricity, because a fundamental portion of electroplating charge is carried by the ions themselves.

Figure 12:
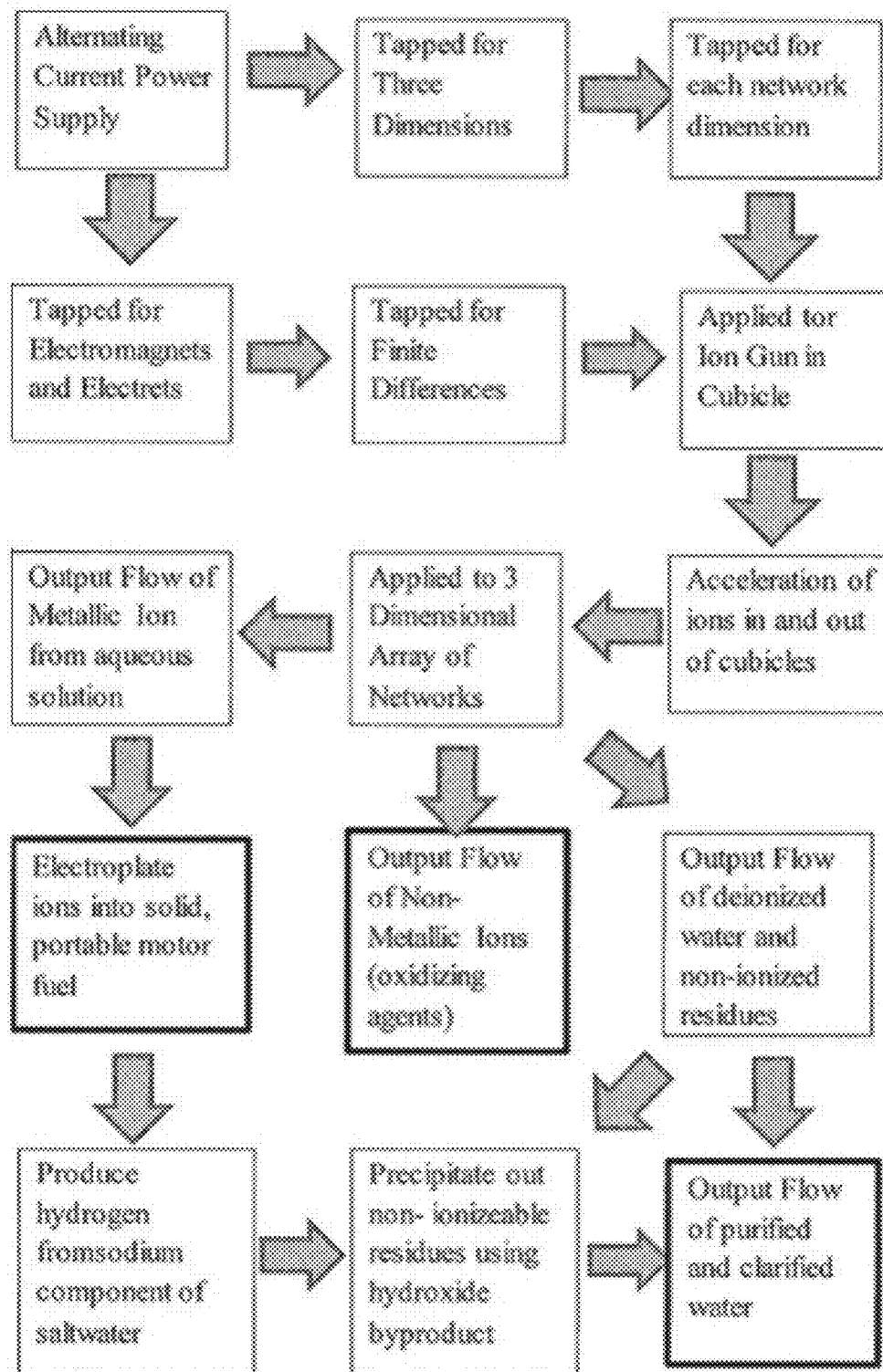
FIG. 12 shows an illustrated chart in accordance with an embodiment of the present invention.

A portion of the sodium product of electroplating can be allocated to reducing un-ionizable residues in the deionized output stream. A typical process like this is exploited in commercially available water softeners. With reference to FIG. 12, the illustrated chart diagrams the functionality of embodiments of the present invention, and these post-processing components.

Additional Systems and Methods for Ion Separation

Various embodiments of the present invention may be utilized to selectively remove ions from an aqueous solution. In some embodiments, an electrical force in the form of various sine waves having various magnitudes is applied to an aqueous solution to produce pockets of localized charges within the aqueous solution. The pockets of localized charges are then used to attractions within the aqueous solution having opposite charges. Further, in some embodiments an electrical force is applied to an aqueous solution in the form of a sine wave to provide pockets of localized charges around the perimeter of the aqueous solution, whereby charged particles or ions within the aqueous solution are attracted to the pockets of localized charges. As such, the center point of the aqueous solution is purified or deionized.

Some implementations of the presentation comprise systems and methods for isolating ions and other charged constituents within an aqueous solution. In general, the systems and methods of the present invention utilize electrical currents applied to an aqueous solution in the form of one or more electrical circuits. In some instances, the one or more electrical circuits comprise circular circuits which are placed around the circumference of a container in which an aqueous solution is stored. The circular circuits are positioned such that they are in direct communication with the aqueous solution. An alternating current is then applied to the circular circuits, whereupon the poles of the electrical field dissociate the ions within the aqueous solution. The poles of the electrical field of the circular circuit further form ion clumps in the aqueous solution, wherein the ion clumps are localized at positions along the circular circuits where the charge of the ion clump is opposite the charge of the electrical field at the localized position.

Figure 14:
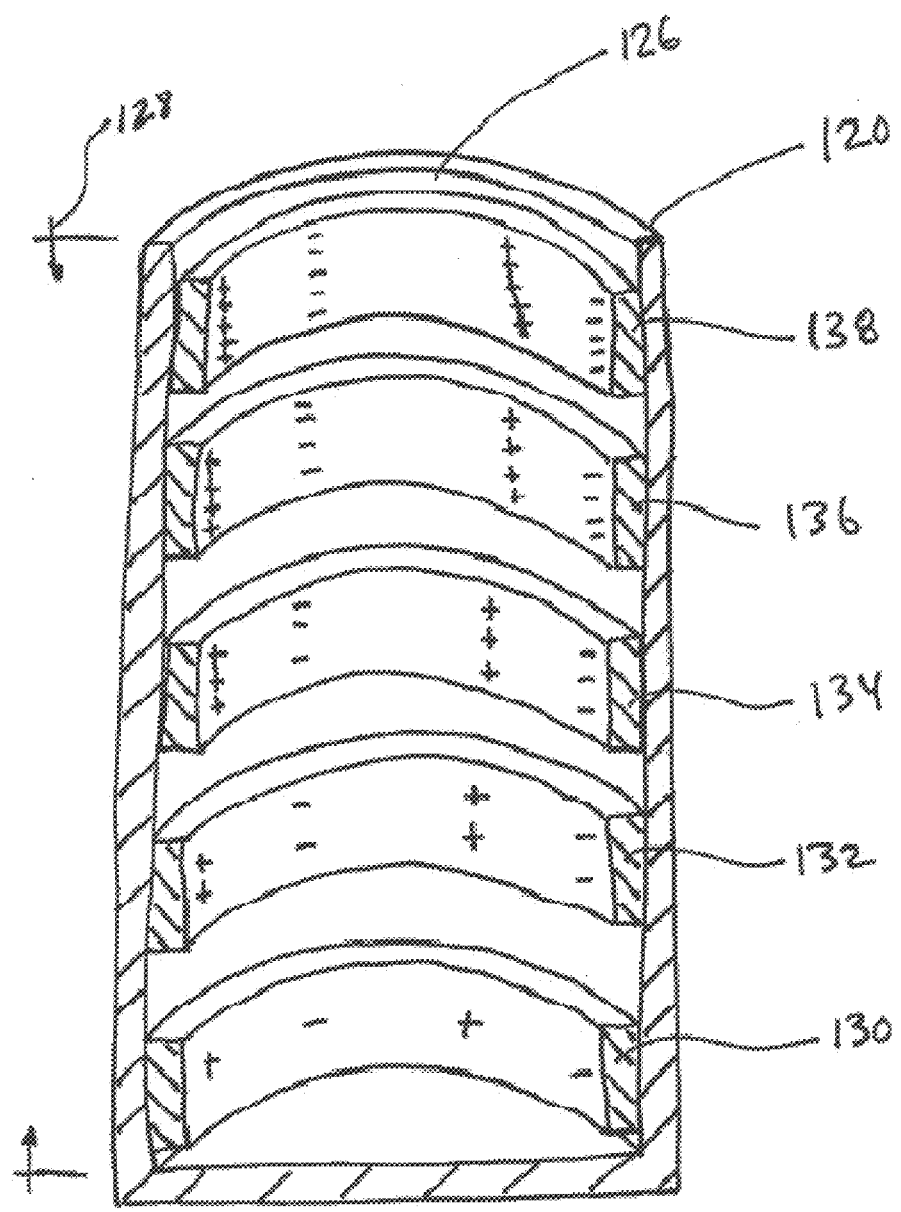
FIG. 14 is a cross-section view of a container having a plurality of circuits or electrodes in accordance with a representative embodiment of the present invention.
Figure 15:
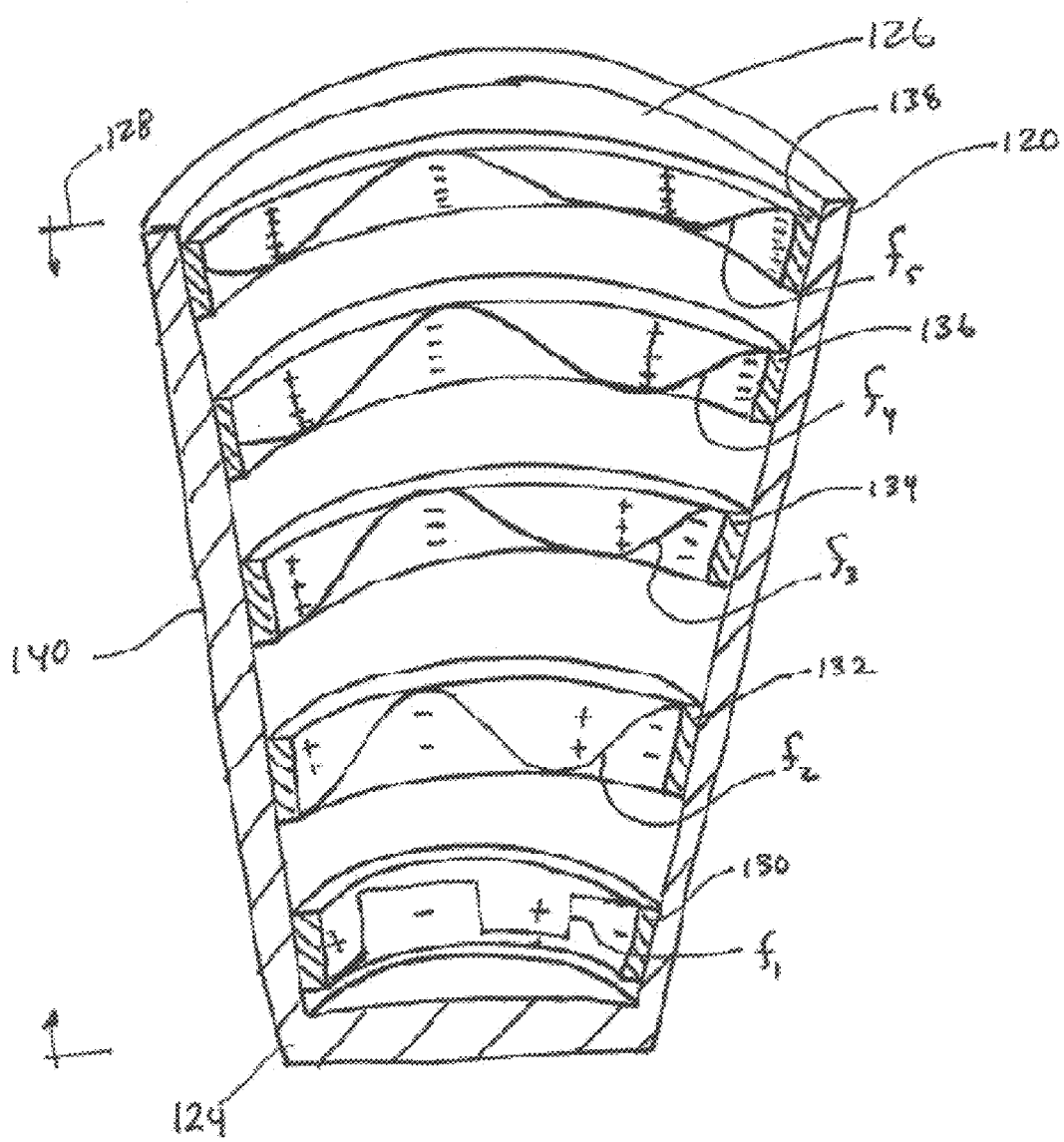
FIG. 15 is a cross-section view of a container having tapered wall surfaces and including a plurality of circuits or electrodes in accordance with a representative embodiment of the present invention.

Referring now to FIG. 13, a diagram of an ion separation system 100 is shown. In some embodiments, ion separation system 100 comprises a container 120. Container 120 may include any container or device configured to hold a volume of an aqueous solution. In some embodiments, container 120 comprises parallel wall surfaces, as shown in FIG. 14. In other embodiments, container 120 comprises a tapered wall surface, as shown in FIG. 15.

Some embodiments of the present invention undergo ion separation based upon the application of forward finite differences (FFD) using a wave model. Specific details regarding the methods and mechanisms by which this is accomplished is discussed below under the heading "Applications."

Figure 13A:
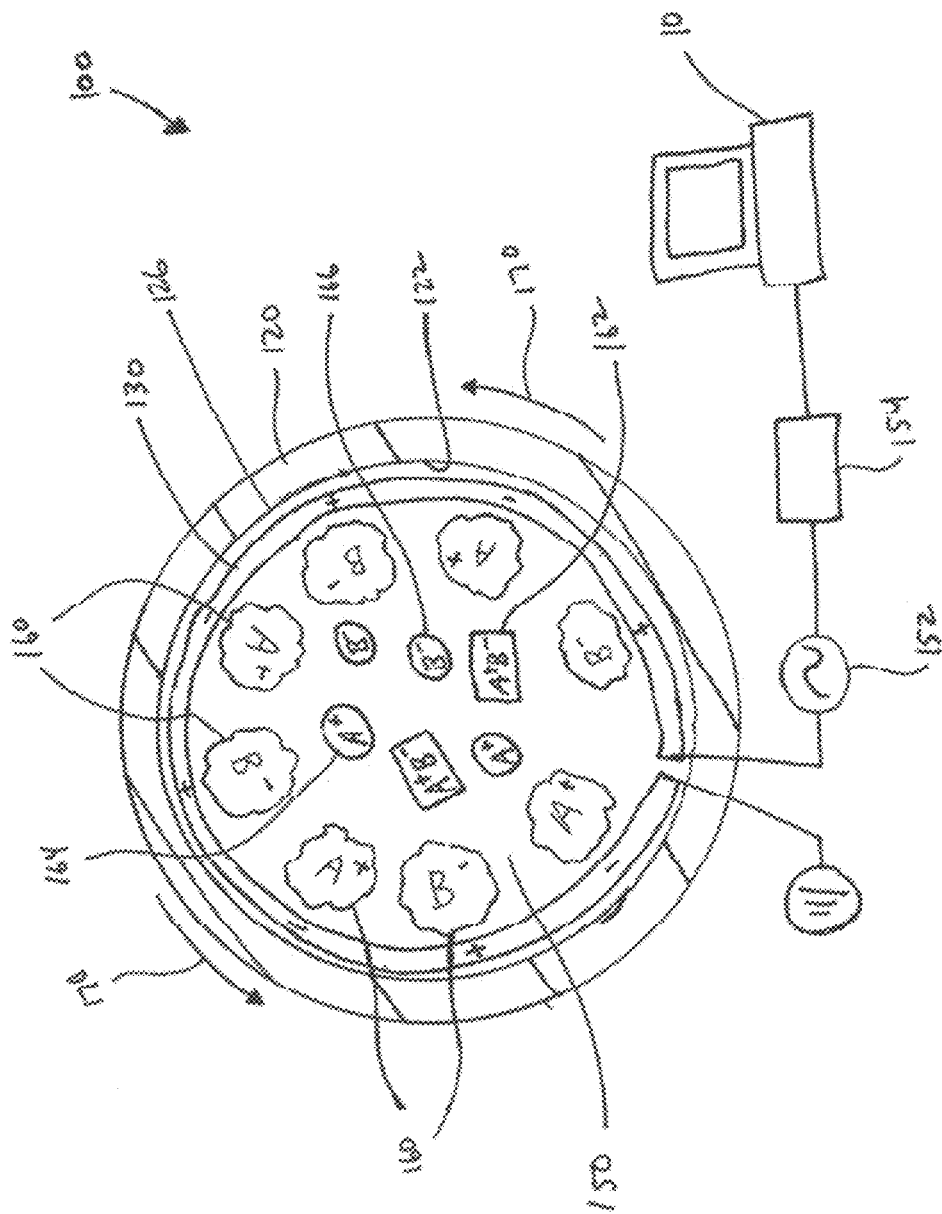
FIG. 13A illustrates a schematic view of a deionization chamber or container operably coupled to a computer device in accordance with a representative embodiment of the present invention.

With reference to FIG. 13A, container 120 comprises an inner wall surface 122 which defines an interior volume of container 120. Ion separation system 100 further comprises an electrical circuit 130 which is applied to inner surface 122 of container 120. Electrical circuit 130 may comprise any structure or material capable of caring an electrical current. In some embodiments, electrical circuit 130 comprises a metal wire. In other embodiments, electrical circuit 130 comprises an insulated wire. Further, in some embodiments electrical circuit 130 comprises an insulated metallic plate.

Electrical circuit 130 is provided as a means for introducing an electrical circuit to an aqueous solution 150 stored within container 120. In some embodiments, electrical circuit 130 is operably coupled to an alternating current source 152. Alternating current source 152 may include an AC transformer configured to supply a desired voltage to electrical circuit 130. Electrical circuit 130 is further coupled to an electrical current controller 154. Controller 154 generally comprises circuitry designed to control the current permitted to flow through electrical circuit 130. In some embodiments, controller 154 is further operably connected to a computer device 10. Computer device 10 comprises a software application having computer-executable instruction for operating controller 154. In some embodiments, controller 154 comprises a part of computer device 10. For example, controller 154 is a chipset of computer device 10.

In some embodiments, controller 154 executes an electrical current and frequency for electrical circuit 130. The electrical current and frequency may include any amperage and hertz, respectively, which will result in the formation of ion clumps 160 in aqueous solution 150. For example, in some embodiments an amperage is selected which is calculated to overcome the natural attractive forces between cations 164 and anions 166.

Ion clumps 160 include isolated groups of charged constituents or ions which are dissolved in aqueous solution 150. For example, in some embodiments aqueous solution 150 comprises an ionic compound 162 having a chemical formula of A+B—, wherein A+ is a cation 164, and B—is an anion 166 when the compound is dissolved in solution. Where the aqueous solution becomes saturated with the ionic compound, a portion of the ionic compound may remain undissolved, as shown.

Figure 13B:
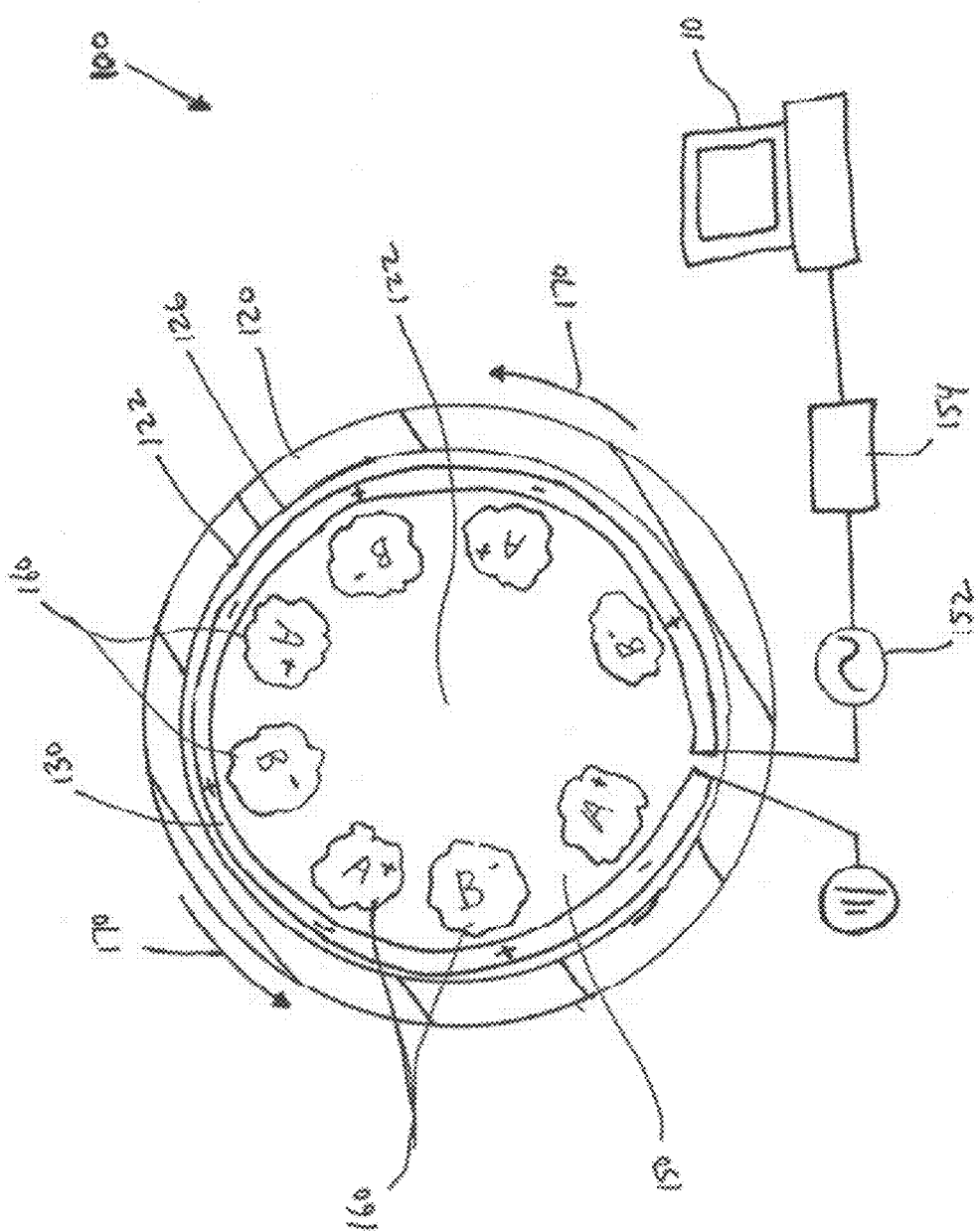
FIG. 13B illustrates a schematic view of a deionization chamber or container operably coupled to a computer device in accordance with a representative embodiment of the present invention.

Once dissolved, these charged component ions 164 and 166 are attracted to the positive and negative charges flowing through electrical circuit 130. As such, the center point 122 of container 120 and aqueous solution 150 is essentially deionized, as shown in FIG. 13B. Deionized solution may be removed from container 120 by siphoning or otherwise removing the deionized solution from the center point of container 120.

The attractive forces between the dissociated ions and the charges flowing through electrical circuit 130 results in the formation of ion clumps 160. Generally, ion clumps 160 form at positions proximate to electrical circuit 130. Accordingly, where electrical circuit 130 is positioned on the inner circumferential surface of container 120, ion clumps 160 also form around the inner circumferential surface of container 120. The precise location of ion clumps 160 with respect to electrical circuit 130 will depend upon the frequency of the current flowing through the circuit. The direction 170 of the current for circuit 130 will result in a shifting of the location of ion clumps 160 around the circumference of container 120. As the positive and negative charges move through circuit 130, the oppositely charged ions 164 and 166 will be attracted to the moving charges and migrate around the container in the direction 170 of the current flow through circuit 130.

In some embodiments, ion separation system 100 further comprises computer-executable software capable of predicting the location of cations 164 and anions 166 within container 120. As such, cations 164 and anion 166 may be removed from aqueous solution 150 by siphoning at the predicted locations.

Referring now to FIG. 14, a cross-section of container 120 is shown. In some embodiments, container 120 comprises a plurality of circuits 130, 132, 134, 136 and 138. Each electrical circuit is positioned within container 120 at a position adjacent another electrical circuit. In some embodiments, electrical circuits are positioned around the inner circumference of container 120 in parallel relation to each adjacent circuit along the height 128 of container 120. An electrical current is supplied to each of the circuits 130, 132, 134, 136 and 138 such that ion clumps form around the inner circumference of container 120 along the height 128 of container 120.

In some embodiments, the intensity or amplitude of the electrical current flowing through each electrical circuit is selected to cause ion clumps localized at lower circuits to migrate and localize at circuits located nearer to opening 126 of container 120. For example, in some embodiments a first electrical circuit 130 is provided through which a first alternating current flows, as represented by the positive (+) and negative (−) symbols. A second electrical circuit 132 is further provided and positioned adjacent to first electrical circuit 130, the second electrical circuit 132 comprising a second alternating current, wherein the intensity of the second alternating current is greater than the intensity of the first alternating current. In some embodiments, the second alternating current comprises twice the intensity of the first alternating current.

Container 120 may further include additional circuits 134, 136 and 138 which are positioned along the inner wall surface of container 120 in a similar fashion to first and second electrical circuits 130 and 132. Additional circuits 134 136 and 138 further comprise alternating currents of increasing intensity, such that the intensity of the alternating current flowing through the fifth electrical circuit 138 is greater than the intensity of the alternating current flowing through the fourth electrical circuit 136, which is greater than the intensity of the alternating current flowing through the third electrical circuit 134, and so forth. As such, an electrical current intensity gradient is formed along height 128 of container 120, wherein the electrical current gradient increases from the base 124 to the opening 126 of container 120.

Referring now to FIG. 15, in some embodiments container 120 comprises a tapered wall surface 140, wherein the inner circumference of container 120 increases from base 124 to opening 126. As such, the length of circuits 130, 132, 134, 136 and 138 may be increased as needed to accommodate for the increase inner circumference at the position of the specific circuit.

In some embodiments, the frequency ($f$) of the alternating current flowing through each circuit is adjusted to compensate for the varying lengths of circuits 130, 132, 134, 136 and 138. For example, in some embodiments the frequency of each alternating current is selected to synchronized and align the positive and negative charges flowing through each of the circuits as the currents move around the inner circumference of container 120 through their respective electrical circuits. In other words, the frequency of an alternating current flowing through a shorter electrical circuit will need to be greater than the frequency of an alternating current flowing through a longer electrical circuit. According, $f1 > f2 > f3 > f4 > f5$, as shown. Further, the intensity of the current flowing through circuits 130, 132, 134, 136 and 138 increases from $f1$ to $f5$, as discussed previously.

In some embodiments, $f1$ comprises a square waveform which is integrated to provide sinusoid waveforms $f2$ through $f5$ using a Finite Difference Method, described below in the Technical Discussion section.

Figure 16A:
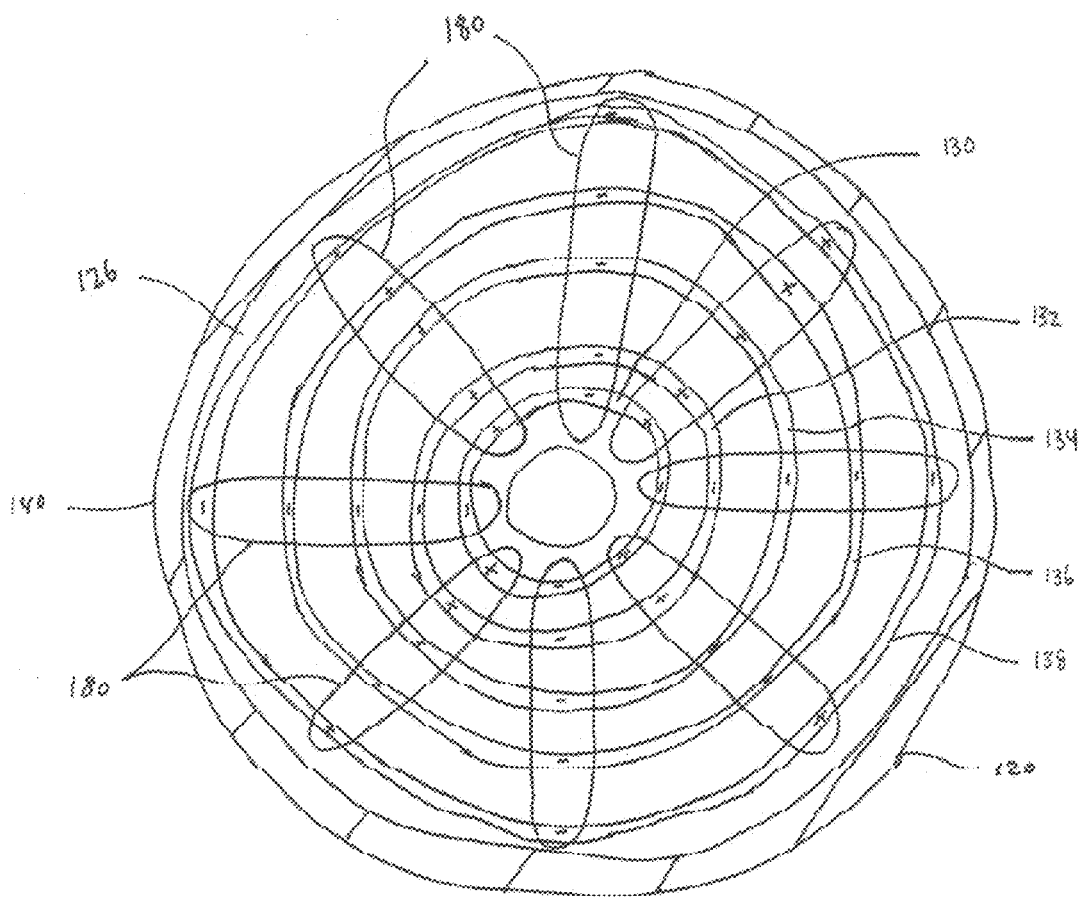
FIG. 16A illustrates a perspective top view of a deionization chamber or container in accordance with a representative embodiment of the present invention.
Figure 16B:
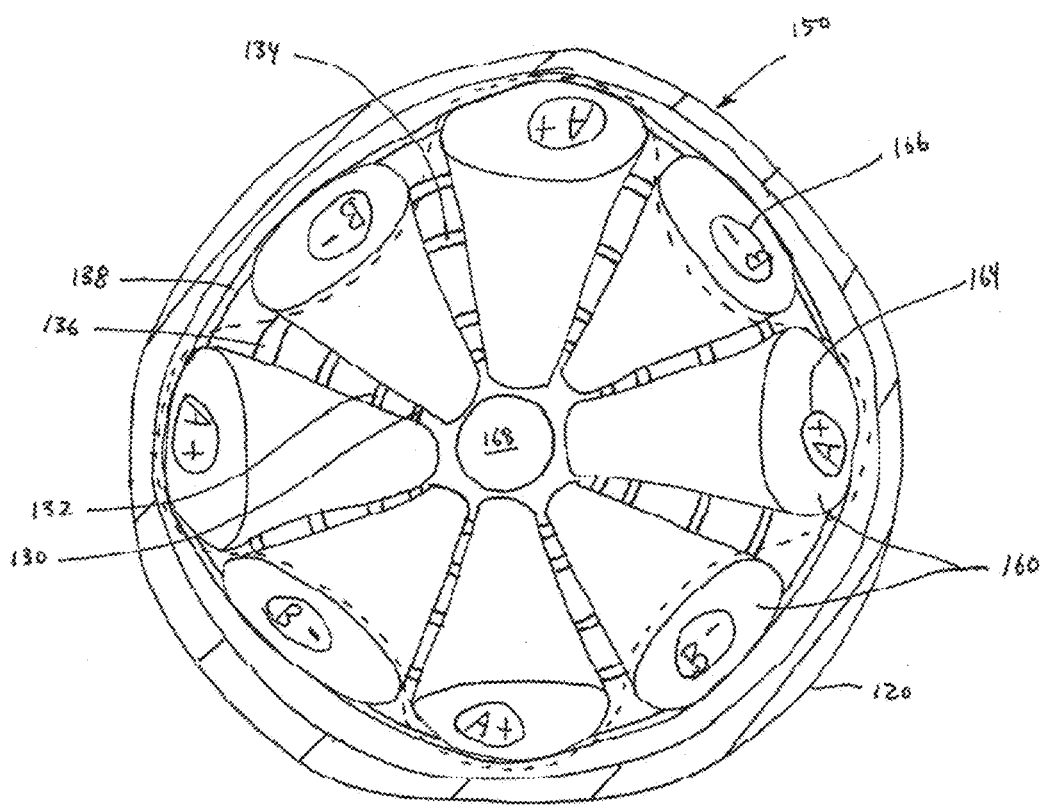
FIG. 16B illustrates a perspective top view of a deionization chamber or container in accordance with a representative embodiment of the present invention.

In some embodiments, zones or clouds 180 of like charges are formed along the adjacent circuits 130-138, as shown in FIG. 16A. These clouds 180 of like charges attract oppositely charged ions 164 and 166 to form ion clumps 160 around the inner circumference of container 120, as shown in FIG. 16B. The ion clumps 160 may be removed from aqueous solution 150 by siphoning or other liquid removal means. Further, deionized solution 168 may be removed from the center of container 120 by siphoning or other liquid removal means known in the art.

Technical Discussion

Additional objects, advantages, and novel features of this invention will become apparent to those skilled in the art upon examination of the following technical discussion. It should be appreciated that is technical discussion is not to be considered as limiting the scope of the invention, but merely as be illustrative and representative thereof.

In some embodiments of the present invention, a method using forward finite difference equations is provided which is capable of approximating a polynomial evaluated at equal intervals of its independent variable. When an alternating sequence of constant values is presented to the difference equations, it produces an approximation of a sinusoid. Selecting appropriate values for initializing the difference equations and for their input sequence determine the sinusoidal waveform's amplitude, frequency and phase. The algorithm devised to simulate these sinusoids using difference equations has important computational advantages over a point-by-point construction using a sinusoid library function. Accordingly, systems and methods of the present invention are used to digitally synthesize approximated sine waves when the amplitudes of its basic frequency components and harmonics are known using forward finite difference equations.

Conventional methods provide tables of data values for each sinusoidal component which are then added up at each time step to form a wavetable. The wavetable values at each time point form an output signal. Calculating and scaling the wavetable for a reasonably large ensemble of component tones imposes a formidable computing workload. The problem is that the sampling interval imposed by the digital to analog converter has been far too brief for the computer to produce a sufficiently realistic signature over large datasets. A disadvantage with this method is that it is a "zero-sum" process; namely, constructing data points in any prior step contributes no information to the current step. Accordingly, the present invention provides a process which utilizes the reversal information of individual sinusoids at their turning points. The frequencies may then be processed at once, both turning points and non-turning points, as a group. Thus, a process is provided capable of producing a complex signal as a whole, each step, without having to reconstruct and superpose individual frequency components; similar to a digital filter. In particular, linear difference equations have been used to assimilate the information of one point into a subsequent point of an interval. Thus, it is possible to add complex sinusoids using difference equations to retain the desirable feature of table lookup; i.e.: absolute stability while creating seamless ensembles of spectrally correct data.

Further, a process is provided comprising a system of finite difference equations to build waveforms instead of table lookup, thereby facilitating the processing of many more components in each time step, regardless of the type or architecture of the computing machinery. The net effect for modelers is to dramatically increase the realism by which conspicuous spectrum properties may be simulated in a time series.

The Integration Process

Mathematically speaking, integration is a smoothing process. A good starting point to create a sinusoid from a square wave is to try "smoothing" it through repeated integrations.

Example 1: Integrating a Square Wave Into a Sinusoid

An example will be given to show that integrating a square wave at a point will produce a sinusoid. A method of generating sinusoids will be derived from this concept.

Figure 30:
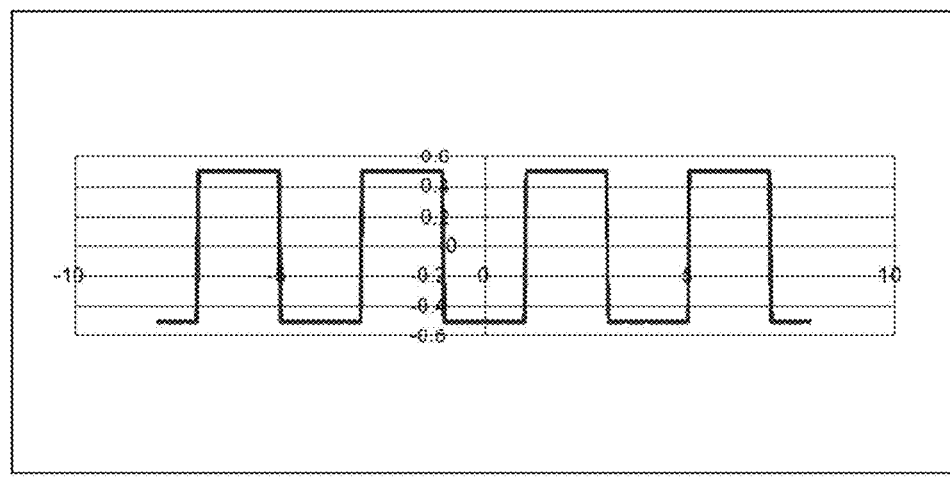
FIG. 30 illustrates a Table I which displays a periodic, even, square wave function in accordance with a representative embodiment of the present invention.

Suppose the periodic, even, square wave function $f_p(t)$ defined below and shown in Equation I below and Table I as shown, in accordance with some embodiments, in FIG. 30.

Equation I:

$$f_p(t) = \begin{cases} \frac{1}{2} & -2 < t < 1 \\ \frac{-1}{2} & -1 \leq t \leq 1 \\ \frac{1}{2} & 1 < t < 2 \end{cases}$$

$$f_p(t) = f_p(t+4) \quad (1)$$

is expanded in a Fourier cosine series:

$$F(t) = a_0 + \sum_{n=1}^{\infty} \left(a_n \cos\frac{n\pi t}{2}\right)$$

After integrating $f_p(t)$ through the interval [−2,2] and interchanging integration and summation, the Fourier coefficients F(n) are provided, as shown in Equation II.

Equation II:
$$F(0) = 0 \quad (2)$$
$$F(n) = \frac{-\sin(n\pi/2)}{n\pi/2}$$

The Fourier coefficients imply that an equivalent waveform could be generated, as shown in Equation III.

$$f_p(t)=0-2/\pi\cos(\pi t/2)+2/3\pi\cos(3\pi t/2)-2/5\pi\cos(5\pi t/2)+\ldots \quad \text{Equation III:}$$

The Fourier coefficients $$\frac{2(-1)^n}{\pi(2n+1)}$$

decay at order n. After another integration, these coefficients decay at order $n^2$, and so forth. As the order of integration increases, in the limit, all coefficients vanish except that for n=1, which leaves only a cosine term. This is to say that when a simulated square wave is the sum of the fundamental wave and its harmonics, repeated simulations of each simulation will leave only the fundamental sinusoid. Since the best possible approximation to a square wave integrates into a sinusoid, then repeated integration of a square wave directly must also produce a sinusoid.

Example I shows that convergence by integration to a sinusoid is fairly rapid. Considering the first harmonic as an error term in the simulated sinusoid, that term is of order $$\frac{1}{n};$$

after integration it is of order $$\frac{1}{n^2},$$

etc.; implying that the simulated sinusoid converges to a real sinusoid in orders of a convergent geometric sequence $$\left\{\frac{1}{n^j}\right\}_{j=1}^{\infty}.$$

The total approximation error is bounded by the geometric series formed from terms of this sequence.

Finite Differences

Suppose a computer register R holding values $R_k$ and $R_{k+1}$ at successive time periods. An equation $R_{k+1}=+(R_{k+1}-R_k)$ may be written. The quantity $R_{k+1}-R_k$ is a forward finite difference at the kth step. Similarly, in the equation, $R_k=R_{k+1}-R_k$, $(R_{k+1}-R_k)$ is a backward finite difference at the kth step. In a matrix formulation, each forward finite difference expression is built by adding two adjacent row entries in a column and placing the result in the same row, one column over to the right. A backward finite difference expression can be formed by subtracting from an entry the entry up a row and left a column to get the result.

A system of forward finite difference expressions may be devised by assigning a numeric level to the computer register and that level minus 1 as its finite difference. A system of finite difference equations may be written in descending order, and the result quantities rearranged in ascending order in a matrix, as shown in Table II.

TABLE II $$\begin{bmatrix} RN_{k+1} = RN_k + (RN-1)_k \\ (RN-1)_{k+1} = (RN-1)_k + (RN-2)_k \\ \vdots \\ (R1)_{k+1} + (R1)_k + (R0)_k \end{bmatrix}$$

Forward Finite Differences $$\begin{bmatrix} RN_k = RN_{k+1} - (RN-1)_k \\ (RN-1)_k = (RN-1)_{k+1} + (RN-2)_k \\ \vdots \\ (R1)_k + (R1)_{k+1} + (R0)_k \end{bmatrix}$$

Backward Finite Differences $$\begin{bmatrix} R0_0 & R0_1 & \cdots & R0_n \\ R1_0 & R1_1 & \cdots & R1_n \\ \cdots & \cdots & \cdots & \cdots \\ RN_0 & RN_1 & \cdots & RN_n \end{bmatrix}$$

Rearranged Matrix

Thus, forward finite differences are causal. A linear transformation defining them is shown in Table III.

TABLE III $$\begin{bmatrix} 1 & 0 & 0 & 0 & 0 & 0 \\ 1 & 1 & 0 & 0 & 0 & 0 \\ 0 & 1 & 1 & 0 & 0 & 0 \\ 0 & 0 & 1 & 1 & 0 & 0 \\ 0 & 0 & 0 & 1 & 1 & 0 \\ 0 & 0 & 0 & 0 & 1 & 1 \end{bmatrix} \begin{bmatrix} R0_k \\ R1_k \\ R2_k \\ R3_k \\ R4_k \\ R5_k \end{bmatrix} = \begin{bmatrix} R0_{k+1} \\ R1_{k+1} \\ R2_{k+1} \\ R3_{k+1} \\ R4_{k+1} \\ R5_{k+1} \end{bmatrix}$$

In the rearranged matrix above, each successive column is obtained from the column on the left by left-multiplying by this forward finite differences linear transformation matrix. Every element of every column is a sum of two elements of the previous column, except for top element and left column.

Forward finite differences incorporate previous time steps into present steps. At a time step, two numbers are added and the result is stored exactly one time step later. As this sounds like a load-add-store computer calculation, it is convenient to use the computer register notation above, to represent adding numbers at level N−1 and N at time k and storing them at time k+1.

R0 is the computer register of row zero, containing constant values. It is called the driving sequence. The forward linear difference equation for the first row in terms of the driving sequence is written $R1_{k+1}-R1_k+R0_k$. The left column of the matrix contains initial values $\{R0_0 \ldots RN_0\}$ of the registers. The bottom row of the matrix contains boundary values $\{R0_0 \ldots RN_k\}$. A forward finite differences method as defined in the present invention is systematically applying Equation IV to successive column-vectors of a matrix, thereby building new columns from old. The vector of initial values of the original matrix is its first column.

$$\begin{bmatrix} 1 & 0 & \cdots & 0 & 0 \\ 1 & 1 & & 0 & 0 \\ \vdots & & \ddots & & \vdots \\ 0 & 0 & \cdots & 1 & 0 \\ 0 & 0 & & 1 & 1 \end{bmatrix} \qquad \text{Equation IV}$$

Example II: Generating a Pascal Triangle

A finite differences computing model of the present invention may be used to generate a Pascal Triangle. The binomial coefficients $C_{jj}$ are used as a driving sequence. The Pascal identity $C_{n/m+1} + C_{n/m} = C_{n+1/m+1}$ generates the matrix shown in Table IV. The forward finite differences method implements this identity, when applied to a matrix of binomial coefficients. "Straighten" the matrix on the left to become the Pascal triangle on the right by rotating the main diagonal clockwise into the left column. The columns fold into rows by numbering upward from the main diagonal along each column. This rotation places the initial values of the difference equation system on the main diagonal. The right matrix is the Pascal Triangle.

TABLE IV $$\begin{bmatrix} C_{0,0} & C_{1,1} & C_{2,2} & C_{3,3} \\ \blacksquare & C_{1,0} & C_{2,1} & C_{3,2} \\ \blacksquare & \blacksquare & C_{2,0} & C_{3,1} \\ \blacksquare & \blacksquare & \blacksquare & C_{3,0} \end{bmatrix} \begin{bmatrix} 1_{00} & \blacksquare & \blacksquare & \blacksquare \\ 1_{10} & 1_{11} & \blacksquare & \blacksquare \\ 1_{20} & 2_{21} & 1_{22} & \blacksquare \\ 1_{30} & 3_{31} & 3_{32} & 1_{33} \end{bmatrix}$$

Integrating Register Levels

Referring now to the matrix shown in Table V, the left matrix may be generalized by applying the finite differences method to its binomial coefficients.

TABLE V $$\begin{bmatrix} C_{0,0} & C_{1,1} & C_{2,2} & C_{3,3} & \blacksquare \cdots & \blacksquare & \blacksquare & C_{-1+n,n-1} \\ \blacksquare & C_{1,0} & C_{2,1} & C_{3,2} & \blacksquare \cdots & \blacksquare & \blacksquare & C_{0+n,n-1} \\ \blacksquare & \blacksquare & C_{2,0} & C_{3,1} & \blacksquare \cdots & \blacksquare & \blacksquare & C_{1+n,n-1} \\ \blacksquare & \blacksquare & \blacksquare & C_{3,0} & \blacksquare \cdots & \blacksquare & \blacksquare & C_{2+n,n-1} \\ \blacksquare & \blacksquare & \blacksquare & \blacksquare & \blacksquare \cdots & \blacksquare & \blacksquare & \blacksquare \\ \blacksquare & \blacksquare & \blacksquare & \blacksquare & \blacksquare & & \blacksquare & C_{k-1+n,n-1} \end{bmatrix}$$

It is noted that the second row of this matrix is the sequence of natural numbers {1 . . . n}. The right-hand column of this matrix has the property that each element of this column is a sum of partial sums of these natural numbers. The method of finite differences has made partial sums in every row but the first. In the matrix shown in Table VI, the number n is the number of partial sums in each row.

TABLE VI $$\begin{bmatrix} n=6 & 1 & 0 & 0 & 0 & 0 & 0 & 0 \\ n=5 & 0 & 1 & 1 & 1 & 1 & 1 & 1 \\ n=4 & \blacksquare & 0 & 1 & 2 & 3 & 4 & n \\ n=3 & \blacksquare & \blacksquare & 0 & 1 & 3 & 6 & \frac{n \cdot (n+1)}{2} \\ n=2 & \blacksquare & \blacksquare & \blacksquare & 0 & 1 & 4 & \frac{n \cdot (n+1) \cdot (n+2)}{3!} \end{bmatrix}$$

The kth partial sum of partial sums of natural numbers is $S_k$ where $$S_k = C_{k-1+n,n-1} = \Pi_{j=1}^{k} \frac{n+j-1}{j}.$$

Accordingly, for every binomial coefficient of farm $C_{c+j,n-1}$ (which are the column elements), the identities for the partial sum are shown in Equation V.

$$C_{n+j,n-1} = \frac{(n+j)(n+j-1) \cdot \ldots \cdot (n)}{j+1!} = \qquad \text{Equation V}$$

$$\frac{\exp\left(\sum_{i=0}^{j} \log(n+i)\right)}{j+1!} = \frac{\left(\exp\left(\frac{1}{j+1} \cdot \sum_{i=0}^{j} \log(n+i)\right)\right)^{j+1}}{j+1!}$$

Accordingly Equation V is a discrete approximation of the definite integral shown in Equation VI, where for large j (in the limit) the quantities are equal.

$$\int_0^n \frac{x^j}{j!} dx = \frac{n^{j+s}}{(j+1)!}. \qquad \text{Equation VI}$$

As shown, the finite differences summations go across the interval [1 . . . n], while the integral is formed at individual points of the interval. The two views relate to each other, in the sense that the disc and shell integration methods of calculus relate to each other: the Fourier Series integrations are vertical slices of a full wave, alternatively, integrating a Pascal Triangle into an exponential is a longitudinal integration. This latter method is the one by which a square wave will be integrated into a sinusoid.

The interval [0,n] of both difference expressions and definite integral may be generalized. Each row of the forward finite difference matrix relates to its preceding row as the definite integral relates to its chain of derivatives. For a driving sequence {R0} of constants; {R1} values vary linearly; {R2} are quadratic values, etc. Forward finite differences implement the process of integration from lower to higher levels. It is the process by which polynomial expressions are summed into the exponential function. The approximation error in forming a sinusoid (as boundary values) from a driving sequence is the same as the calculation of error in this section's first example.

Example III: Calculating Compound Interest

Viewed from the perspective of money management, compounding of interest is saving last time period's investment income, and investing last period's savings income. The basic concept is that any funds not withdrawn are automatically reinvested. The binomial coefficients of the Pascal Triangle directly apply to the compound interest calculation. Compound interest may be expressed compactly in matrix notation.

The matrix product of Rate*Time is shown in the right panel of the matrix shown in Table VII. Each entry on the main diagonal of this matrix is a successive compounding. The driving sequence is the top row of this matrix. This sequence properly represents Principal in the interest equation.

The left-hand (row-) vector in the left panel is provided to sum the compoundings in each column of the Rate*Time matrix into total assets at that step. This is important, because it reveals the assumption that all compoundings precede summation.

Further, the Rate matrix identifies how each row is compounded into a succeeding row. The causal nature of the compounding calculation is shown by the main diagonal.

The Time matrix of binomial coefficients $[C_{ij}]$ is formed from the combination of i nonblank elements from preceding row taken elements at a time. The binomial coefficient is appropriate, since an element's value is the same at every time step.

Further still, the right-hand column vector is placed in the matrix expression to select out the kth column for a final result. In this column is the total of principle and interest accrued at time $t_k$.

to dividing the Laplace Transform by the rate. Exponential growth or decay is determined by the quantity x being positive or negative. The matrix calculation also demonstrates that the same interest amounts can be obtained by either modifying the interest rate matrix or scaling the Pascal Triangle time matrix row-by-row.

Characteristically, a square wave reflects the concept of opposites, and alternating between opposites. Accordingly, these concepts may be incorporated into the square wave construction.

Discussion of Opposites

In nature, opposites must exist. Acknowledging these facts, a mathematical path can be devised to distinguish uniquely between opposites. Specifically, every product of members of one class with members of the opposite class must be negative. This is to say that the product of opposites must be reducible to contain one pair of factors of the imaginary number i, is the square root of −1. That way, the product of the two quantities will ever be negative, as zero has no opposite. Mathematically speaking, opposites include one more or less i factor in a quantity than its opposite.

Further, the principle of opposites permits a reversible process to convert or produce one quantity from its opposite, where such a reversible process exists. For example, sand and iron filings may be unmixed using a magnet. The reason why this kind of opposites is interesting is that a reversible process can introduce oscillation between opposite poles, with an implied periodicity.

Example IV: Compounding Opposites

As previously demonstrated in Example III, an interest computation was applied to simple quantities. Whenever

TABLE VII $$\text{Interest} = (1\ 1\ 1\ 1\ 1) \cdot \begin{bmatrix} 1 & \blacksquare & \blacksquare & \blacksquare & \blacksquare \\ \blacksquare & \frac{x}{n} & \blacksquare & \blacksquare & \blacksquare \\ \blacksquare & \blacksquare & \frac{x^2}{n^2} & \blacksquare & \blacksquare \\ \blacksquare & \blacksquare & \blacksquare & \frac{x^3}{n^3} & \blacksquare \\ \blacksquare & \blacksquare & \blacksquare & \blacksquare & \frac{x^4}{n^4} \end{bmatrix} \cdot \begin{bmatrix} C_{0,0} & C_{1,1} & C_{2,2} & C_{3,3} & C_{4,4} \\ \blacksquare & C_{1,0} & C_{2,1} & C_{3,2} & C_{4,3} \\ \blacksquare & \blacksquare & C_{2,0} & C_{3,1} & C_{4,2} \\ \blacksquare & \blacksquare & \blacksquare & C_{3,0} & C_{4,1} \\ \blacksquare & \blacksquare & \blacksquare & \blacksquare & C_{4,0} \end{bmatrix} \cdot \begin{bmatrix} 0 \\ 0 \\ 0 \\ 0 \\ 1 \end{bmatrix}$$

Principal      Rate      Time

| | $t_0$ | $t_1$ | $t_2$ | $t_3$ | ■ | $t_n$ |
|---|---|---|---|---|---|---|
| | $C_{0,0}$ | 1 | 1 | 1 | ■ | $S_0 = C_{n,n}$ |
| | ■ | $\frac{C_{1,0} \cdot x}{n}$ | $\frac{C_{2,1} \cdot x}{n}$ | $\frac{C_{3,2} \cdot x}{n}$ | ■ | $S_1 = \frac{x}{n} \cdot C_{n,n-1}$ |
| | ■ | ■ | $\frac{C_{2,0} \cdot x^2}{n^2}$ | $\frac{C_{3,1} \cdot x^2}{n^2}$ | ■ | $S_2 = \frac{x^2}{n^2} \cdot \frac{C_{n,n-2}}{2!}$ |
| | ■ | ■ | ■ | ■ | ■ | ■ |
| | ■ | ■ | ■ | ■ | ■ | $S_n = \frac{x^o}{n^n} \cdot C_{n,0}$ |

Rate      Time

This amount may be further expressed algebraically for rate x, by Equation VII, which, in the limit n→∞, is the exponential function $e^x$.

$$\text{Total} = \sum_{k=0}^{n} \frac{C_{n,n-k}}{n^k} * x^k = \sum_{k=0}^{n} \frac{k! * C_{n,k}}{n^k} * \frac{x^k}{k!} = \left(1 + \frac{x}{n}\right)^n \quad \text{Equation VII}$$

Incidentally, the Rate matrix is a discrete example of a Laplace Transform integration theorem; namely, integrating successively higher levels in the time domain is equivalent compounding is applied to quantities of the same type, an exponential process results, which finally ends either at zero or infinity. When opposing quantities are compounded into each other, a different kind of exponential process occurs. In some instances, compounding of opposing quantities results in oscillation between the opposites.

Opposing principals and rates can be devised by introducing the i factor. The formula Interest= Principal*I*Rate*Time compounded may be applied to the originals and their opposites, as shown in Table VIII.

TABLE VIII $$(1 \quad 1 \quad 1 \quad 1 \quad 1) \cdot \begin{bmatrix} 1 & \blacksquare & \blacksquare & \blacksquare & \blacksquare \\ \blacksquare & \frac{i \cdot x}{n} & \blacksquare & \blacksquare & \blacksquare \\ \blacksquare & \blacksquare & \frac{i^2 \cdot x^2}{n^2} & \blacksquare & \blacksquare \\ \blacksquare & \blacksquare & \blacksquare & \frac{i^3 \cdot x^3}{n^3} & \blacksquare \\ \blacksquare & \blacksquare & \blacksquare & \blacksquare & \frac{i^4 \cdot x^4}{n^4} \end{bmatrix} \cdot \begin{bmatrix} C_{0,0} & C_{1,1} & C_{2,2} & C_{3,3} & C_{4,4} \\ \blacksquare & C_{1,0} & C_{2,1} & C_{3,2} & C_{4,3} \\ \blacksquare & \blacksquare & C_{2,0} & C_{3,1} & C_{4,2} \\ \blacksquare & \blacksquare & \blacksquare & C_{3,0} & C_{4,1} \\ \blacksquare & \blacksquare & \blacksquare & \blacksquare & C_{4,0} \end{bmatrix} \cdot \begin{bmatrix} 0 \\ 0 \\ 0 \\ 0 \\ 1 \end{bmatrix}$$

Principal             Rate             Time $$\begin{bmatrix} t_0 & t_1 & t_2 & t_3 & \blacksquare & t_n \\ C_{0,0} & 1 & 1 & 1 & \blacksquare & S_0 = C_{n,n} \\ \blacksquare & i \cdot \frac{C_{1,0} \cdot x}{n} & i \cdot \frac{C_{2,1} \cdot x}{n} & i \cdot \frac{C_{3,2} \cdot x}{n} & \blacksquare & S_1 = \frac{i \cdot x}{n} \cdot C_{n,n-1} \\ \blacksquare & \blacksquare & \frac{-C_{2,0} \cdot x^2}{n^2} & \frac{-C_{3,1} \cdot x^2}{n^2} & \blacksquare & S_2 = \frac{-x^2}{n^2} \cdot \frac{C_{n,n-2}}{2!} \\ \blacksquare & \blacksquare & \blacksquare & \blacksquare & \blacksquare & \blacksquare \\ \blacksquare & \blacksquare & \blacksquare & \blacksquare & \blacksquare & S_n = \frac{i^n \cdot x^n}{n^n} \cdot C_{n,0} \end{bmatrix}$$

Rate             Time

By using the power series expansions for sine and cosine, the interest formula mentioned above can be represented as Equation VIII.

$$\text{Total} = \sum_{k=0}^{n} * i^k \frac{C_{n,k}}{n^k} * x^k = \sum_{k=0,2,4...}^{n-1} \frac{x^k}{k!} + \sum_{k=0,2,4...}^{n} \frac{i^k * x^k}{k!} = \cos x + i * \sin x. \quad \text{Equation VIII}$$

The transfers via compounding from each "account" to its opposite and back again is assured by Euler's Theorem, shown in Equation IX.

$$e^{ix} = \cos x + i \sin x \quad \text{Equation IX:}$$

By compounding each account into its opposite, a monetary equilibrium between the even lines of the Rate*Time matrix and its odd lines will occur. As time progressed, the compounding of odd lines decrement the even lines, thereby causing their roles to reverse. Specifically, the compounding of odd lines would increment the even lines. The process is periodic; i.e., it always repeats as it goes forward and never stops. The temporal effect has been to make forward-moving time slow down periodically, stop and stand still, and then turn backward; then continue backward, and turn forward. As such, a straight line has been turned into a circle. Previously, compound accretions of a scalar quantity introduced in what was described was an exponentially expanding or decaying amount. However, by setting up opposite accounts, a money pool becomes the compound of two funds: each one a sinusoidally varying monetary quantity. The graph of this interest computation the complex plan is the (never-ending) unit circle.

The compound calculation (i.e.: multiplying principal by rate and adding) could be rearranged another way to incorporate opposites. For example, instead of compounding opposites at every separate time point, a time interval of a number of points could be chosen. Forward compounding could be done the first half of the interval, then opposite compounding would be done the second half. The key is reversing the driving sequence halfway through. Instead of using a constant value vector for time, let the driving sequence be a positively and negatively alternating sequence of constant values by periodically alternating the sign of the driving sequence in the time matrix, time also flows backward and forward through that period. The reason for alternating the driving sequence is to obtain the same result using finite differences as is obtained by using the imaginary factor i. Whether by introducing an imaginary factor in the rate each step or by alternating the driving sequence, compounding of opposites changes an exponential function into two sinusoids differing from each other by a level of integration and a half of a half cycle.

Constructing a Table of Finite Difference Expressions

The difference between compound interest calculations and the binary addition operations of the Pascal Triangle, is the rate factor r. The compound interest calculation can be abstracted from the Pascal Triangle by multiplying each descending row by a successively higher power of r before adding it. The columnar coefficients of the Pascal Triangle are in the terms of the Binomial Theorem of algebra. The phrase "the power of compound interest" has a mathematical meaning, in that each descending row of binomial coefficients contains a common factor of a higher power of the simple interest rate. The implications of introducing r is not discussed herein and is henceforth presumed that r is equal to unity. By so doing, there are no multiplications—only simple additions. However, information of the power of r is retained in the row subscripts of coefficients in the Pascal Triangle for this particular arrangement. The longitudinal numbering scheme for the table's length is incorporated in the column subscript of the coefficient, as shown in Table IX.

In some embodiments, compounding is an essential part of finite differences. An upper triangular matrix of rows of elements {R0 . . . RN) is first constructed. These {R0 . . .

RN} are called initial values. Compounding of these elements is represented by adding nested Pascal Triangle matrices of descending size, one for each new value {R0 ... RN}. A formula for a single element of the matrix sum is the sum of elements of the individual matrices for that row and column.

TABLE IX $$\begin{bmatrix} R0 & R0 & R0 & R0 \\ - & R1 & R1 & R1 \\ - & - & R2 & R2 \\ - & - & - & R3 \end{bmatrix} \begin{bmatrix} C_{0,0} & C_{1,1} & C_{2,2} & C_{3,3} \\ \blacksquare & C_{1,0} & C_{2,1} & C_{3,2} \\ \blacksquare & \blacksquare & C_{2,0} & C_{3,1} \\ \blacksquare & \blacksquare & \blacksquare & C_{3,0} \end{bmatrix} + R1 \cdot \begin{bmatrix} \blacksquare & \blacksquare & \blacksquare & \blacksquare \\ \blacksquare & C_{0,0} & C_{1,1} & C_{2,2} \\ \blacksquare & \blacksquare & C_{1,0} & C_{2,1} \\ \blacksquare & \blacksquare & \blacksquare & C_{2,0} \end{bmatrix} + R2 \cdot \begin{bmatrix} \blacksquare & \blacksquare & \blacksquare & \blacksquare \\ \blacksquare & \blacksquare & \blacksquare & \blacksquare \\ \blacksquare & \blacksquare & C_{0,0} & C_{1,1} \\ \blacksquare & \blacksquare & \blacksquare & C_{1,0} \end{bmatrix} + R3 \cdot \begin{bmatrix} \blacksquare & \blacksquare & \blacksquare & \blacksquare \\ \blacksquare & \blacksquare & \blacksquare & \blacksquare \\ \blacksquare & \blacksquare & \blacksquare & \blacksquare \\ \blacksquare & \blacksquare & \blacksquare & C_{0,0} \end{bmatrix}$$

Each initial value Rn (matrix row) is introduced at one successively later time step (matrix column). A specific arrangement of initial values is a "geometry." This arrangement characterizes the successive geometry, and is calculated using the Successive Geometry Single Element Equation, shown in Equation X.

$$RN_k = \sum_{j=0}^{N} C_{k-N+j,j} \cdot R(N-j) \text{ for } k \geq N \quad \text{Equation X}$$

Supposing a formula for injecting all the {R0 ... RN} at the very first time step is needed. That geometry is called the simultaneous geometry, and is calculated using the Simultaneous Geometry Single Element Equation, shown in Equation XI.

$$RN_k = \sum_{j=0}^{N} C_{k,j} \cdot R(N-j) \text{ for } k \geq 0 \quad \text{Equation XI}$$

To make this change, each nested matrix belonging to its Rk is slid to the left, one time step per level, and new columns added on the right. Accounting for the slide is handled by renumbering the matrix columns, as shown in Table X.

TABLE X $$\begin{bmatrix} C_{0,0} \cdot R0 & C_{1,1} \cdot R0 & C_{2,2} \cdot R0 & C_{3,3} \cdot R0 & C_{4,4} \cdot R0 & C_{5,5} \cdot R0 \\ \blacksquare & \begin{matrix} C_{0,0} \cdot R1 \ldots + \\ C_{1,0} \cdot R0 \end{matrix} & \begin{matrix} C_{1,1} \cdot R1 \ldots + \\ C_{2,1} \cdot R0 \end{matrix} & \begin{matrix} C_{2,2} \cdot R1 \ldots + \\ C_{3,2} \cdot R0 \end{matrix} & \begin{matrix} C_{3,3} \cdot R1 \ldots + \\ C_{4,3} \cdot R0 \end{matrix} & \begin{matrix} C_{4,4} \cdot R1 \ldots + \\ C_{5,4} \cdot R0 \end{matrix} \\ \blacksquare & \blacksquare & \begin{matrix} C_{0,0} \cdot R2 \ldots + \\ C_{1,0} \cdot R1 \ldots + \\ C_{2,0} \cdot R0 \end{matrix} & \begin{matrix} C_{1,1} \cdot R2 \ldots + \\ C_{2,1} \cdot R1 \ldots + \\ C_{3,1} \cdot R0 \end{matrix} & \begin{matrix} C_{2,2} \cdot R2 \ldots + \\ C_{3,2} \cdot R1 \ldots + \\ C_{4,2} \cdot R0 \end{matrix} & \begin{matrix} C_{3,3} \cdot R2 \ldots + \\ C_{4,3} \cdot R1 \ldots + \\ C_{5,3} \cdot R0 \end{matrix} \\ \blacksquare & \blacksquare & \blacksquare & \begin{matrix} C_{0,0} \cdot R3 \ldots + \\ C_{1,0} \cdot R2 \ldots + \\ C_{2,0} \cdot R1 \ldots + \\ C_{3,0} \cdot R0 \end{matrix} & \begin{matrix} C_{1,1} \cdot R3 \ldots + \\ C_{2,1} \cdot R2 \ldots + \\ C_{3,1} \cdot R1 \ldots + \\ C_{4,1} \cdot R0 \end{matrix} & \begin{matrix} C_{2,2} \cdot R3 \ldots + \\ C_{3,2} \cdot R2 \ldots + \\ C_{4,2} \cdot R1 \ldots + \\ C_{5,2} \cdot R0 \end{matrix} \\ \blacksquare & \blacksquare & \blacksquare & \blacksquare & \begin{matrix} C_{0,0} \cdot R4 \ldots + \\ C_{1,0} \cdot R3 \ldots + \\ C_{2,0} \cdot R2 \ldots + \\ C_{3,0} \cdot R1 \ldots + \\ C_{4,0} \cdot R0 \end{matrix} & \begin{matrix} C_{1,1} \cdot R4 \ldots + \\ C_{2,1} \cdot R3 \ldots + \\ C_{3,1} \cdot R2 \ldots + \\ C_{4,1} \cdot R1 \ldots + \\ C_{5,1} \cdot R0 \end{matrix} \end{bmatrix}$$

TABLE X-continued $$\begin{bmatrix} C_{0,0} \cdot R0 & C_{1,1} \cdot R0 & C_{2,2} \cdot R0 & C_{3,3} \cdot R0 & C_{4,4} \cdot R0 & C_{5,5} \cdot R0 \\ C_{0,0} \cdot R1 & C_{1,1} \cdot R1 \ldots + & C_{2,2} \cdot R1 \ldots + & C_{3,3} \cdot R1 \ldots + & C_{4,4} \cdot R1 \ldots + & C_{5,5} \cdot R1 \ldots + \\ & C_{1,0} \cdot R0 & C_{2,1} \cdot R0 & C_{3,2} \cdot R0 & C_{4,3} \cdot R0 & C_{5,4} \cdot R0 \\ C_{0,0} \cdot R2 & C_{1,1} \cdot R2 \ldots + & C_{2,2} \cdot R2 \ldots + & C_{3,3} \cdot R2 \ldots + & C_{4,4} \cdot R2 \ldots + & C_{5,5} \cdot R2 \ldots + \\ & C_{1,0} \cdot R1 & C_{2,1} \cdot R1 \ldots + & C_{3,2} \cdot R1 \ldots + & C_{4,3} \cdot R1 \ldots + & C_{5,4} \cdot R1 \ldots + \\ & & C_{2,0} \cdot R0 & C_{3,1} \cdot R0 & C_{4,2} \cdot R0 & C_{5,3} \cdot R0 \\ C_{0,0} \cdot R3 & C_{1,1} \cdot R3 \ldots + & C_{2,2} \cdot R3 \ldots + & C_{3,3} \cdot R3 \ldots + & C_{4,4} \cdot R3 \ldots + & C_{5,5} \cdot R3 \ldots + \\ & C_{1,0} \cdot R2 & C_{2,1} \cdot R2 \ldots + & C_{3,2} \cdot R2 \ldots + & C_{4,3} \cdot R2 \ldots + & C_{5,4} \cdot R2 \ldots + \\ & & C_{2,0} \cdot R1 & C_{3,1} \cdot R1 \ldots + & C_{4,2} \cdot R1 \ldots + & C_{5,3} \cdot R1 \ldots + \\ & & & C_{3,0} \cdot R0 & C_{4,1} \cdot R0 & C_{5,2} \cdot R0 \\ C_{0,0} \cdot R4 & C_{1,1} \cdot R4 \ldots + & C_{2,2} \cdot R4 \ldots + & C_{3,3} \cdot R4 \ldots + & C_{4,4} \cdot R4 \ldots + & C_{5,5} \cdot R4 \ldots + \\ & C_{1,0} \cdot R3 & C_{2,1} \cdot R3 \ldots + & C_{3,2} \cdot R3 \ldots + & C_{4,3} \cdot R3 \ldots + & C_{5,4} \cdot R3 \ldots + \\ & & C_{2,0} \cdot R2 & C_{3,1} \cdot R2 \ldots + & C_{4,2} \cdot R2 \ldots + & C_{5,3} \cdot R2 \ldots + \\ & & & C_{3,0} \cdot R1 & C_{4,1} \cdot R1 \ldots + & C_{5,2} \cdot R1 \ldots + \\ & & & & C_{4,0} \cdot R0 & C_{5,1} \cdot R0 \end{bmatrix}$$

In some embodiments, finite difference equations calculate a table of polynomial values from initial register values and a driving sequence made from the regularly spaced independent variable. This is so for any polynomial. The boundary values of a collection of finite difference expressions are the bottom rows of the above matrices. Boundary values are linear transformations of initial values. Initial register values can likewise be obtained from boundary values. For example, a driving sequence and initial register values {R0, R1, R2} can be found to completely generate the classical "table of cubes".

Example V: Calculating a Table of Cubes

Specifically, initial, simultaneous values $\{R0_0, R1_0, R2_0, R3_0\}$ can be found from boundary values represented by the sequence of integer cubes $\{-1^3, 0^3, 1^3, 2^3\}$. The finite difference equations in matrix form for this problem are shown in Table XI.

TABLE XI $$R0 \cdot \begin{bmatrix} C_{0,0} & C_{1,1} & C_{2,2} & C_{3,3} \\ \blacksquare & C_{1,0} & C_{2,1} & C_{3,2} \\ \blacksquare & \blacksquare & C_{2,0} & C_{3,1} \\ \blacksquare & \blacksquare & \blacksquare & C_{3,0} \end{bmatrix} + R1 \cdot \begin{bmatrix} \blacksquare & \blacksquare & \blacksquare & \blacksquare \\ C_{0,0} & C_{1,1} & C_{2,2} & C_{3,3} \\ \blacksquare & C_{1,0} & C_{2,1} & C_{3,2} \\ \blacksquare & \blacksquare & C_{2,0} & C_{3,1} \end{bmatrix} + R2 \cdot \begin{bmatrix} \blacksquare & \blacksquare & \blacksquare & \blacksquare \\ \blacksquare & \blacksquare & \blacksquare & \blacksquare \\ C_{0,0} & C_{1,1} & C_{2,2} & C_{3,3} \\ \blacksquare & C_{1,0} & C_{2,1} & C_{3,2} \end{bmatrix} + R3 \cdot \begin{bmatrix} \blacksquare & \blacksquare & \blacksquare & \blacksquare \\ \blacksquare & \blacksquare & \blacksquare & \blacksquare \\ \blacksquare & \blacksquare & \blacksquare & \blacksquare \\ C_{0,0} & C_{1,1} & C_{2,2} & C_{3,3} \end{bmatrix} = \begin{bmatrix} \blacksquare & \blacksquare & \blacksquare & \blacksquare \\ \blacksquare & \blacksquare & \blacksquare & \blacksquare \\ \blacksquare & \blacksquare & \blacksquare & \blacksquare \\ (-1)^3 & 0^3 & 1^3 & 2^3 \end{bmatrix}$$

Any one of the classical techniques may be used to solve for $\{R0_0, R1_0, R2_0, R3_0\}$. For example: R3 is first obtained; the remaining $\{R2 \ldots R0\}$ are then obtained by recursive substitution. In the table below, the initial value vector $[R0 \ldots R3]$ has its entries framed. The table is filled forward from initial values, adding from above and placing to the right. It is filled out backward, by subtracting above and left, and placing to the left. Polynomial equations are then fitted to the points $\{R0 \ldots R1 \ldots R2 \ldots R3\}$. Inspection and the vanishing of first derivatives provide the x-values of each polynomial's axis of horizontal symmetry (and anti-symmetry). The results of this process are shown in Table XII.

TABLE XII $$\begin{bmatrix} R0 = \dfrac{2^3 - C_{3,3} \cdot R3 - C_{3,2} \cdot R2 - C_{3,1} \cdot R1}{C_{3,0}} = 6 \\ R1 = \dfrac{1^3 - C_{2,2} \cdot R3 - C_{2,1} \cdot R2}{C_{2,0}} = 0 \\ R2 = \dfrac{0^3 - R3 \cdot C_{1,1}}{C_{1,0}} = 1 \\ R3 = \dfrac{(-1)^3}{C_{0,0}} = -1 \end{bmatrix} \begin{bmatrix} \blacksquare & \blacksquare & x=-1 & x=0 & x=1 & x=2 & x=3 & x=4 & x=5 & \text{Equation} & \text{Axis\_of} \\ 6 & 6 & \boxed{6} & 6 & 6 & 6 & \blacksquare & \blacksquare & \blacksquare & y=6 & \text{Symmetry} \\ -12 & -6 & \boxed{0} & 6 & 12 & 18 & 24 & \blacksquare & \blacksquare & y=6 \cdot x + 6 & x=-1 \\ 19 & 7 & \boxed{1} & 1 & 7 & 19 & 37 & 61 & \blacksquare & y=3 \cdot x^2 + 3 \cdot x + 1 & x=-\dfrac{1}{2} \\ -27 & -8 & \boxed{-1} & 0 & 1 & 8 & 27 & 64 & 125 & y=x^3 & x=0 \end{bmatrix}$$

Figure 17:
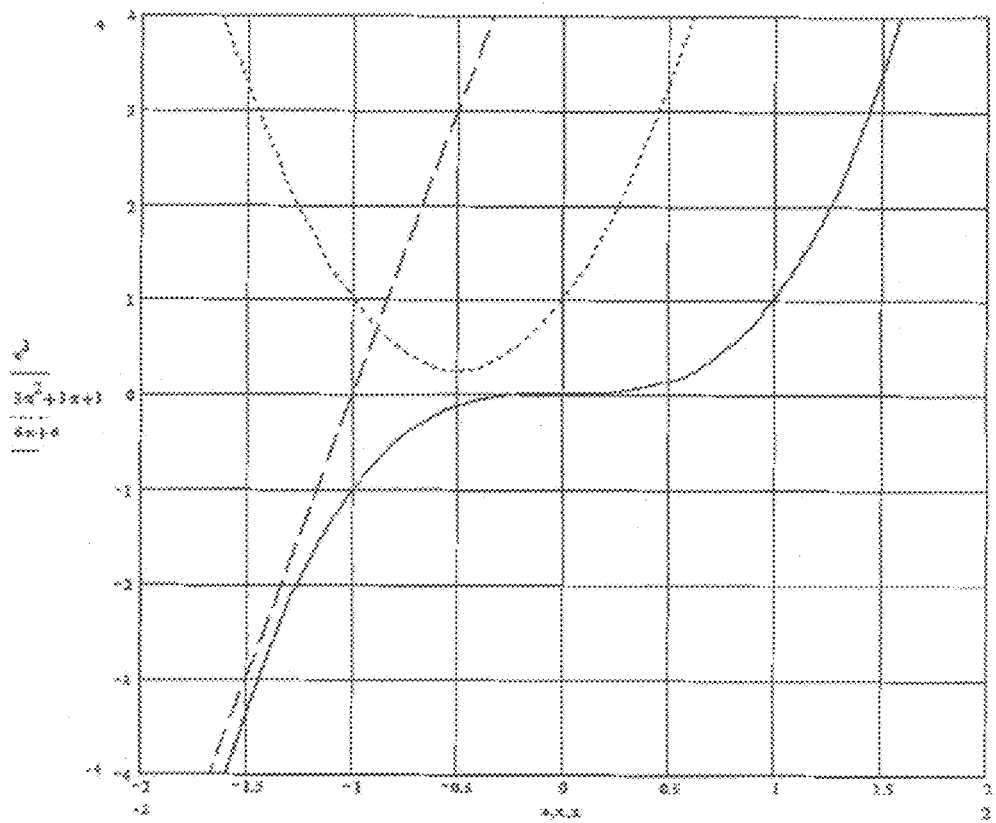
FIG. 17 is a graph which illustrates successive register levels of a device in accordance with a representative embodiment of the present invention.

Each successive register level increases the order of its fitted polynomial by one. This is so because of the implied presence of compounding factor r. This likewise implies that even register levels contain even polynomial functions and odd register levels have odd polynomial functions (with respect to their axes of horizontal symmetry). Suppose, for example, the left side of the driving sequence is inverted. The {R0} driving sequence is then changed from an even function to an odd function; a like change to all other levels follows. Even levels will contain odd functions and odd levels will contain even functions. The axis of horizontal symmetry of each level is the start of phase displacement. Each successive register level advances its phase by a half step, as shown in the graph of FIG. 17.

A second way to build a table of cubes is to build it inductively from the table of squares. The cube of zero is the initial value for R3. The axis of horizontal symmetry of {R3} replaces the axis of {R2} at zero. This necessitates a right shift of lower registers a half-step, and a linear scaling to obtain proper table values. The table of cubes appears on the right of the table of squares shown in Table XIII.

TABLE XIII $$\begin{bmatrix} 2 & 2 & 2 & 2 & 2 & 2 & \blacksquare \\ -5 & -3 & -1 & 1 & 3 & 5 & \blacksquare \\ 9 & 4 & 1 & 0 & 1 & 4 & 9 \end{bmatrix} \quad \begin{bmatrix} -2 & -2 & -2 & 2 & 2 & 2 & \blacksquare \\ 5 & 3 & 1 & 1 & 3 & 5 & \blacksquare \\ -9 & -4 & -1 & 0 & 1 & 4 & 9 \end{bmatrix} \quad \begin{bmatrix} 6 & 6 & 0 & 6 & 6 & 6 & 6 & \blacksquare & \blacksquare \\ -18 & -12 & -6 & 0 & 6 & 12 & 18 & \blacksquare & \blacksquare \\ 37 & 19 & 7 & 1 & 1 & 7 & 19 & 37 & \blacksquare \\ -64 & -27 & -8 & -1 & 0 & 1 & 8 & 27 & 64 \end{bmatrix}$$

| Table of Squares Even Driving Sequence | Table of Squares Odd Driving Sequence | Table of Cubes Even Driving Sequence |

The finite differences expressions of the compound interest example provide the answer of how to move a fractional step. Specifically, the sequence element $RN_k$ has addend $Rate*RN-1_{k-1}$ and augend $RN_{k-1}$. To advance a half-step is to perform half of the register pair additions of the step, twice, with Rate=½. "Half-Evens to Odds Yields Odds, THEN, Half-Odds to Evens Yields Evens." Phase is preserved across register pairs during this operation. This technique is displayed in the above example.

Geometry of Synchronized Phase

The geometry which preserves phase across increasing register levels is named the geometry of synchronized phase, shown in Table XIV. Initial register pair values in the above example conform to that geometry.

TABLE XIV $$\begin{bmatrix} C_{0,0} \cdot R0 & C_{1,1} \cdot R0 & C_{2,2} \cdot R0 & C_{3,3} \cdot R0 & C_{4,4} \cdot R0 & C_{5,5} \cdot R0 \\ R1 & C_{0,0} \cdot R1 \ldots + & C_{1,1} \cdot R1 \ldots + & C_{2,2} \cdot R1 \ldots + & C_{3,3} \cdot R1 \ldots + & C_{4,4} \cdot R1 \ldots + \\ & C_{1,0} \cdot R0 & C_{2,1} \cdot R0 & C_{3,2} \cdot R0 & C_{4,3} \cdot R0 & C_{5,4} \cdot R0 \\ \blacksquare & C_{0,0} \cdot R2 & C_{1,1} \cdot R2 \ldots + & C_{2,2} \cdot R2 \ldots + & C_{3,3} \cdot R2 \ldots + & C_{4,4} \cdot R2 \ldots + \\ & & C_{1,0} \cdot R1 \ldots + & C_{2,1} \cdot R1 \ldots + & C_{3,2} \cdot R1 \ldots + & C_{4,3} \cdot R1 \ldots + \\ & & C_{2,0} \cdot R0 & C_{3,1} \cdot R0 & C_{4,2} \cdot R0 & C_{5,3} \cdot R0 \\ \blacksquare & R3 & C_{0,0} \cdot R3 \ldots + & C_{1,1} \cdot R3 \ldots + & C_{2,2} \cdot R3 \ldots + & C_{3,3} \cdot R3 \ldots + \\ & & C_{1,0} \cdot R2 & C_{2,1} \cdot R2 \ldots + & C_{3,2} \cdot R2 \ldots + & C_{4,3} \cdot R2 \ldots + \\ & & & C_{2,0} \cdot R1 \ldots + & C_{3,1} \cdot R1 \ldots + & C_{4,2} \cdot R1 \ldots + \\ & & & C_{3,0} \cdot R0 & C_{4,1} \cdot R0 & C_{5,2} \cdot R0 \\ \blacksquare & \blacksquare & C_{0,0} \cdot R4 & C_{1,1} \cdot R4 \ldots + & C_{2,2} \cdot R4 \ldots + & C_{3,3} \cdot R4 \ldots + \\ & & & C_{1,0} \cdot R3 \ldots + & C_{2,1} \cdot R3 \ldots + & C_{3,2} \cdot R3 \ldots + \\ & & & C_{2,0} \cdot R2 & C_{3,1} \cdot R2 \ldots + & C_{4,2} \cdot R2 \ldots + \\ & & & & C_{3,0} \cdot R1 \ldots + & C_{4,1} \cdot R1 \ldots + \\ & & & & C_{4,0} \cdot R0 & C_{5,1} \cdot R0 \end{bmatrix}$$

$$RN_k = \sum_{j=0}^{N} C_{k-int(\frac{N-j+1}{2}),j} \cdot R(N-j) \text{ for } k \geq \frac{N}{2}$$

Combinatorial Coefficients and Single Element Formula for Synchronized Geometry

The pattern of the synchronized geometry involves even/odd register pairs. In some embodiments, renumbering subsequent pairs to account for the half-step shift each register level is necessary to preserve phase in the generating formula.

Forward finite difference expressions in the synchronized geometry may be written for the mth term to the right of the initial values. These expressions are shown in Table XV.

TABLE XV $$\begin{bmatrix} R0_{new} & - & - & R0 & - & - \\ R1_{new} & - & - & R1 & - & - \\ R2_{new} & - & - & - & R2 & - \\ R3_{new} & - & - & - & R3 & - \\ R4_{new} & - & - & - & - & R4 \\ R5_{new} & - & - & - & - & R5 \end{bmatrix} \begin{matrix} R0new = C_{m,0} \cdot R0 \\ R1new = C_{m-1,0} \cdot R1 + C_{m,1} \cdot R0 \\ R2new = C_{m,0} \cdot R2 + C_{m,1} \cdot R1 + C_{m+1,2} \cdot R0 \\ R3new = C_{m-1,0} \cdot R3 + C_{m,1} \cdot R2 + C_{m,2} \cdot R1 + C_{m+1,3} \cdot R0 \\ R4new = C_{m,0} \cdot R4 + C_{m,1} \cdot R3 + C_{m+1,2} \cdot R2 + C_{m+1,3} \cdot R1 + C_{m+2,4} \cdot R0 \\ R5new = C_{m-1,0} \cdot R5 + C_{m,1} \cdot R4 + C_{m,2} \cdot R3 + C_{m+1,3} \cdot R2 + C_{m+1,4} \cdot R1 + C_{m+2,5} \cdot R0 \end{matrix}$$

Forward Finite Difference Expressions for the mth term

The vanishing of binomial coefficients for N>m in the generating formula expresses that for each register pair added to the integration level, two more points in the full wave are required (m must be incremented by 2 each additional integration level).

Stepwise expressions of forward finite differences are shown in Table XVI.

TABLE XVI $$\begin{bmatrix} R0 & R0 & R0 & R0 & R0 & R0 \\ R1 & R0+R1 & 2 \cdot R0+R1 & 3 \cdot R0+R1 & 4 \cdot R0+R1 & 5 \cdot R0+R1 \\ - & R2 & R0+R1+R2 & 3 \cdot R0+2 \cdot R1+R2 & 6 \cdot R0+3 \cdot R1+R2 & 10 \cdot R0+4 \cdot R1+R2 \\ - & R3 & R2+R3 & R0+R1+2 \cdot R2+R3 & 4 \cdot R0+3 \cdot R1+3 \cdot R2+R3 & 10 \cdot R0+6 \cdot R1+4 \cdot R2+R3 \\ - & - & R4 & R2+R3+R4 & R0+R1+3 \cdot R2+2 \cdot R3+R4 & 5 \cdot R0+4 \cdot R1+6 \cdot R2+3 \cdot R3+R4 \\ - & - & R5 & R4+R5 & R2+R3+2 \cdot R4+R5 & R0+R1+4 \cdot R2+3 \cdot R3+3 \cdot R4+R5 \end{bmatrix}$$

Forward Finite Difference Expressions

Similar expressions appear for backward finite differences, as shown in Table XVII.

TABLE XVII $$\begin{bmatrix} -R0 & -R0 & R0 & - & - \\ (R1+2R0) & R1+R0 & R1 & - & - \\ R2-3R1-3R0 & (R2-2R1-R0) & R2-R1 & R2 & - \\ R3-3R2+6R1+4R0 & R3-2R2+3R1+R0 & R3-R2+R1 & R3 & - \\ R4-4R3+6R2-10R1-5R0 & R4-3R3+3R2-4R1-R0 & R4-2R3+R2-R1 & R4-R3 & R4 \\ R5-4R4+10R3-10R2+15R1+6R0 & R5-3R4+6R3-4R2+5R1+R0 & R5-2R4+3R3-R2+R1 & R5-R4+R3 & (R5) \end{bmatrix}$$

$$\begin{bmatrix} R0_{new} & - & - & R0 & - & - \\ R1_{new} & - & - & R1 & - & - \\ R2_{new} & - & - & - & R2 & - \\ R3_{new} & - & - & - & R3 & - \\ R4_{new} & - & - & - & - & R4 \\ R5_{new} & - & - & - & - & R5 \end{bmatrix} \begin{matrix} R0new = C_{m-1,0} \cdot (-R0) \\ R1new = C_{m,0} \cdot R1 - C_{m,1} \cdot (-R0) \\ R2new = C_{m-1,0} \cdot R2 - C_{m,1} \cdot R1 + C_{m,2} \cdot (-R0) \\ R3new = C_{m,0} \cdot R3 - C_{m,1} \cdot R2 + C_{m+1,2} \cdot R1 - C_{m+1,3} \cdot (-R0) \\ R4new = C_{m-1,0} \cdot R4 - C_{m,1} \cdot R3 + C_{m,2} \cdot R2 - C_{m+1,3} \cdot R1 + C_{m+1,4} \cdot (-R0) \\ R5new = C_{m,0} \cdot R5 - C_{m,1} \cdot R4 + C_{m+1,2} \cdot R3 - C_{m+1,3} \cdot R2 + C_{m+2,4} \cdot R1 - C_{m+2,5} \cdot (-R0) \end{matrix}$$

Backward Finite Difference Expressions and Their Combinatorial Coefficients

Alternating the Driving Sequence

As shown above, forward finite differences have been formed by successively applying a matrix transformation of Equation IV to a vector of initial values. The result is a driving sequence of constants. However, suppose that after m applications of this matrix, a matrix of opposites is applied as shown in Equation XII.

$$\begin{bmatrix} -1 & 0 & \cdots & 0 & 0 \\ -1 & -1 & & 0 & 0 \\ \vdots & & \ddots & & \vdots \\ 0 & 0 & \cdots & -1 & 0 \\ 0 & 0 & & -1 & -1 \end{bmatrix} \quad \text{Equation XII}$$

The effect is to reverse henceforth the sign of the driving sequence. The phenomenon of generating a balanced wave will be propagated throughout the system of finite difference equations. This phenomenon may additionally need to be parameterized.

The process of parameterization begins developing the driving sequence of the cosine wave. Let m the number of times a positive matrix is applied, before applying the opposite, negative matrix once. Further, let w be the number of points in a complete wave. Further still, let d be the number of alterations, or half-cycles desired, in the wave of w points. Thus, w=m*d.

The driving sequence of a sine wave is similar, except for a displacement. Therefore, m must be an even number. Then m/2 applications of the positive matrix are followed by m/2 applications of the opposite matrix. A wave of w points still has w=m*d.

An alternating driving sequence perfectly defines a square wave in $\{R0_k\}$ using forward finite differences. In some embodiments, the cosine square wave of the example, having w=4, m=2, and d=2 is generated by in successive applications of $$\begin{bmatrix} 1 & 0 \\ 1 & 1 \end{bmatrix}$$

followed by m applications of $$\begin{bmatrix} -1 & 0 \\ -1 & -1 \end{bmatrix}.$$

The alternating driving sequence is realized through a R0 register adjustment. Specifically, an R0 adjustment (twice the last value with opposite sign) is what toggles the driving sequence. This adjustment sets the pattern for all RN register adjustments. An adjustment is placed at the turning point of an interval to ensure that the finite difference additions give a balanced value for the end point of the interval. One may visualize that the adjustment at a turning point compensates for that portion of the step spent in traveling beyond the data point to an imaginary reflecting barrier, and back again. Adjustments fit into the scheme of adding finite differences. Adjustments $\{X_k\}$ are applied to registers using matrix addition in this enhanced definition of the forward finite differences method, shown as Equation XIII.

$$\begin{bmatrix} 1 & 0 & 0 & 0 & 0 & 0 \\ 1 & 1 & 0 & 0 & 0 & 0 \\ 0 & 1 & 1 & 0 & 0 & 0 \\ 0 & 0 & 1 & 1 & 0 & 0 \\ 0 & 0 & 0 & 1 & 1 & 0 \\ 0 & 0 & 0 & 0 & 1 & 1 \end{bmatrix} \begin{bmatrix} R0_k \\ R1_k \\ R2_k \\ R3_k \\ R4_k \\ R5_k \end{bmatrix} + \begin{bmatrix} X0_k \\ X1_k \\ X2_k \\ X3_k \\ X4_k \\ X5_k \end{bmatrix} = \begin{bmatrix} R0_{k+1} \\ R1_{k+1} \\ R2_{k+1} \\ R3_{k+1} \\ R4_{k+1} \\ R5_{k+1} \end{bmatrix} \quad \text{Equation XIII}$$

Design Principles for Waves in Finite Differences

Some principles of generating sinusoidal waves from a system of finite differences expressions may now be deduced. The first governing principle is that every wave in a register level must be zero mean. Second, the wave in every register level must be opposite from the wave in adjacent levels. Sine functions oppose cosine functions; therefore, cosine and sine will alternate in ascending register levels. This was seen in the exponential compounding example. Third, initial values of registers are calculated at axes of horizontal symmetry. This was done previously in the table of cubes example.

The cosine function over a half-cycle resembles its driving function. The trough of a cosine wave at the beginning of a half-cycle must equal the negative of its peak at the end of the half-cycle. A cosine wave can be built in the odd registers $\{R2N-1\}$. For a half-cycle of m steps, $\{R2N-1\}_0=-\{R2N-1\}_m$. The sum of forward differences must oppose the initial value exactly. Suiting this choice requires that the initial value of $\{R2N\}$ must be half of register level $\{R2N-1\}$ (the first step must balance across zero). This is the method for finding the initial values of cosine waves.

The sine function over a half-cycle requires a balanced driving sequence. Parameter m must be an even number. Sine waves lag cosine waves half a half-cycle; the odd registers are zero. Even registers are cosine functions, and are obtained as previously, using initial and endpoint values. Both calculations are shown in the table XVIII. ✓

TABLE XVIII $$\begin{bmatrix} R1\text{new} & -R1 = C_{m-1,0} \cdot & R1 = -\dfrac{w}{2 \cdot d} \cdot R0 \\ & R1\ldots + & \\ & C_{m,1} \cdot R0 & \\ R2\text{new} & -R2 = C_{m,0} \cdot & R2 = -\dfrac{w}{4 \cdot d} \cdot R0 \\ & R2\ldots + & \\ & C_{m,1} \cdot & \\ & R1\ldots + & \\ & C_{m+1,2} \cdot R0 & \\ R3\text{new} & -R3 = C_{m-1,0} \cdot & R3 = \dfrac{w \cdot (w^2 + 2 \cdot d^2)}{24 \cdot d^3} \cdot R0 \\ & R3\ldots + & \\ & C_{m,1} \cdot & \\ & R2\ldots + & \\ & C_{m,2} \cdot & \\ & R1\ldots + & \\ & C_{m+1,3} \cdot R0 & \end{bmatrix}$$

TABLE XVIII-continued $$\begin{vmatrix} R4\text{new} & -R4 = C_{m,0} \cdot & R4 = \frac{w \cdot (w^2 + 2 \cdot d^2)}{24 \cdot d^3} \cdot R0 \\ & R4\ldots + & \\ & C_{m,1} \cdot & \\ & R3\ldots + & \\ & C_{m+1,2} \cdot & \\ & R2\ldots + & \\ & C_{m+1,3} \cdot & \\ & R1\ldots + & \\ & C_{m+2,4} \cdot R0 & \\ R5\text{new} & -R5 = C_{m-1,0} \cdot & R5 = \frac{-2 \cdot w^5 - 5 \cdot w^3 \cdot d^2 - 8 \cdot w \cdot d^4}{480 \cdot d^5} \cdot R0 \\ & R5\ldots + & \\ & C_{m,1} \cdot & \\ & R4\ldots + & \\ & C_{m,2} \cdot & \\ & R3\ldots + & \\ & C_{m+1,3} \cdot & \\ & R2\ldots + & \\ & C_{m+1,4} \cdot & \\ & R1\ldots + & \\ & C_{m+2,5} \cdot R0 & \\ - & - & - \end{vmatrix}$$

$$\begin{bmatrix} R1\text{new} & R1 = 0 & R1 = 0 \\ R2\text{new} & -R2 = C_{m,0} \cdot R2\ldots + & R2 = -\frac{w^2}{8 \cdot d^2} \cdot R0 \\ & C_{m,1} \cdot (R1 = 0)\ldots + & \\ & C_{m+1,2} \cdot R0 \ldots + & \\ & C_{\frac{m}{2}+1,2} \cdot (-2 \cdot R0) & \\ - & - & - \\ R3\text{new} & R3 = 0 & R3 = 0 \\ - & - & - \\ R4\text{new} & -R4 = C_{m,0} \cdot R4\ldots + & R4 = w \cdot (w+d) \cdot \\ & C_{m+1,2} \cdot R2\ldots + & \frac{(w^2 - 2 \cdot w \cdot d + 4 \cdot d^2)}{96 \cdot d^4} \cdot R0 \\ & C_{m+2,4} \cdot R0 & \\ - & - & - \\ R5\text{new} & R5 = 0 & R5 = 0 \end{bmatrix}$$

Initial Values To Place Cosine and Sine Waves in Odd Registers

Parameters of Cosine and Sine Waves

The square wave example, above, has a driving sequence of a cosine wave, represented in Equation XIV.

$$\{f(x) = \begin{cases} R0, & 0 < x < m/2 \\ -R0, & m/2 < x < m \end{cases} \text{ (integral } x \text{ and even } m\text{)}. \quad \text{Equation XIV}$$

The integral of such a step function in R0 is a linear function in R1. The variables w (wavelength), d (half-cycles), and m (number of points per half-cycle) are defined as: d=half-cycles in the ensemble, wherein generating full cycles requires that d be even; m=integral number of points per half-cycle; and w=number of data points in a complete period.

When the driving sequence alternates in a perfectly regular manner, the equation w=m*d is satisfied. The variables m and w coincide whenever there is a whole number of points per half-cycle. The turning point of the R1 graph coincides with the first opposing point of the driving sequence, −R0. The average of values in both R0 and R1 over m steps is zero (because they are zero mean). That causes the maximum and minimum values attained by R1 to occur at these turning points. This characterizes a cosine wave. The magnitude and length of the driving sequence can be worked backward to find the maximum and minimum R1 displacement in a period. The wave's symmetry means that the trough of a wave is exactly opposite its peak that is, $R1_m=-R1_0$. Since $R1_m=R1_0+m*R0$, the initial value of R1 is $$R1_0 = \frac{-m}{2} * R0.$$

A sine wave can be similarly generated by the same driving sequence, except that the beginning step $R1_0$ and ending step $R1_m$ are placed so that register sequence $\{R1\}_0^m$ is zero mean. Implied is the fact that $R1_m=-R1_0=0$.

When w is a whole number, it coincides with in, and the above expressions are perfect descriptions of the amplitude of a sinusoidal wave. When w becomes a mixed number, w/m is no longer a natural, but a rational number. Another parameter definition is needed. Accordingly, let u=the fractional term of the equation w=m*d+u.

Variable u represents the fraction $$\frac{u}{d}$$

of data points not quite fitting exactly into one half-cycle. A non-zero u will require an adjustment be made to the amplitudes of both cosine and sine waves. Some particulars about these adjustments include: a cosine wave is adjusted so that the initial point of the cosine, compounded through a half-step, is exactly the final value of the register, computed at that partial step, wherein the adjustment is placed in the middle of the half-cycle; an adjustment is found for a sine wave so that the initial value of the sine wave, compounded forward, and the half-cycle final value, compounded backward, is aligned exactly, wherein the adjustment is placed at the forward (right-hand) point of the half-cycle; normal adjustment values are calculated from the first step forward from initial values; and rollover values are computed from the last step—namely, one step backward from the initial values.

Figure 18:
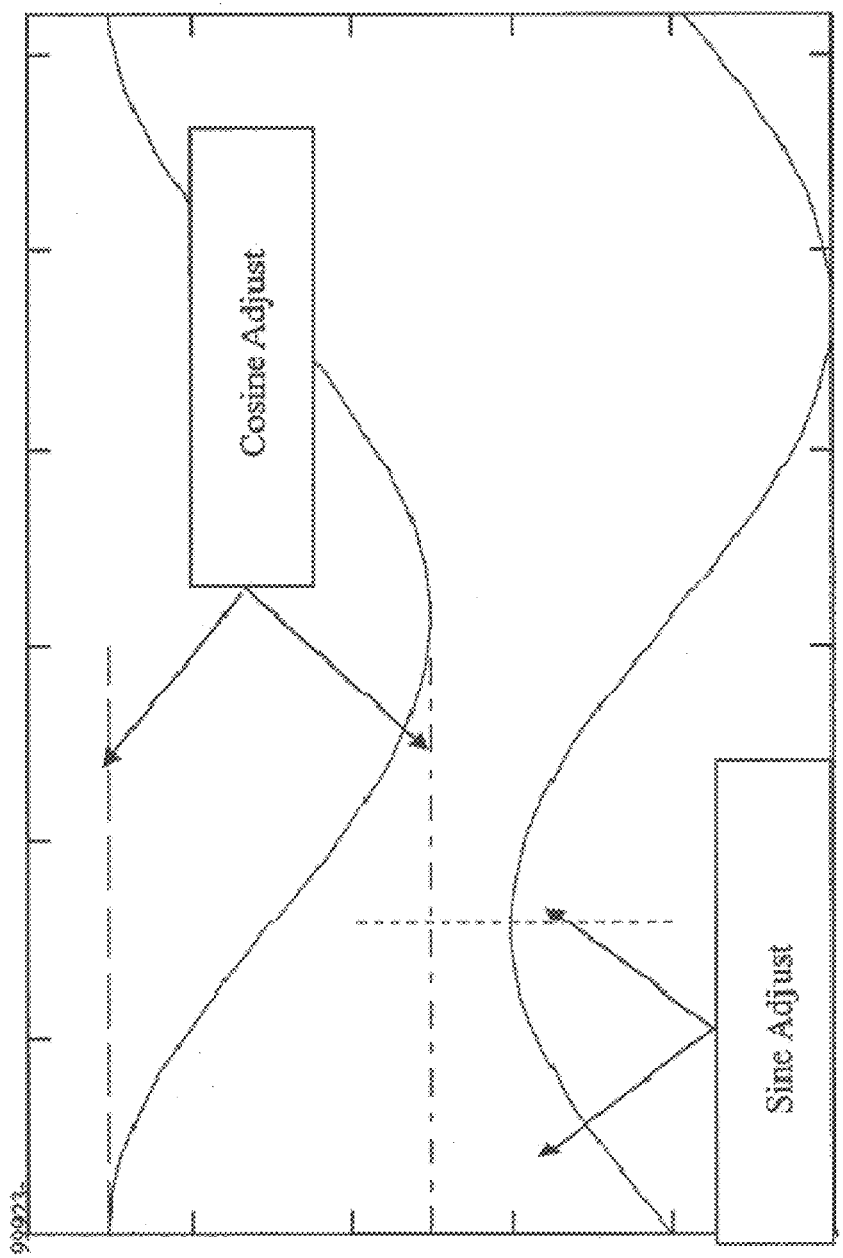
FIG. 18 is a diagram which illustrates how the cosine and sine adjustments are constructed in accordance with a representative embodiment of the present invention.

Referring now to FIG. 18, a diagram is provided which shows how the cosine and sine adjustments are constructed. Register values from the beginnings and ends of cosine half-cycles negotiate a cosine adjustment matching the compounded, combinatorial register values, after a half-cycle, to the contents of the concluding partial step. Likewise, the compounded combinatorials from the beginnings and ends of sine half-cycles negotiate an adjustment to align themselves to each other.

Rollover and Step Skipping

In expressions involving the combinatorial coefficients, $$\frac{w-u}{d}$$

can be substituted for m

Thus, $$m + \frac{u}{d}$$

is a mixed number expressing the fractional number of points per half cycle. Adding the fractional amount $$\frac{u}{d}$$

to compensate for the trip from turning point to the barrier adds amount $$\frac{u}{d}$$

to the wave each half-cycle until the fraction aggregates to be greater or equal to a full step. Another parameter v is needed to express this aggregate. Let $v_0$ be the original displacement and let $v=v_0+\Sigma_{k=0}^{k<d}$ (2u). As such, v is the excess fractional amount accumulated over multiple cycles, reduced by the accumulations from whole (skipped) steps. As would be expected, the turning point expressions vary linearly with v. Address calculations are done this way. After the adjustments represented by the cumulative variable v have been made, the quantity v is rolled over to $v_0$ (modulo 2*d). This situation is referred to as rollover. Since the address of the next data point is incremented by 1, a skipped step always results.

Adjustment Calculation

The cosine driving sequence offers a clue for the starting point of cosine symmetry: v=0. Integral and fractional steps are related by Equation XV.

$$w = m*d + u. \text{ Then } R1_0 = \qquad \text{Equation XV}$$

$$-\frac{w}{2d}*R0 \text{ since the } R1 \text{ sequence is zero mean.}$$

$$R1_m = \frac{w-2u}{2d}R0 \text{ which means that } v = -\frac{2u}{2d}*R0.$$

When enough adjustments have aggregated to a full step, an extra step will be taken to account for them, and $$\frac{v}{2d}$$

will be replaced by $$\frac{v-2d}{2d}.$$

This is the rollover, referred to previously. It is present whenever there are nonzero fractional increments u. The skipped step is made from d−1 increments of value $$\frac{u}{d}*R0.$$

For sine waves, two different driving sequences are needed. Their functional description are provided in Equation XVI (for even m) and Equation XVII (for odd m).

$$f(x) = \begin{cases} R0, \frac{-m}{2} \le x < 0 \\ -R0, 0 \le x \le \frac{m}{2} \end{cases} \text{(integral } x \text{ and even } m\text{)} \qquad \text{Equation XVI}$$

$$f(x) = \qquad \text{Equation XVI}$$

$$\begin{cases} R0, \frac{-m-1}{2} < x < 0 \\ -R0, 0 \le x \le \frac{m-1}{2} \end{cases} \text{(integral } x \text{ and odd } m\text{)}$$

By using different initial values and a different driving sequence, sine waves replace cosine waves in the odd registers, and cosine waves replace sine waves in the even registers.

The calculations are arranged and presented in table form, according to a hierarchy of importance. That hierarchy is:

1.

$$m = \frac{w-u}{d} \text{ and } \frac{m}{2} = \frac{w-u}{2d}$$

for even m and $$m = \frac{w-u}{d} \text{ and } \frac{m}{2} = \frac{w-u+d}{2d}$$

for odd m. These substitutions are made only in the combinatorial expressions;

2. There are five register levels beyond the R0 driving sequence level. These are R1 through R5. The choice of sine or cosine patterns in R1 through R5 is determined by the R0 driving sequence;

3. The driving sequences are constructed from different combinatorial expressions for R0. The initial values, and then the adjustments are calculated from the driving sequences. The signs applied at each register level to the adjustments alternate each half-cycle; and 4. Normal and Rollover Adjustments. When v exceeds 2*d, a rollover adjustment replaces the normal adjustment, allowing for the one skipped step in that half-cycle.

Summary of the Forward Finite Differences Method

The process of "circling the square" has been made discrete by the use of matrices of binomial coefficients. The method of generating sinusoids from a system of linear difference equations has been developed to the point of being able to generate normalized sinusoids of arbitrary amplitude, frequency and phase. A sinusoid is created in each numbered register level. Each level is a sequence of forward finite difference expressions of the level just below. Each level differs from its adjacent level by half a half-cycle and half a step. This means that register pairs lag each other by a single step. Each register level is an integration of the previous level, calculated across an interval, rather than at individual points.

Applications

This section presents an application intended to model particle movement after the method of forward finite differences. The concepts of compounding register levels and reversing the driving sequence comprise the FFD method. Register stacks and ladders are synchronized, binary additions and subtractions. Register stacks move to the right, and register ladders move to the left. Finite differences define a longitudinal direction of movement inside a number field.

In some embodiments there is a transition from software to hardware instantiation. Arrays can become meshes of electrodes, finite differences can be velocities and accelerations, and mathematical results may predict physical outcomes. The essence of modeling is to apply mathematical abstraction to a physical problem. For example, the translation between computer register values and electric currents is realized through digital to analog converters—or sound cards. A sound card channel is a translator from one data point to an electrical current flow at some certain time. Accordingly, in some embodiments a FFD method model particle is configured to flow in an electrical force field. These embodiments are dependent upon time, and therefore three clocks (or timers) are used to measure digital sample lengths, length of time steps, and length of alterations of the driving sequence.

The FFD method represents compounding, and oscillation between opposites. When opposites arise in a uniform, homogeneous field, oscillation and resultant periodic motion occurs. A mathematical square wave is formed, starting with an alternating driving sequence. The FFD method produces numerical values of sinusoidal waveforms. Rectangular pulsed waves are modulated into periodic, exponential waveforms, as multiple register levels of the FFD method synchronize the mathematical compounding operation.

This section presents a use of the method of forward finite differences (FFD) to move particles through an electrostatic and electromagnetic force field. Finite difference methods employ linear compounding, the same method amassing fortunes from consistent, periodic payments. Compounding can occur over both space and time. Finite differences spreadsheets are blueprints of a pattern of how to dig a lake or pile a mountain, starting from a plain.

The method of forward finite differences is a bridge between analog and digital computing. Forward finite differences dictate an array of values in a sinusoidal pattern. Alternatively, a forward finite differences matrix diagrams a network of resistors and power sources. One way to compute an FFD array with an analog computer is to hard-wire the calculation diagram, replacing the initial values vector and driving sequence with resistor arrays and the array itself with wires and nodes. Every spreadsheet value from a table of forward finite differences matches a potential across a resistor. Thus, both digital computing concepts and theorems of circuit analysis could produce the same results by means of complementary methods. Maximum and minimum values of a register level dictate potentials of the individual elements in that level. Periodicity ensures that the final and initial values vectors of finite differences sinusoids are identical. A sinusoid of maximum amplitude is formed in the boundary values vector of each finite differences array.

Serious downstream consequences disturb synchronization and corrupt linear compounding from a change of any register values from those decreed by driving sequence and initial conditions. Every node has an ordered place in an electrical finite differences force field and presents a proportional influence to every other node within that field. Individual node potentials are sums of other node potentials, and the entire net aggregates all the potentials of separate nodes. The finite differences mesh eliminates chaos, in that each node of the web "pulls its own weight", contributing positive influence without arrogating or subverting the influence of any other node. Periodic motion can be synthesized from circles or spirals within that net. Concepts of parallel processing extend the actions of a single node to the entire array. A basis for doing all these things is building a wave model.

Designing a Wave Model

A physical model of the finite difference equations can be a simple one-dimensional array of electrode pairs resembling one of the register levels of the FFD method. Multiple electrodes alleviate the distance effect of the inverse square law. Voltages which match register values in an array translate into the physical distances moved by particles. A particle moves at a velocity proportional to its polarity and the vector sum of forces radiated at adjacent mesh points.

Finite differences forces can cause particles to move counter-intuitively, that is, from lesser to greater concentrations. A charge that attracts a particle when approaching also attracts that particle when the particle has passed; conversely, a charge that repels a particle when approaching will repel that particle from beyond. Forces operate in two directions, producing compressions and rarefactions in a wave. The periodic motion is like a parent pushing a toddler in a swing. The parent decides how long and how hard to push the child, evaluating the weight of the child, the length of ropes, and how high the child is to sail.

Figure 19:
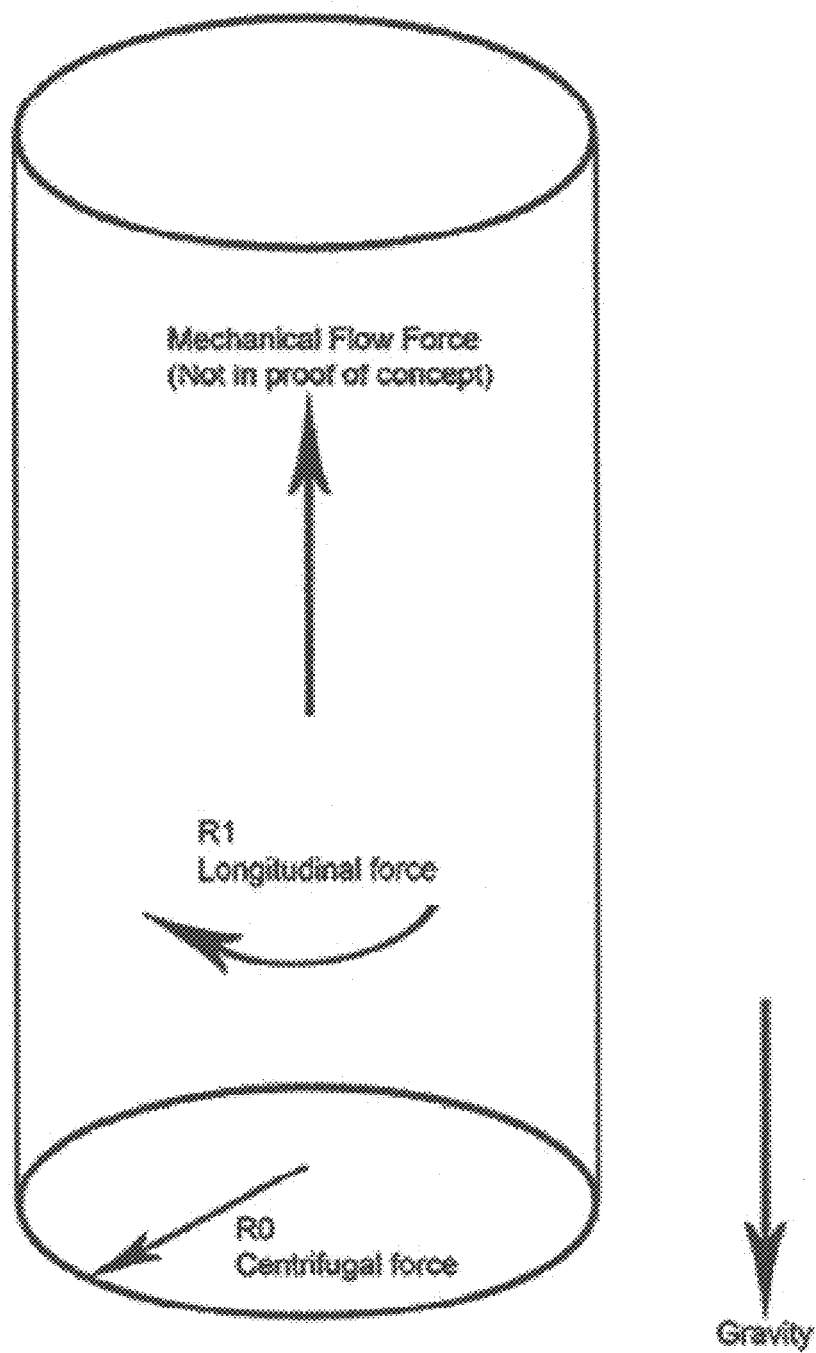
FIG. 19 is a schematic view of a deionization chamber or container in accordance with a representative embodiment of the present invention.
Figure 20:
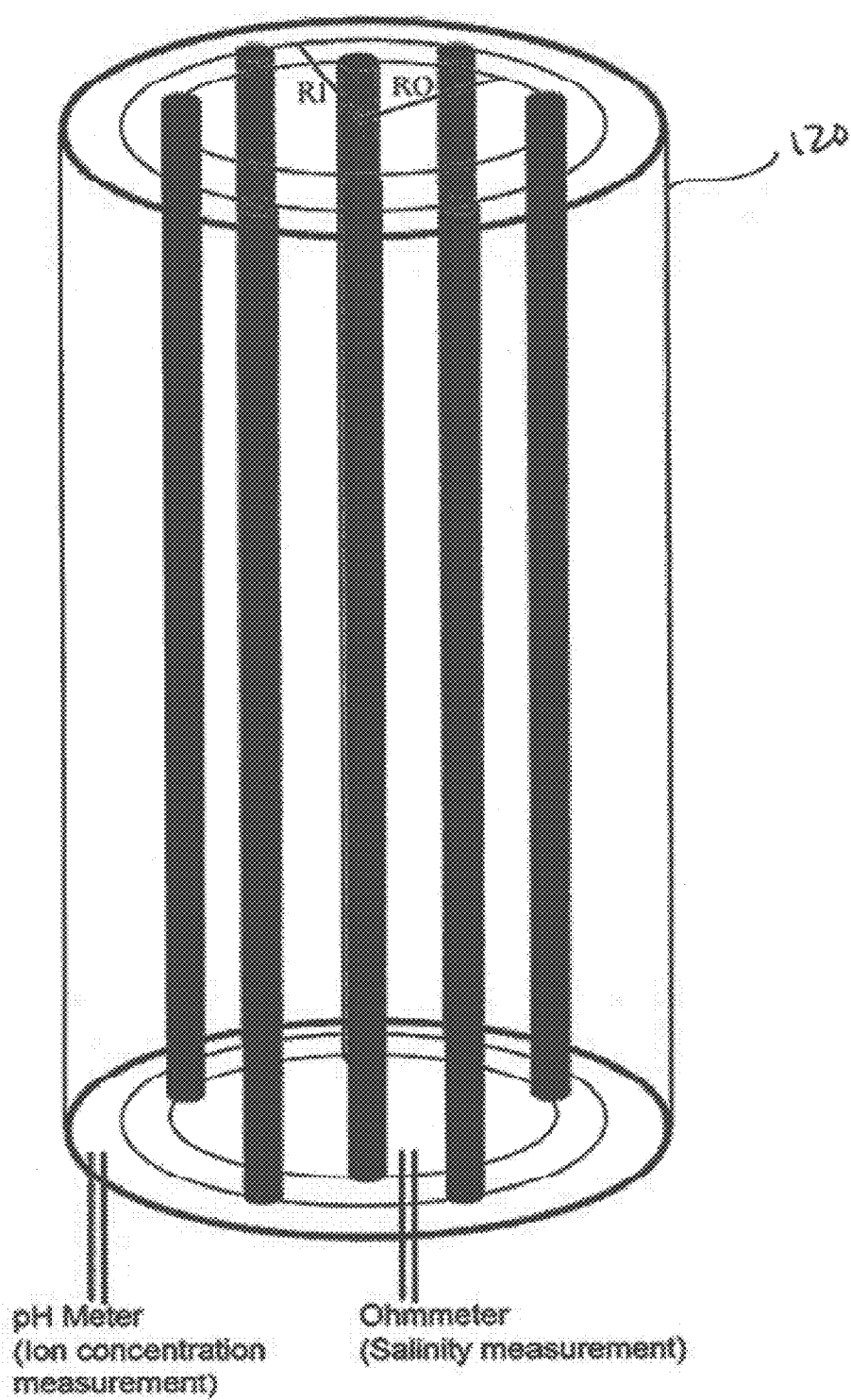
FIG. 20 is a perspective view of a deionization chamber in accordance with a representative embodiment of the present invention.
Figure 21:
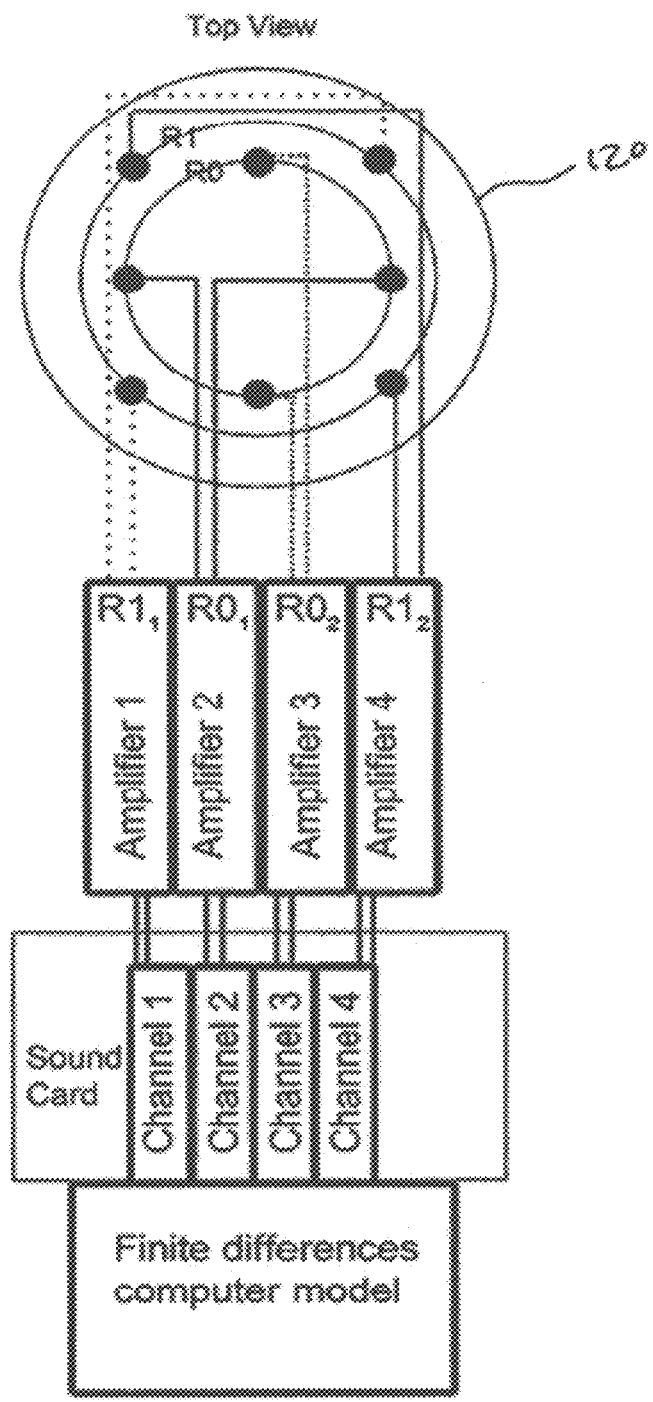
FIGS. 21 and 22 are schematic views illustrating the interaction between the finite differences model and the peripheral hardware of the device of the present invention in accordance with a representative embodiment of the present invention.
Figure 22:
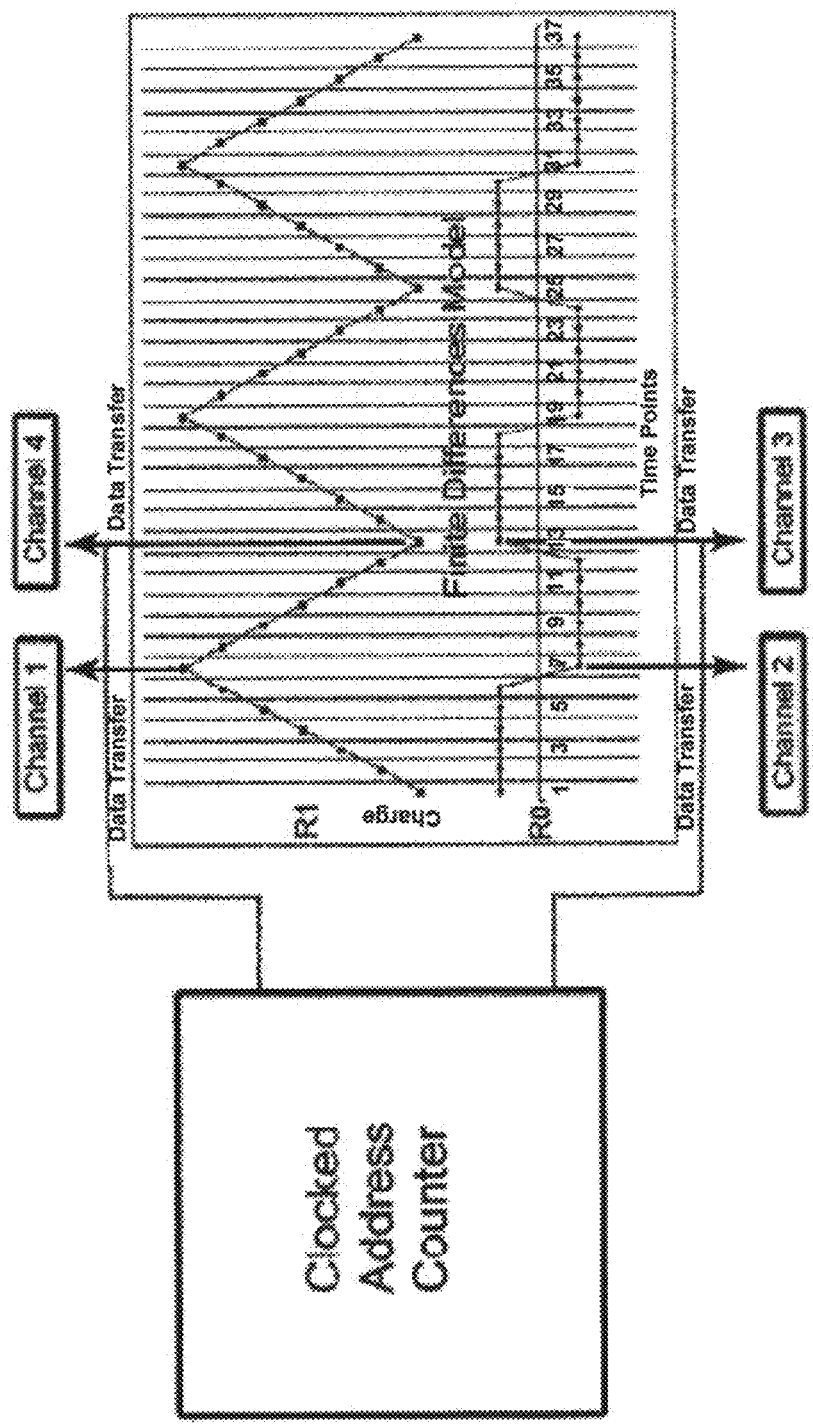
Figure 23:
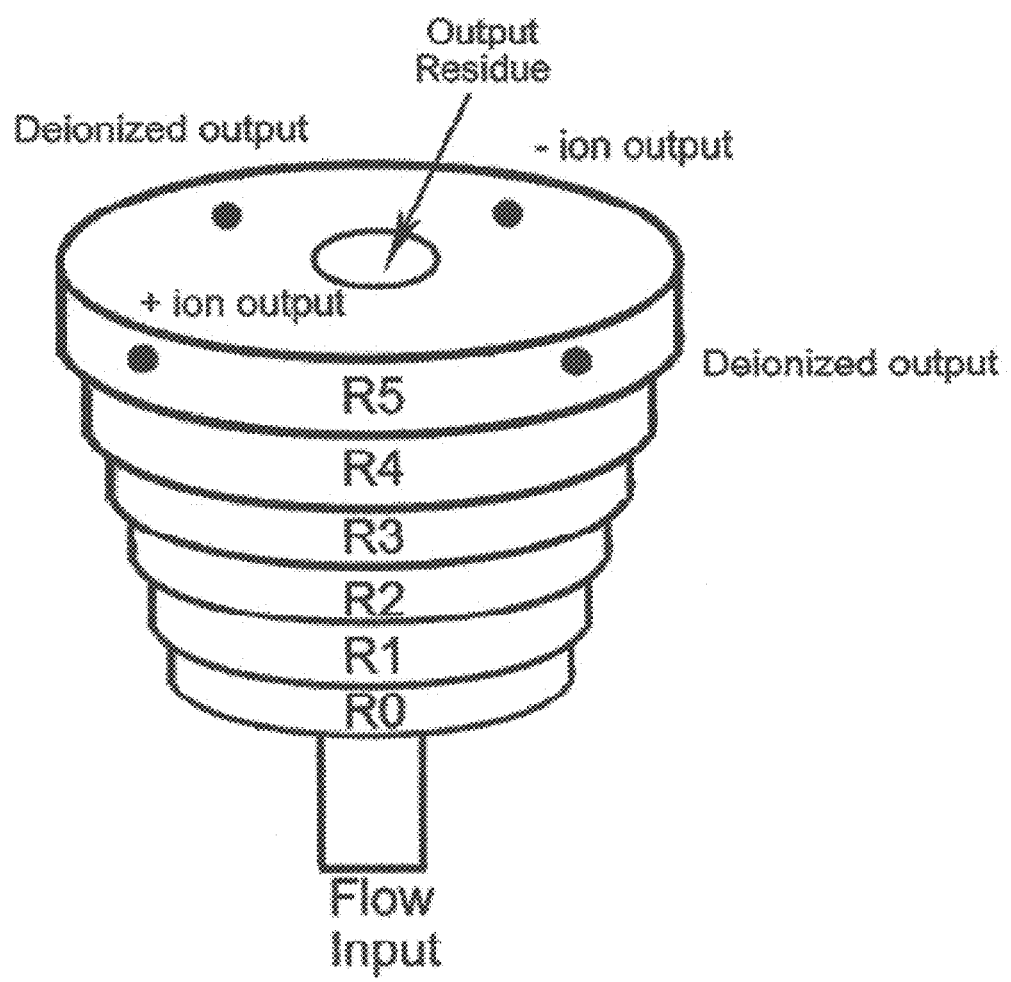
FIG. 23 is a perspective view of adjacent register levels of a deionization chamber in accordance with a representative embodiment of the present invention.
Figure 24:
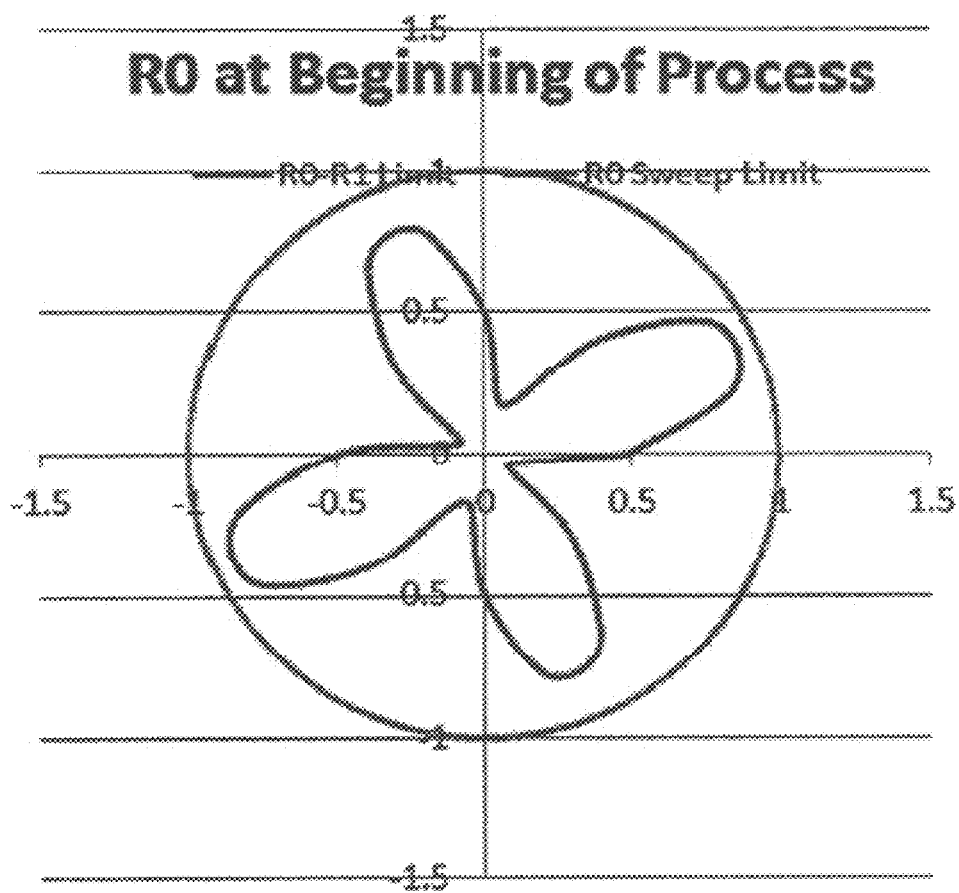
FIG. 24 is a graph of registry level R0 which represents a rotating square wave in accordance with a representative embodiment of the present invention.
Figure 25:
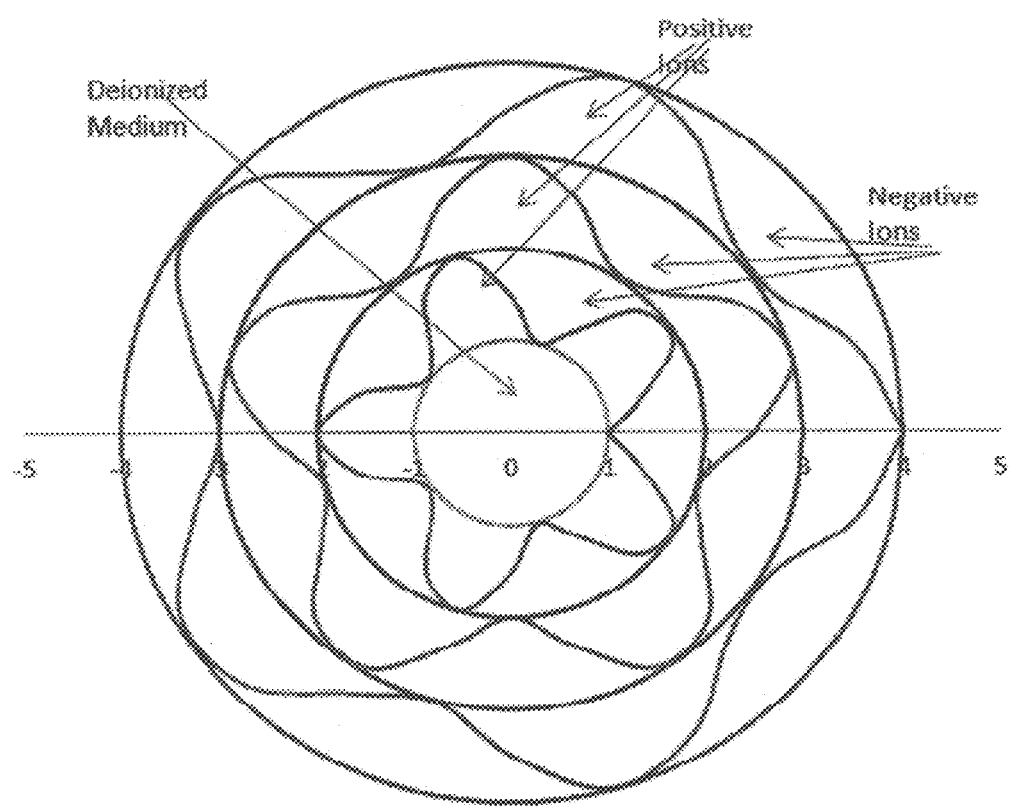
FIG. 25 is a Cartesian graph illustrating the effect of 180 degrees of separation between even/odd register levels above and below for register levels R1 through R4 in accordance with a representative embodiment of the present invention.
Figure 26:
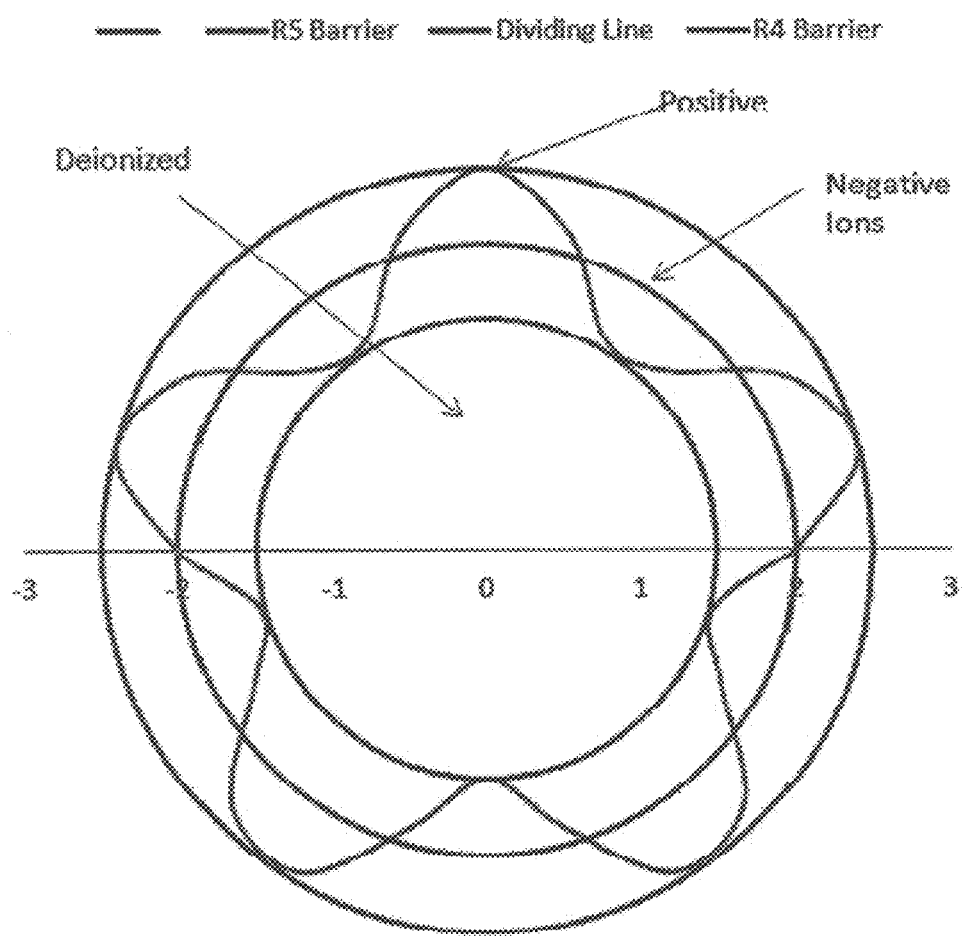
FIG. 26 is a Cartesian graph illustrating the final stage of the deionization chamber or filter of the present invention in accordance with a representative embodiment of the present invention.
Figure 27:
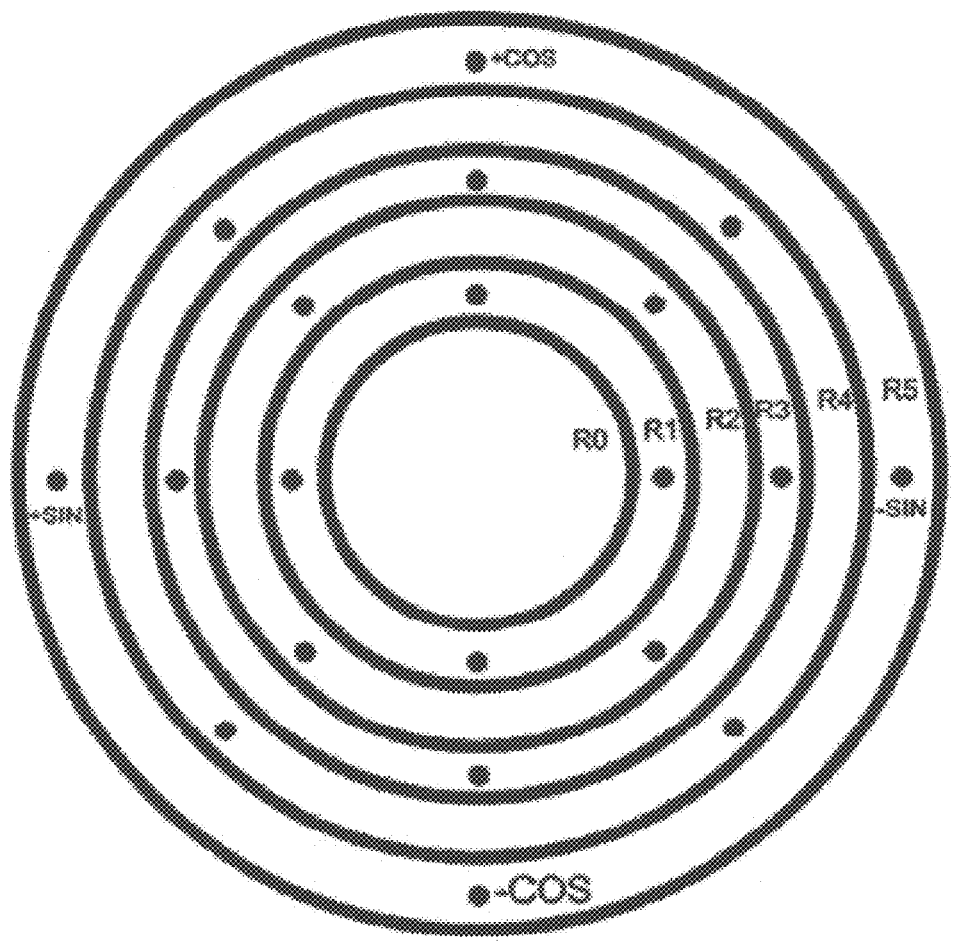
FIG. 27 is a top view of a representative embodiment of an electrode configuration of a deionization chamber in accordance with a representative embodiment of the present invention.
Figure 28:
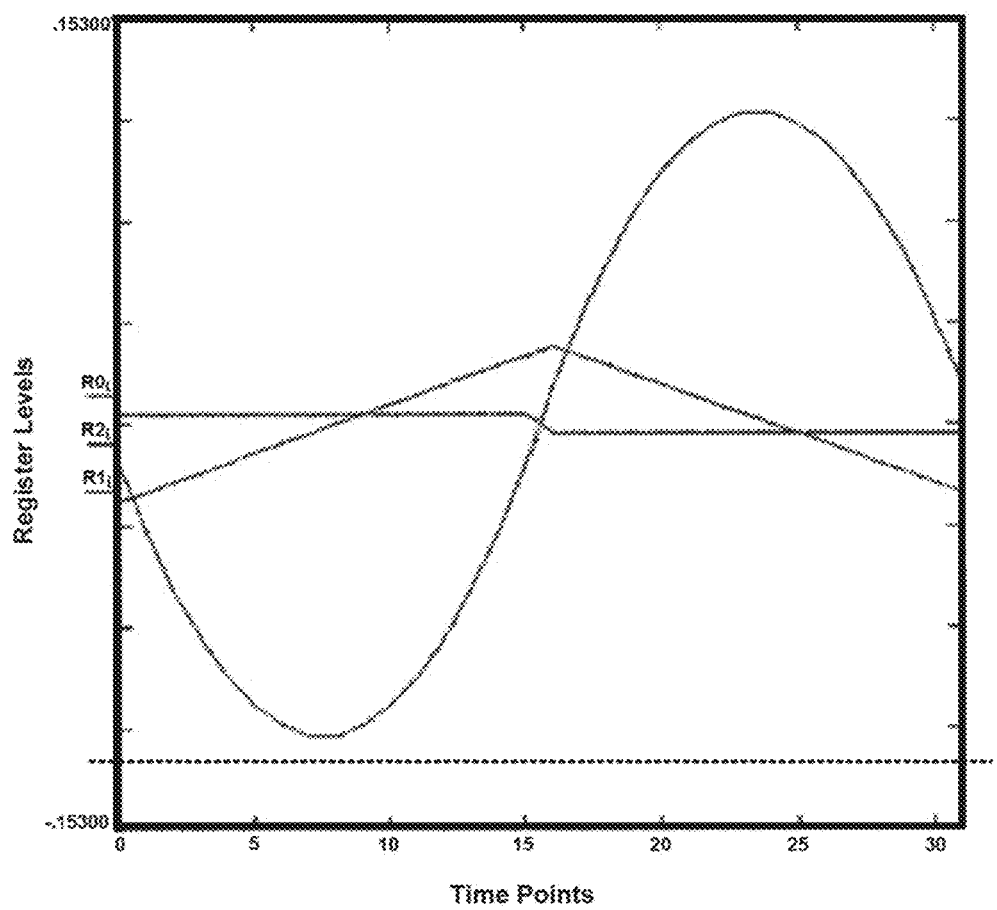
FIG. 28 is a graph showing the rise of amplitudes from registry level R0 through registry level R2 in accordance with a representative embodiment of the present invention.
Figure 29:
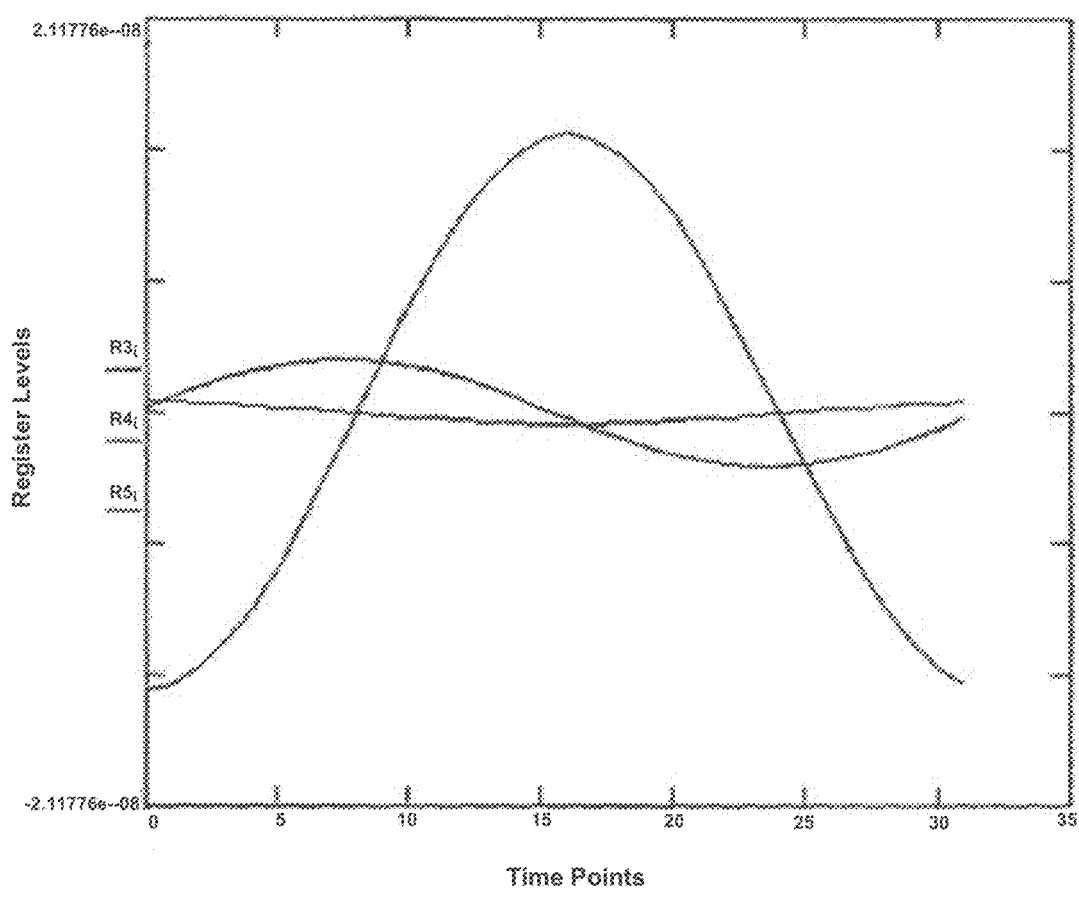
FIG. 29 is a graph showing the rise of amplitudes from registry level R3 through registry level R5 in accordance with a representative embodiment of the present invention.

The two basic premises of forward finite differences are that higher register layers have larger maximum voltage amplitudes than lower layers and potentials exist between every adjacent layer member. Longitudinal potential differences concentrate particle concentrations within layers and outward radial attractions introduces centrifugal forces. Particles are moved from lower to higher concentrations within and between register layers. Paths of movement are complex spirals and counter-spirals. A force diagram is shown in FIG. 19.

Node Placement in the Wave Model

Finite differences places an charge node and its partner at opposite vertices of a regular, even-sided polygon. A regular polygon arrangement fixes the distance between the nodes of a pair. A polygon of these nodes forms a register layer, or level. Node partners have identical charge magnitudes, but opposing polarities. Successive register levels expand outward in circumscribing polygons, all having the same number of sides.

Figure 31:
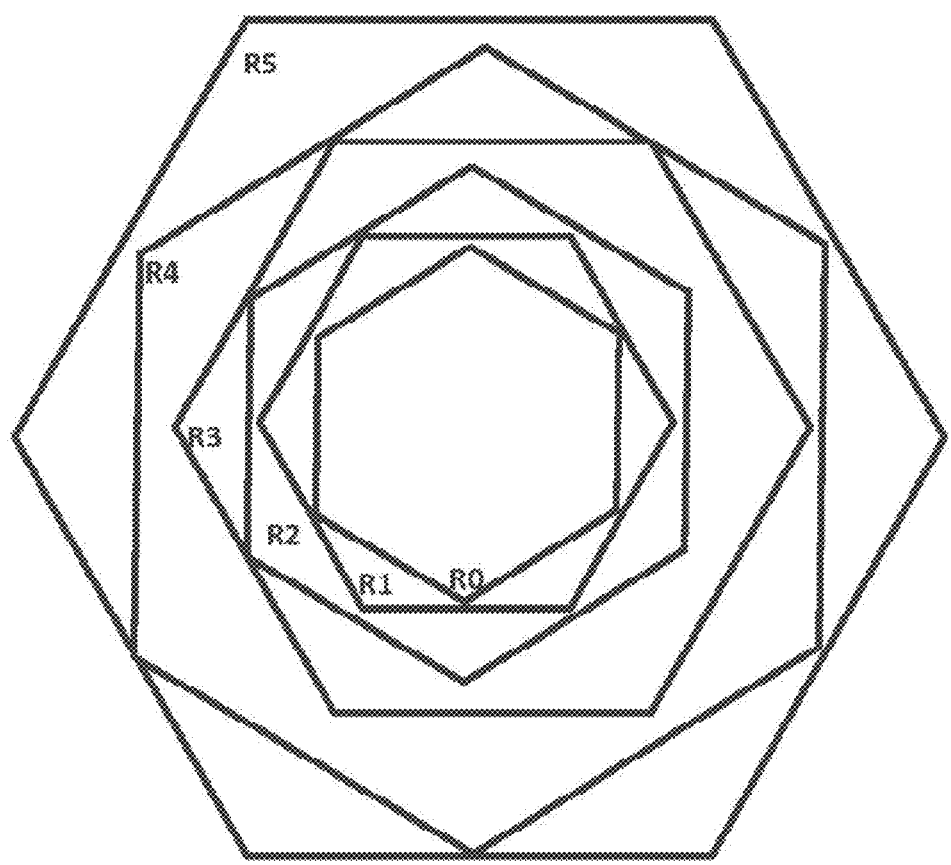
FIG. 31 illustrates a six node hierarchy of register layers R0 through R5 in accordance with a representative embodiment of the present invention.

The number of nodes in a register layer is the number of data points. For example, the data values for a six point polygon creates nested hexagon of nodes, a 16-point array a nest of hexadecagons, and so forth. A six node point hierarchy of register layers R0 through R5 is shown, in accordance with some embodiments, in FIG. 31.

The innermost layer (R0) is the lowest numbered layer and is the smallest inscribed polygon. A node at the vertex of an inscribed polygon bisects the side of its circumscribing polygon. Each node is offset from its neighbor by a half side rotation; thus two data points are assigned per polygon side. Moving around each side of a polygon occupies another time step. Zero potential points of these polygons are where starting and ending values of the FFD method coincide. The sine-cosine relationships in the calculus of finite differences place the maximum or minimum of one layer adjacent to the zero point of an adjacent layer, so zero points in adjacent layers are offset from each other by half a half-cycle and half a polygon side.

The finite differences method assigns potentials of a node mesh. Movement of a particle is determined by its proximity to the charge potential of a node, its affinity to other particles, and its polarity. Because finite differences dictate that the difference of forces at a point in a higher layer is exactly the force applied to that point at a lower layer, potentials in outer register layers dominate those of inner layers. Particles must move to the right and out, or to the left and out. The concentric register layers of the FFD method implement a progressive, spiral, particle circulation, from the inner square wave to an outer sinusoid. Particles accelerate toward attractive neighbor nodes and away from repelling neighbor nodes. Finite difference forces within register layers cause the particles to disperse into sinusoidal concentrations from the neutral, base pattern.

The first layer is a discriminator, like a churn, to set the process in motion. Each register layer above the first is a sweeper or integrator of an inner layer. Compressions and rarefactions originate from this process. As particles move along a register layer, the phase difference between that layer and its adjacent upper or lower layer will always be 90 degrees. Depending upon the polarity of the particle, it will continue on a circular path of finite differences or will jump into higher row. Outer layers disperse and congeal particles toward bipolar sinusoidal concentrations. Particle flow within the mesh is summarized as follows:

Attraction and Repulsion within Layers

The charges specified by the FFD method attract one polarity of particles and repel the other. These opposing motions separate particles of opposite polarity and aggregate those of the same polarity. Compression and rarefaction are natural outcomes of this process.

Phase Differences Between Layers

There is both transverse movement within a single register level and outward movement from one register level to another. The register level below a given level and the register level above that level are 180 degrees out of phase. Equivalently, every register level is 90 degrees out of phase with its adjacent levels.

Higher Layers Move Particles from Adjacent Layers

Figure 32:
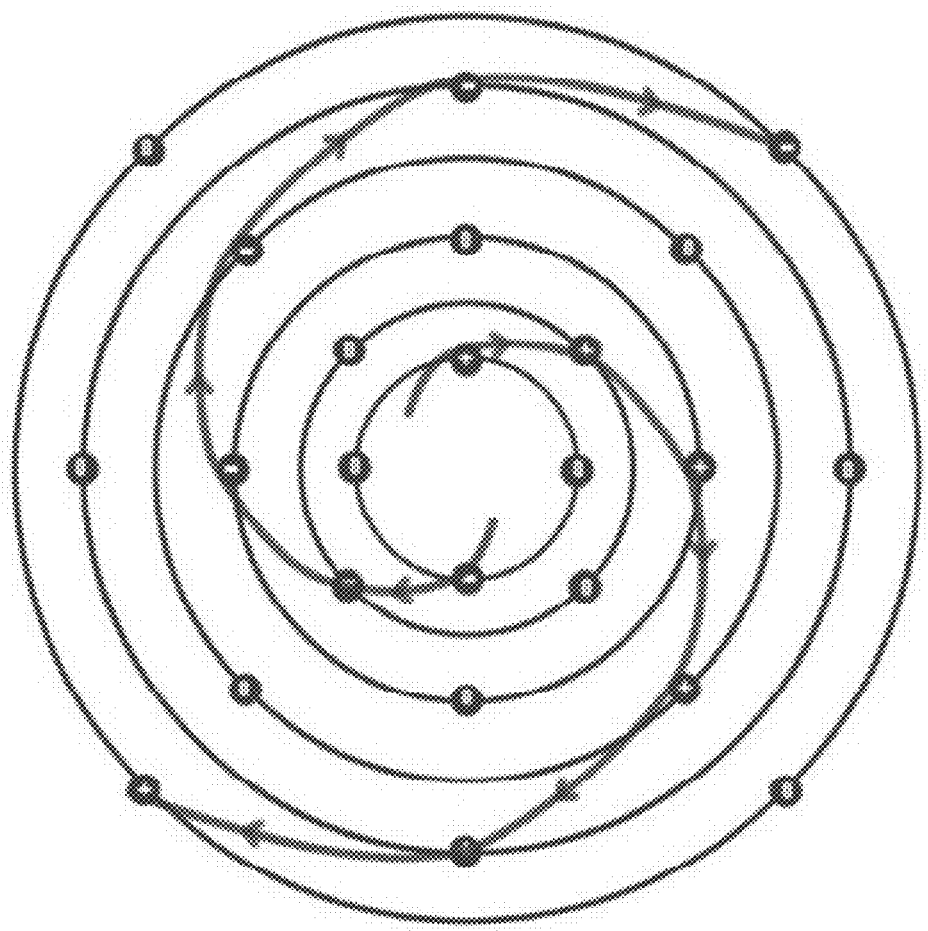
FIG. 32 illustrates a diagram of particle trajectories in accordance with some embodiments.

A particle moving from a lower to a higher level will move outward because of the attractive potentials of higher levels. Because the particles move in spirals, higher layers always maintain force influence over lower layers. A diagram of particle trajectories is a logarithmic spiral as shown, in accordance with some embodiments, in FIG. 32.

Particle Movement and Resonant Frequency

Each node in a finite differences mesh is actually a tuned circuit. Tuned circuits use capacitors and inductors as embedded electrical storage devices. They are elsewhere termed tank circuits, described as follows:

The charge flows back and forth between the plates of the capacitor, through the inductor. The energy oscillates back and forth between the capacitor and the inductor until (if not replenished by power from an external circuit) internal resistance makes the oscillations die out. Its action, known mathematically as a harmonic oscillator, is similar to a pendulum swinging back and forth, or water sloshing back and forth in a tank. For this reason the circuit is also called a tank circuit.

The physical devices corresponding to these components are called magnets and electrets corresponding directly to inductors and capacitors. Each device contributes to the node electrical or magnetic force proportional to the electrical potential applied to it. The side effects of storing electricity are electrostatic and electromagnetic forces radiated from the devices. These effects are the main reason for incorporating the devices in a finite differences mesh. Particle travel and direction are assured by the electrical potentials which match the finite differences method. There is a resonant frequency, at which the electrostatic and electromagnetic forces can move particles exactly the distance between them. Motion at the resonant frequency requires less energy than that required at a non-resonant frequency for the same acceleration. This frequency is described as follows:

The oscillation frequency is determined by the capacitance and inductance values. In typical tuned circuits in electronic equipment the oscillations are very fast, thousands to millions of times per second . . . . A resonance effect occurs when inductive and capacitive reactances are equal in magnitude. The frequency at which this equality holds for the particular circuit is called the resonant frequency.

Figure 33:
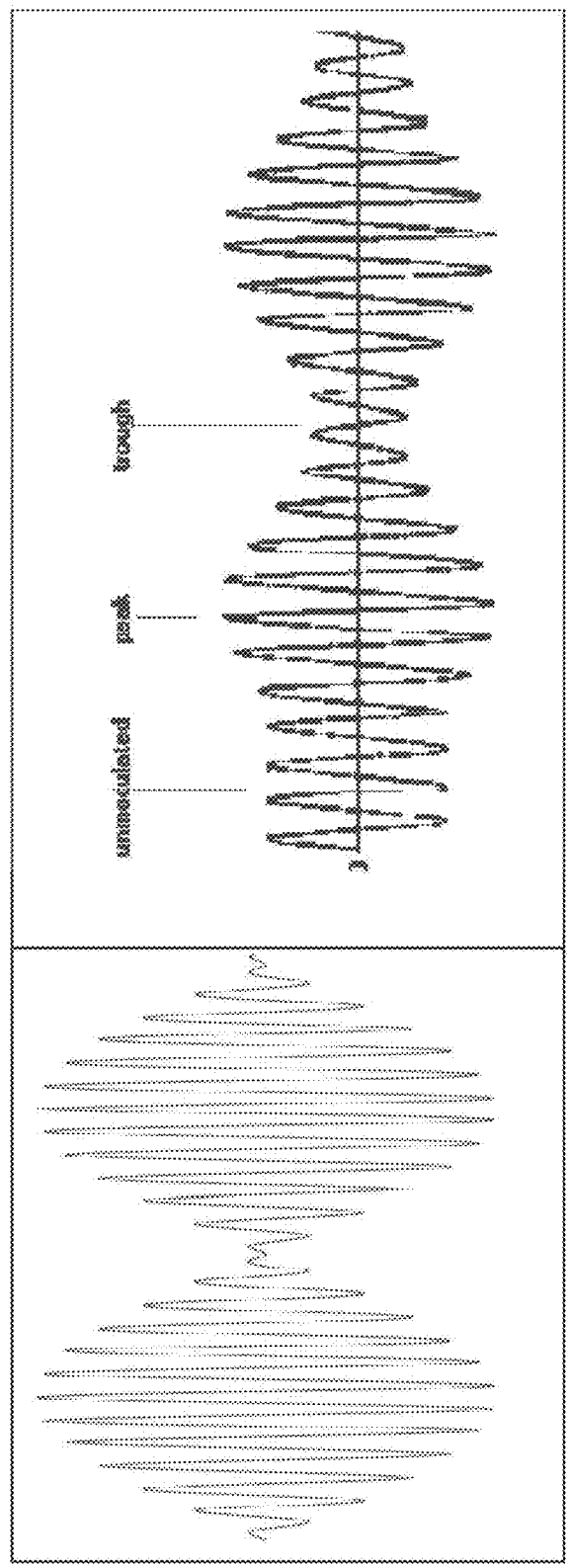
FIG. 33 illustrates a composite alternating current waveform produced by amplitude modulation in accordance with some embodiments.

The electrical resonance effect of components must be freed from dependence upon mechanical resonance attending particle movement. This is so because the resonant frequency for mechanical particle movement is far lower than the electrical resonant frequency of the tank circuit. A low frequency wave for particle movement must be furnished to modulate the high frequency, electrical pulse train powering a node of electrostatic and electromagnetic components. Amplitude modulation produces a composite alternating current waveform, as shown, in accordance with some embodiments, in FIG. 33.

The lower frequency signal is called the envelope. Amplitude modulation modifies the high frequency wave (called the carrier) according to the envelope wave. The diagram below shows that when the carrier is about 50% modulated. The maximum percentage of modulation possible without distortion is 100%.

Purified Water from Deionization

Bringing clean water close to people's homes is key to reversing the cycle of misery. Communities where clean water becomes accessible and plentiful are transformed. All the hours previously spent hauling water can be used to grow more food, raise more animals, or even start income-producing businesses. Families no longer drink microbe soup, so they spend less time sick or caring for loved ones stricken with waterborne diseases. Most important, freedom from water slavery means girls can go to school and choose a better life.[1]

[1] Rosenberg, Tina, "The Burden of Thirst", *National Geographic Magazine* (Vol. 217, No. 4, April 2010), p 96.

Purified water is water from any source that is physically processed to remove impurities. Distilled and deionized water are among the most common forms of purified water. Deionized water is that which has been passed through a column or membrane to remove ions present. These solutions categorically place impediments to ionic travel, using a filter screen for a discriminator. Purified water is a residue. The type of water purifier commonly used in homes, is not a deionizer, removing all ions, but rather an ion exchange column that exchanges polyvalent ions such as Mg++ and Ca++ for Na+ ions. Even more positive methods encourage ions to travel towards discharge, retaining the purified water as residue. A process of deionizing water is described in the online encyclopedia Wikipedia:

> An electrode in an electrochemical cell is referred to as either an anode or a cathode, terms that were coined by Michael Faraday. The anode is defined as the electrode at which electrons leave the cell and oxidation occurs, and the cathode as the electrode at which electrons enter the cell and reduction occurs.

Water is passed between an anode (positive electrode) and a cathode (negative electrode). Ion-selective membranes allow the positive ions to separate from the water toward the negative electrode and the negative ions toward the positive electrode. High purity deionized water results.

Wikipedia describes a specialized form of the water deionization process, under the topic "capacitive deionization":

> Capacitive deionization (CDI) . . . is a technology for desalination and water treatment in which salts and minerals are removed from water by applying an electric field between two porous (often, carbon) electrodes . . . . Ions of positive charge (cations) [are] stored in the negatively charged electrode, and vice-versa for the anions, which are stored in the positively biased electrode (anode) . . . .

The electrodes used in CDI are typically prepared from porous carbon particles with internal areas for ion adsorption . . . , - - - but other materials are also possible, such as carbon nanotubes and nanofibers. The two oppositely placed (planar) electrodes are separated by a thin open structured "spacer", or flow channel, through which the water flows. Upon applying an electrical potential difference between the two electrodes of the order of 0.8-1.5 V, anions are adsorbed in the anode and cations into the cathode, thereby producing a (partially) ion-depleted product stream. After the ion adsorption capacity of the electrodes has been reached, the applied voltage difference can be reduced to zero and a small product stream concentrated in salt is obtained in the ion release-step. In this way the inflowing stream of brackish water is split into a partially deionized stream and a more concentrated brine.

Capacitive Deionization

The preceding passages describe much recent work in water deionization. The principle of using electric fields to influence ion flow is the essence of the method. Warren et. al.[2] and Kothe, et. al.[3] _include both magnetic and electric fields in the capacitive deionization process. Variations occur in subsequent ion extraction schemes. Elson[4] and others have contributed electrode designs. Capacitive deionization (CDI) has also been combined with ion exchange methods. Warren presented the cost of processing seawater by reverse osmosis and estimated that CDI technology can be ten-fold more energy efficient than reverse osmosis technology. Other estimates[5] (Shiue, 2009) place the production cost as one-third that of reverse osmosis.

[2] Warren, William L. and Stoltz, Richard, *Water Purification: Ion Separation*. United States Patent Application No. US 2004/007452 A1, 2002.
[3] Kothe, Walter, Adam, Harald, and Gruetzmann, Dieter, *System and Method for Splitting Water*. United States Patent Application Publication No. US 2009/0026089 A1, 2009.
[4] Elson, Brian B., Large, Brian C. and Norman, Peter, *Apparatus and Method for Removal of Ions from a Porous Electrode That Is Part Of A Deionization System*. United States Patent Application Publication No 20100059378, 2008.
[5] Shiue, Lih-Ren and Lee, Hou-Bai, *Capacitive Deionization Using Hybrid Polar Electrodes*. United States Patent Office Publication #20090255815. 2009.

Figure 34:
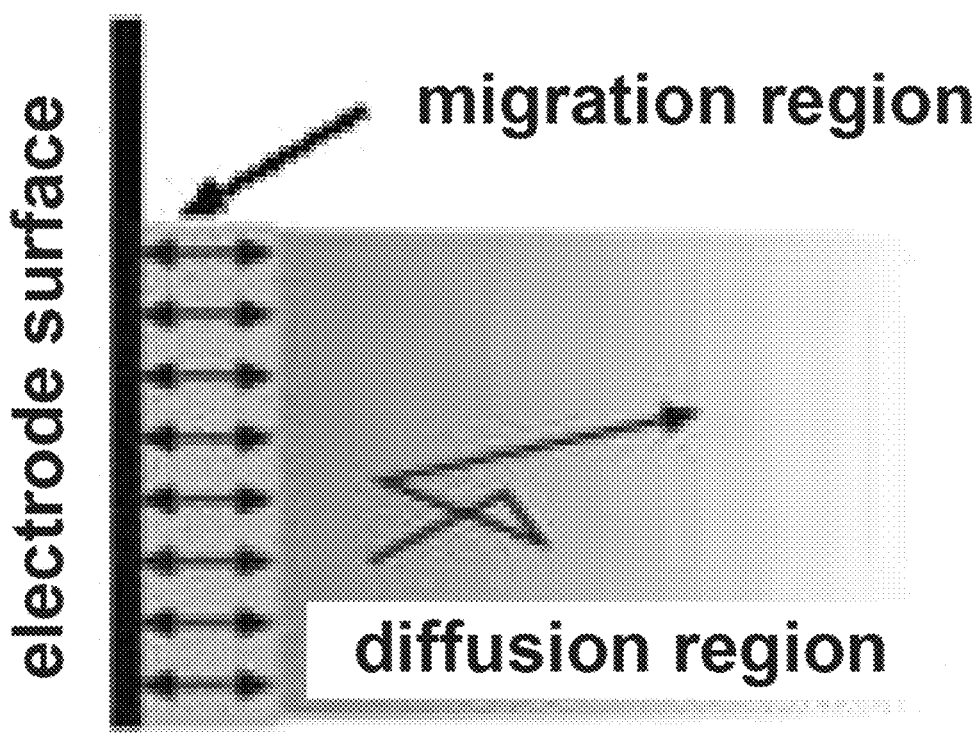
FIG. 34 illustrates a chart showing capacitive deionization electrostatic field charges to collect surface particles in accordance with some embodiments.

A basic finding of these referenced articles is that ions in an aqueous medium are moved by electricity. Ion exchange columns rely on less precise, mechanical means to separate ions. The "macro versus micro" phenomenon is that it is easier to initiate directed particle movement than to prevent it. Capacitive deionization uses electrostatic field charges to collect surface particles. The following quotation and FIG. 34 illuminates this topic:

> A common misconception . . . is that "ions are attracted to the oppositely-charged electrode." This is true only in the very thin interfacial region near the electrode surface. Ionic motion throughout the bulk of the solution occurs mostly by diffusion, which is the transport of molecules in response to a concentration gradient. Migration . . . the motion of a charged particle due to an applied electric field, is only a minor player, producing only about one non-random jump out of around 100,000 random ones for a 1 volt cm−1 electric field Only those ions that are near the interfacial region are likely to undergo migration.[6]

[6] "All About Electrochemistry", http://www.chem1.com/acad/webtext/elchem/ec8.html (2012).

Advantages of Using the FFD Method

Capacitive deionization has only one layer of electrodes (two rows of electrodes with opposing charges); or at least, having only one voltage potential between sets of electrodes. Present capacitive deionization methods define an electrostatic method of collecting disparate ions. A single set of electrodes is solely responsible for differentiation of the layer of ions from the fluid medium. Electrical or mechanical purging of those electrodes is a necessary consequence of a static collection strategy using single-level electrodes.

The inherent advantages of the FFD method suggest that it is the preferred way to do deionization using electricity. The FFD method describes the precise values and polarities of a multiple-layered electric field, with each layer calculated to synchronize a smooth spiral flow of particles from the center axis of a field to poles on its circumference. Multiple register layers of the FFD method mitigate the effect of the inverse square law by shortening travel distances of ion migrations. In comparison with straight-line and single-level methods, multiple levels of the FFD method allow filtering and flow profiling to occur over much greater radial distances. Lateral forces within the register layers and radial forces between the layers move ions from lesser to greater concentrations. As each layer enhances the particle concentration, sinusoidal tapering and shaping of the flow occurs. Forward finite differences concentrate both metallic and non-metallic ions at lobes of sinusoids: while simultaneously; ion-rarified regions evolve deionized water as a waste product. The sinusoidal waveform of the FFD method is the least turbulent model to apply to capacitive deionization. Ion separation should be done as smoothly as possible in order to minimize the work done. The fact that a circle is the smoothest of all polygons is the reason to use sinusoidal waves in a multilevel deionization system. A smooth or gradual imposition of electrical charge minimizes transfer of charge in favor of particle movement.

Simultaneity in Ion Collecting and Purging Processes

Figure 35:
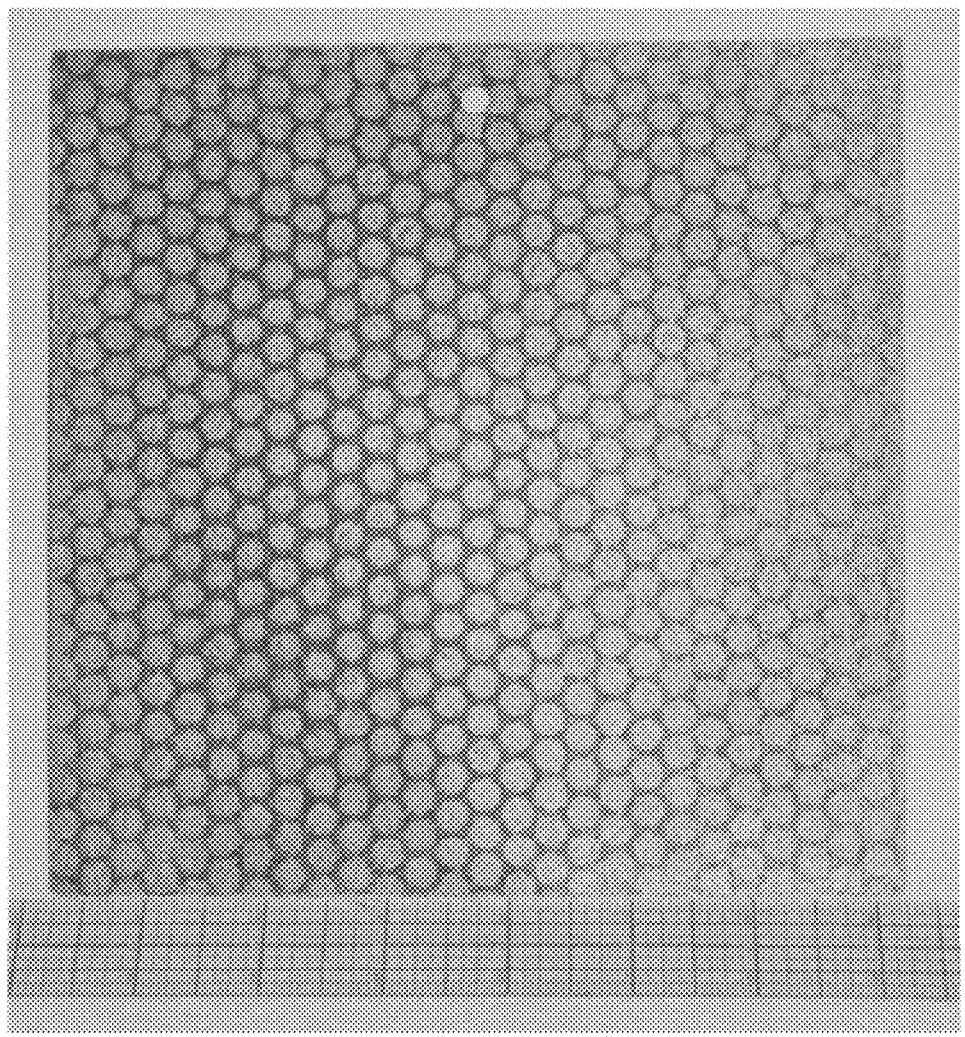
FIG. 35 illustrates a typical electrode weighing 15 g (18 cm×18 cm) in accordance with some embodiments.

A description of a commercial product reveals the inherent defect of many implementations of CDI technology, which is back-flushing and refreshing the electrodes:

> Eventually the electrodes become saturated with ions and must be regenerated. The applied potential is removed, and since there is no longer any reason for the ions to remain attached to the electrodes the ions are released and flushed from the system, producing a more concentrated brine stream. In practice, for a gallon of brackish water fed to the a CDT process, more than 80% emerges as fresh, deionized potable water, and the remainder is discharged as a concentrated brine solution containing virtually all of the salts in the feed . . . . The primary advantage of CDT is its low operating cost, which is about one third that of the main competitor, reverse osmosis (RO). This is important because operating costs dominate the cost of desalination as shown, in accordance with some embodiments, in FIG. 35.

As explained here, some CDT units neutralize the electrodes and mechanically flush their ions from the system. Another approach is to reverse electrode polarities, concentrate the ions and recombine them as mineral effluent:

. . . During ion release a reversed voltage is used, [in which] counterions can be more fully flushed from the electrode region, thereby increasing the driving force for ion removal in the next cycle.[7]

[7] "Abstract", "Membrane Capacitative Deionization", *Journal of Membrane Science* (2010), Volume: 346, Issue: 2, Pages: 256-262, http://www.mendeley.com/research/membrane-capacitive-deionization/

Particle accretion on the outer electrodes requires systemic reversals, interrupting the accumulating and storing of the ion residue on the electrodes. Left unchecked, ion particles would adhere to the electrodes of the outer layer, shielding inner register layers from their electrostatic influence. Ion attraction is inherently a process of exponential decay. Termination and subsequent reversal of such exponential processes involves significant overhead. Sequential residue collection and electrode regeneration requires product storage and time that might have been redirected toward deionization.

The reversible processes of concentrating ions and purging them are incongruent. Sufficient space is required so that these ion accumulation and purging processes can coexist. Such space could be discovered between innermost and outermost layers of multiple electrodes. Space could be found also between the poles of differing polarities. Presently operating technology, with only a single layer of finite differences has not provided enough of this kind of space. But what accounting can be made for the time expended to stop and reverse the collection process? One way out of this dilemma is to discard collecting and purging mechanisms altogether or at least subsume them, in favor of a continuous, directed partitioning into component parts of a solution. Using several layers of multiple electrodes accomplishes this purpose. In combination with the balanced and synchronized sinusoidal charge patterns set up by the FFD method, a dynamic, directed, multilevel strategy of electrostatic and electromagnetic particle flow replaces the static, binary collection plate mechanism of capacitive deionization, as it now exists.

Electrolysis of Ionizable Water

Capacitive deionization may be contrasted with electrolysis. This process is described as follows:

Electrolysis of water is the decomposition of water (H2O) into oxygen (O2) and hydrogen gas (H2) due to an electric current being passed through the water. An electrical power source is connected to two electrodes. Hydrogen will appear at the cathode (the negatively charged electrode, where electrons enter the water), and oxygen will appear at the anode (the positively charged electrode).

Electrolysis of pure water requires excess [electricity] to overcome various activation barriers. Without the excess energy the electrolysis of pure water occurs very slowly or not at all. This is in part due to the limited self-ionization of water. Pure water has an electrical conductivity about one millionth that of seawater. The efficiency of electrolysis is increased through the addition of an electrolyte (such as a salt, an acid or a base).[8]

[8] "Electrolysis of Water", Wikipedia, ttp://en.wikipedia.org/wiki/Electrolysis_of_Water In electrolysis, the current flow from one electrode to another sets up a new equilibrium between ions as products of electrolytic reactions are freed from water.

Electrolysis of brine gives hydrogen at the cathode and chlorine at the anode . . . Hydrogen ions gain electrons (reduction) to form hydrogen atoms. The hydrogen atoms combine to form molecules of hydrogen gas. Chloride ions lose electrons (oxidation) to form chlorine atoms. The chlorine atoms combine to form molecules of chlorine gas.[9]

[9] "The Periodic Table", gcsescience.com, http://www.gcsescience.com/pt11.htm (2012).

In "conduction of electricity" through solutions, electrons themselves do not pass through the solutions. Rather, the charge balance is maintained in the solution by movement of cations and anions toward the electrodes where charge transfer takes place at the solution interface[10]

[10] "Electrolysis of Salt Water", http://aquarius.nasa.gov/electrolysis.html (2012).

The energy efficiency of water electrolysis varies widely. The efficiency is a measure of the energy contained in the hydrogen compared with the input electrical energy. Some energy is converted to heat, a useless byproduct. Some reports quote efficiencies between 50% and 70%.[6] . . . . These values refer only to the efficiency of converting electrical energy into hydrogen's chemical energy. The energy lost in generating the electricity is not included.

The National Renewable Energy Laboratory] [NREL] estimated that a kilogram of hydrogen (roughly equivalent to a gallon of gasoline) could be produced by wind powered electrolysis for between $5.55 in the near term and $2.27 in the long term[11]

[11] "Electrolysis", Wikipedia, http://en.wikipedia.org/wiki/Electrolysis (2012).

Balancing Electrolysis and Deionization

Figure 36:
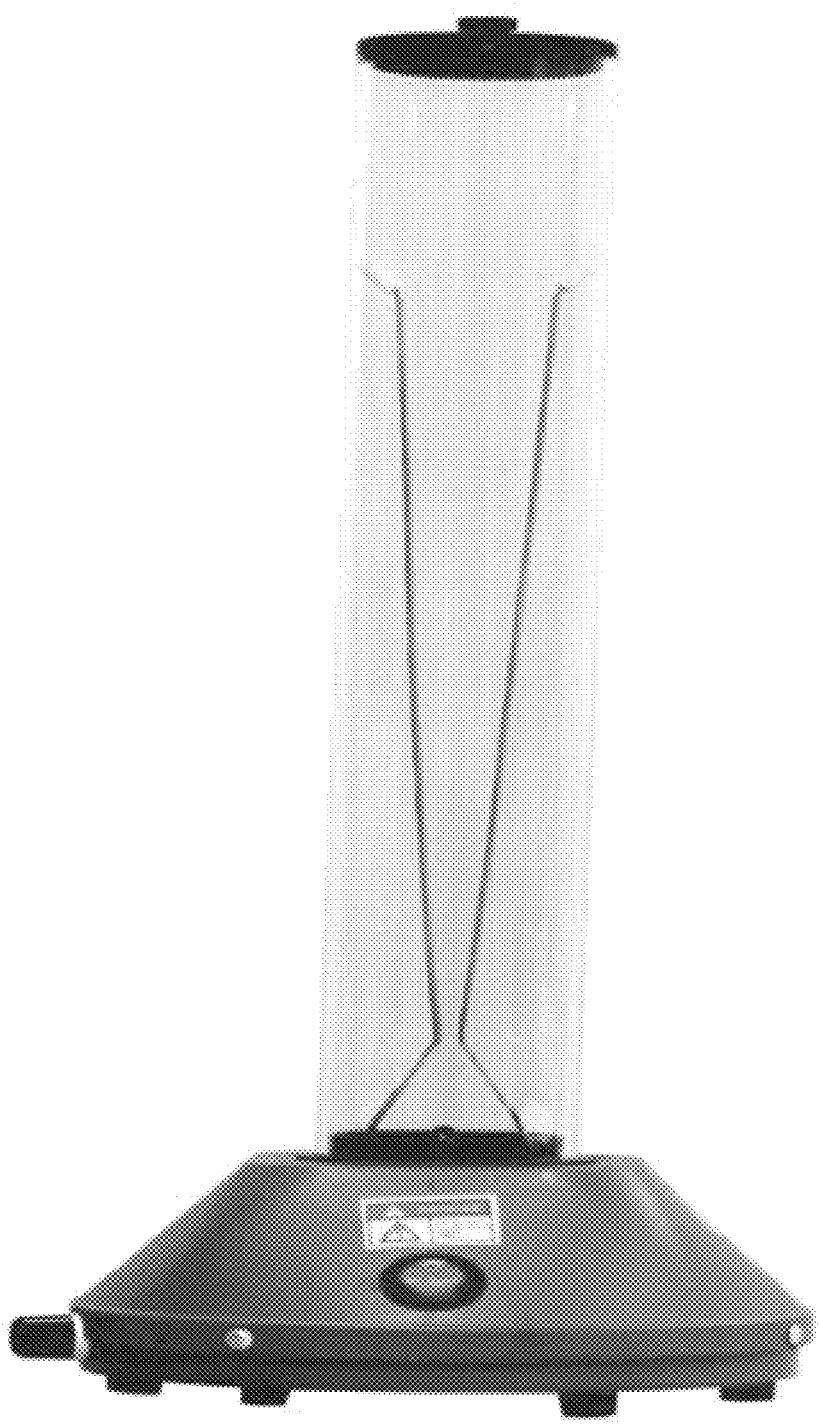
FIG. 36 illustrates a "Jacobs Ladder" experiment or two rod shaped electrodes mounted vertically, slightly canted and electrified in accordance with some embodiments.

The electric experiment known as "Jacob's Ladder" (as shown) illustrates charge flow in a dielectric medium. This phenomenon occurs when two rod-shaped electrodes are mounted vertically, slightly canted and electrified. The experiment, powered by a very high voltage source, is displayed, in accordance with some embodiments, in FIG. 36, and described as follows[12]:

[12] "Science First Jacob's Ladder Apparatus", Item#: 1471392,freyscientific.com.

The dielectric separating the electrodes is air. When the voltage difference between the electrodes exceeds the gap's breakdown voltage it overcomes the dielectric strength of the medium. An arc then jumps between the two electrodes. This arc ionizes the medium into plasma, which drastically reduces its electrical resistance. The plasma has been superheated and thus rises. An electric current flows until the ionized path is broken. A break in the connection occurs because the gap becomes large enough that the potential cannot overcome the dielectric strength. At this point a new arc is formed at the bottom and the process repeats itself.[13]

[13] "Spark Gap", Wikipedia, the free encyclopedia, Wikipedia.com (April 2014).

Electrolysis similarly disassociates ions from their electrons by upsetting the equilibrium of ionic bonds and conveying electrons (or ions) on chains through the solution. Initiation of electrolysis is accompanied by a drop in resistance. This phenomenon emulates surface tension in which tumultuous dashing breaks up laminar flow into droplets.

The basic mechanism of the Jacob's Ladder experiment motivates a dynamic strategy of ionic movement. Upward and onward magnetic force can replace the upward plasma movement in the Jacob's Ladder. When ion chains form between electrets, they actually become wires, and subject themselves to being moved by magnetism in proportion to their current flow. This aspect of the principle of electromagnetic induction was explored by Faraday and Maxwell in the early nineteenth century. The components of such so-called wires move in the direction decreed by currents through the electromagnets. Field variations would act to disrupt ion chains in favor of individual ion movements, Essentially, electrostatic forces can initiate ion movements and electromagnets can perpetuate and accelerate them.

Description of the Filter

Figure 37:
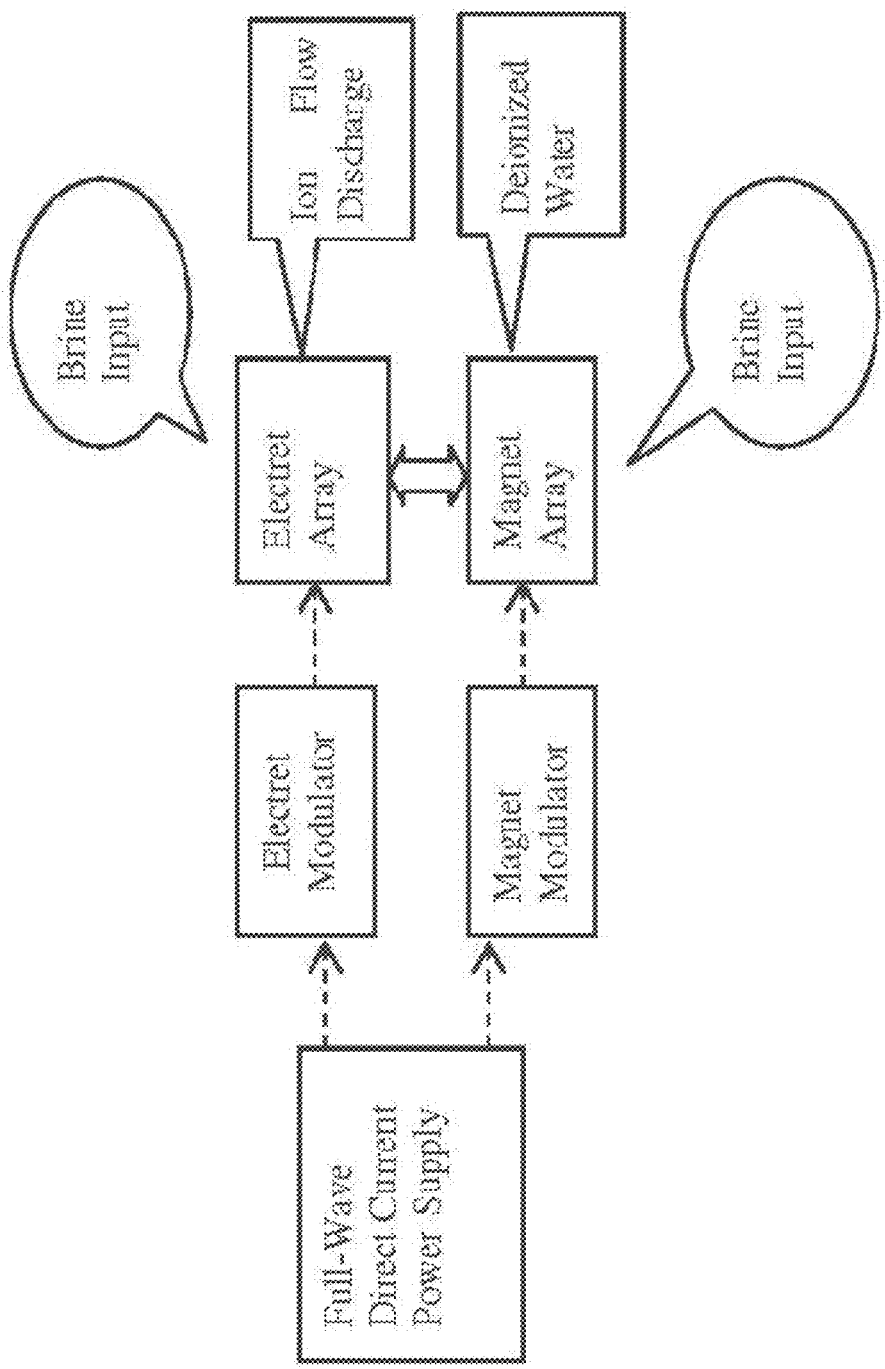
FIG. 37 illustrates a functional diagram of a device in accordance with some embodiments.

A functional diagram of the device is shown, in accordance with some embodiments, in FIG. 37.

Shifting potentials between the two networks periodically enables lateral and upward ion flow. That reservoir of electrical energy is diverted into magnetic energy from electrets to electromagnets placed in complementary positions. Moving ions are propelled away from electrostatic toward the electromagnetic devices. Subsequent reversal diverts the energy reservoir back from the electromagnets to the electrets. Simple, harmonic motion of ions is induced by the alternation between electrical and magnetic forces upon ions of either polarity. In this sense, their motion resembles a pendulum. A simple pendulum-like oscillation can be extended through a net of electrical potentials in the pattern of sinusoidal finite differences. A wave motion can he sustained by a mechanical resonance effect. Particle motion is actuated by alternating between build-ups and build-downs of alternate electrical and magnetic fields. The picture is one of harmonic variations of the multiforce, electricomagnetic fields in order to move ions rather than merely allowing ion chains to simulate wires. Every particle (of either polarity) moves towards one finite differences zenith (or nadir), regardless of its present position.

Figure 38:
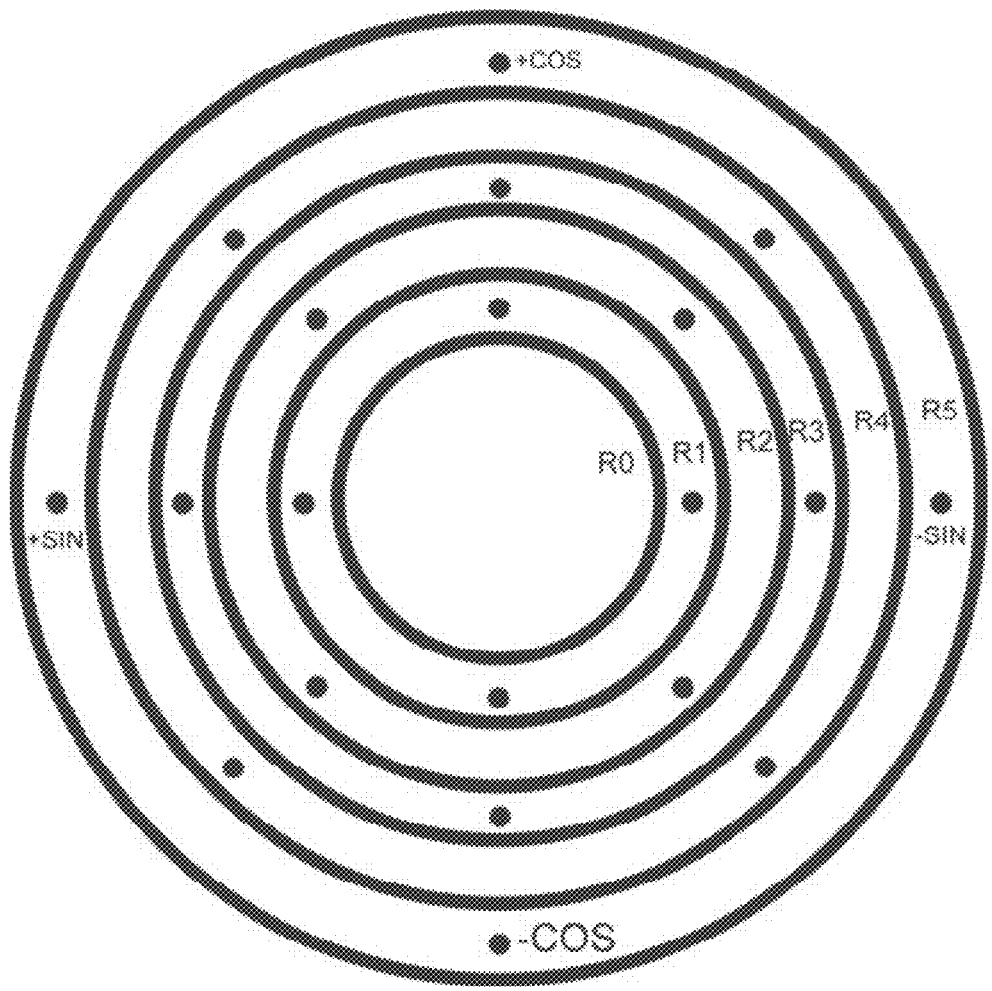
FIG. 38 illustrates a view of phase shifts between the register levels of a five level, four-cell configuration in accordance with some embodiments.

Physical, mechanical and electrical elements of this filter fulfill complementary roles in multiple processes at work. Ion accelerations derive their strength and direction from networks of elements organized after the manner of forward finite differences. The device is composed of disks assembled into a stack. Each disk is divided into the rings of keystone-shaped cells which make a register level. Each cell is a melding of members of two coordinated networks—one that is electrostatic and the other electromagnetic. The number of wire turns in each electromagnet and the diameter of the electromagnetic loop articulate its inductance amount in its network of forward finite differences. The size and spacing of two electret plates proportions each electret within its finite differences hierarchy. Macro-level behavior from micro-particle movement is achieved by multiple levels of cells. A view of phase shifts between the register levels of a five level, four-cell configuration appears as shown, in accordance with some embodiments, in FIG. 38.

Figure 39:
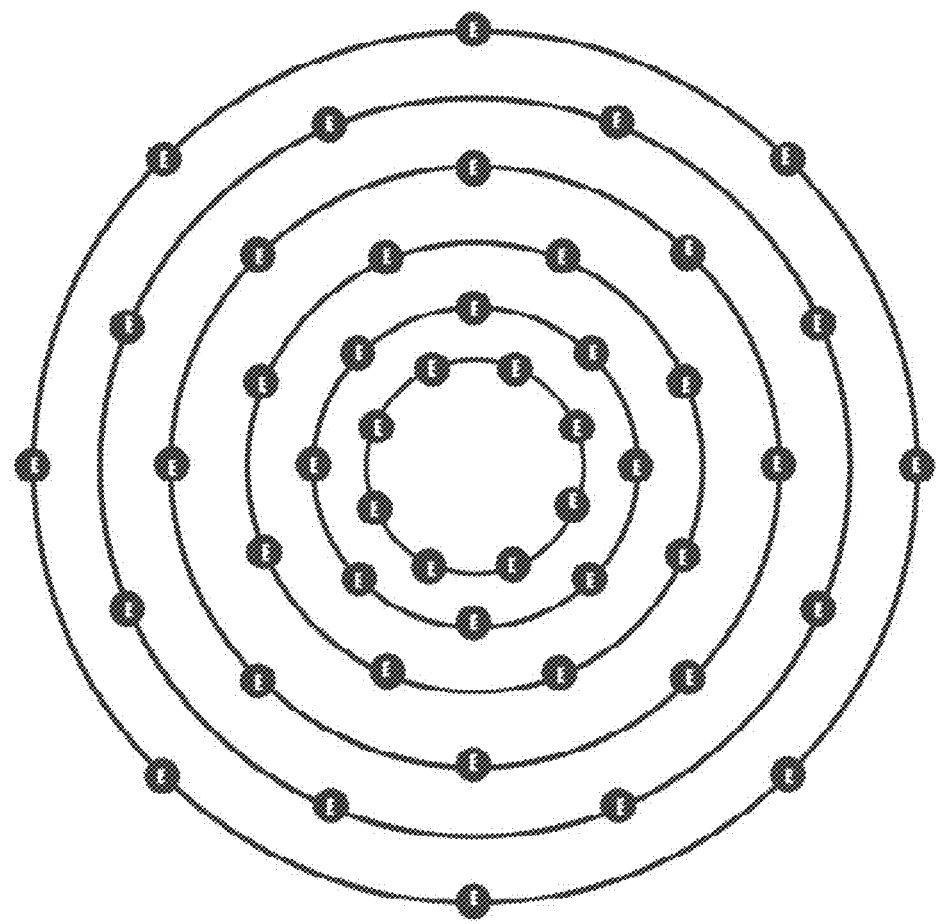
FIG. 39 illustrates a diagram of the vertically mounted electromagnets on one disk which has six register levels R0 through R5 in accordance with some embodiments.

A diagram of the vertically mounted electromagnets on one disk, which has six register levels R0 through R5, is shown, in accordance with some embodiments, in FIG. 39.

The filter is aggregated from nodes of a finite differences mesh, composed of electrets and electromagnets strategically placed to generate and sustain ion flow.

The Electrostatic and Electromagnetic Cubicle

Nodes bind together electrets and electromagnets into keystone-shaped cubicles. Success of the filter operation depends upon properly organizing and constructing cubicles, so that each cubicle contributes its portion of ion flow according to the sinusoidal pattern of the method of forward finite differences. A cubicle is imagined as a log cabin with electromagnets for roof, front door floor, and electrostatic plates mounted upon side walls. Cubicles have circular openings at top and bottom, within horizontal electromagnet loops. One of the two plates of an electret is mounted on a wall. The openings at either end of the cubicle are vertical electromagnet loops. The walls of a cubicle are canted, in the outward radial orientation of cubicles on register levels of every disk. Adjoining cubicles supply magnets for floor and one door, and an electret plate for one side wall. Ions enter in through the floor or sides of each cubicle and leave, with phased acceleration, through the roof and out the other sides. Three of the sides of the cubicle are powered: the top and side electromagnets and the electret of the cubicle. Nodes of the adjacent register levels along with one neighbor node of the same register level supply the other three cubicle sides. A cubicle is diagrammed in FIG. 6.

Electromagnets of cubicles of a register level are placed side-by-side on strips, and wired in parallel. Electrets are likewise placed side-by-side on strips. The strips run perpendicularly through the disks, forming cubicle walls, floors and ceilings. Alternatively stated, each register level on a disk supports strips of components, transversely mounted. Openings in cubicle walls behind electret plates allow circulation to relieve concentrations that might originate from non-homogeneous flow.

Brine is injected in the centers in the disk stack. Compass points on the circumferences of the disk are where two poles discharge deionized water and the other two poles chlorine/oxygen and sodium ions. The three kinds of output for a single disk are deionized brine at two compass points, metallic ions at a third compass point, and non-metallic ions at the last compass point.

A flow of charge occurs between the plates of an electret. This charge path within an electret simulates a wire. Its subsequent movement is toward the magnetic loops at top and end of the cubicle. Thus ion movement within a cubicle is initiated (by electrostatic forces), and promulgated onward and upward (by electromagnetic forces). Alignment between electrostatic and electromagnetic polarities is enforced by the phase difference between the electrostatic and electromagnetic networks. Pulses commence and continue ion movement up and out (two directions) for metallic ions, or correspondingly down and out for non-metallic ions.

Assigning Finite Differences Charge Potentials to Cubicles

| Design Consideration | Electret Network | Magnet Network |
|---|---|---|
| Nature of the force applied by the type of electrical device (electret or magnet) within the cubicle | Electrostatic force proportional to the surface area of the plates impels transfer of charge in direction between the plates specified by the type of ions within conductors | Magnetic force proportional to the number of turns of wire in the magnet winding attracts or repels a transfer of charge, either in attraction towards the magnet or repulsion away from the magnet. transverse to the direction of flow within the electret |

| Design Consideration | Electret Network | Magnet Network |
| --- | --- | --- |
| Nature of Dielectric Layer | Cubicle sized volume of water carrying both metallic and non-metallic ions of differing concentrations, which vary by register level and transverse cubicle location | Cubicle sized volume of water carrying both metallic and non-metallic ions of differing concentrations, which vary by register level and transverse cubicle location |
| Volume available within cubicle | Fixed, uniform, and identical for every cubicle within that register layer. | Fixed, uniform, and identical for every cubicle within that register layer |
| Force factor of component | Summed surface area of both electret plates, and potential difference between plates | Number of turns of wire of certain thickness and composition, and current flow through winding. |
| Potential applied to the first element of the base layer of cubicles, assigning the pattern of all subsequent elements. | R1 potentials are applied to the electret plates, giving finite difference potentials at the R0 level. | R0 potentials are applied to magnets, giving finite difference current flows at the R0 level |

Figure 40:
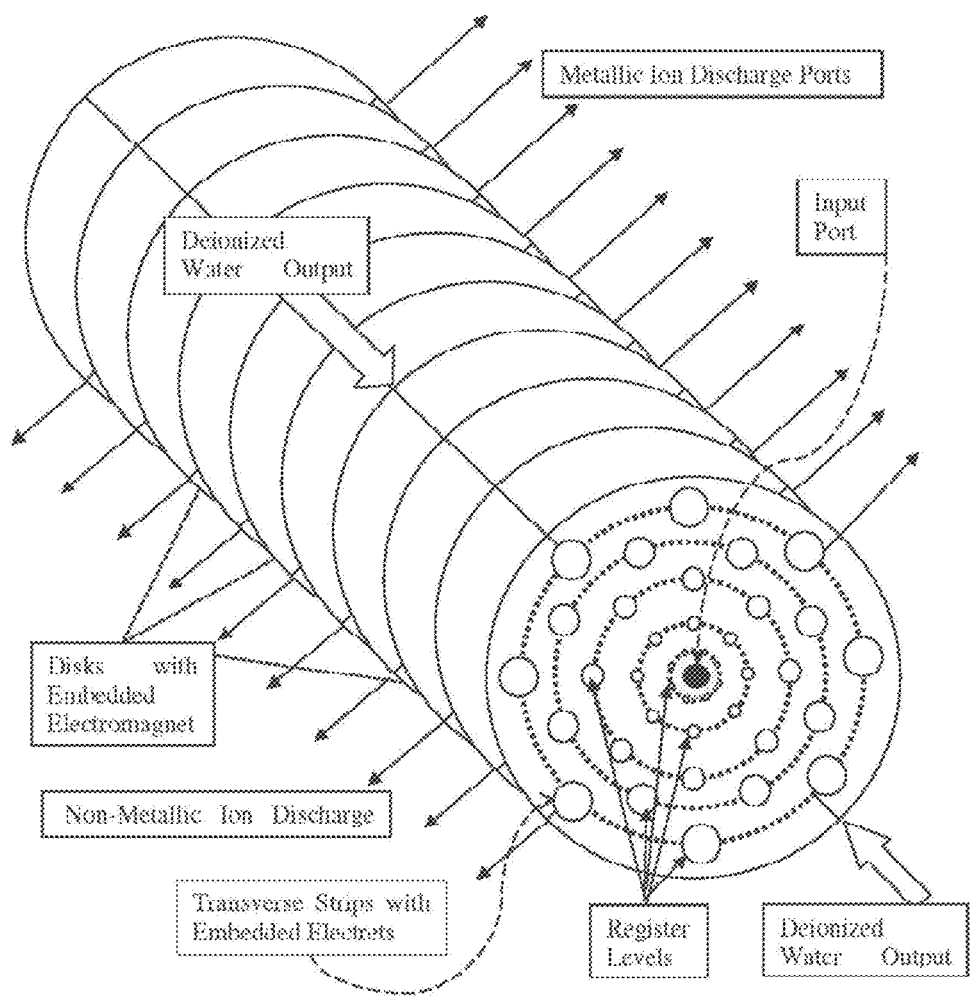
FIG. 40 illustrates a diagram of the filter resembling a cylindrical bread machine in accordance with some embodiments.

A diagram of the filter device that physically resembles a cylindrical bread machine in size and appearance is shown in accordance with some embodiments in FIG. 40.

This relatively simple deionization method implements dynamic ion flow. Inherent upward scalability removes general limits to number of nodes and number of register levels. Overcoming and neutralizing the Obstacles to dynamic ion flow opens the way proposed, final design of a stable and efficient method of capacitive and magnetic deionization.

Powering the Mesh

Figure 41:
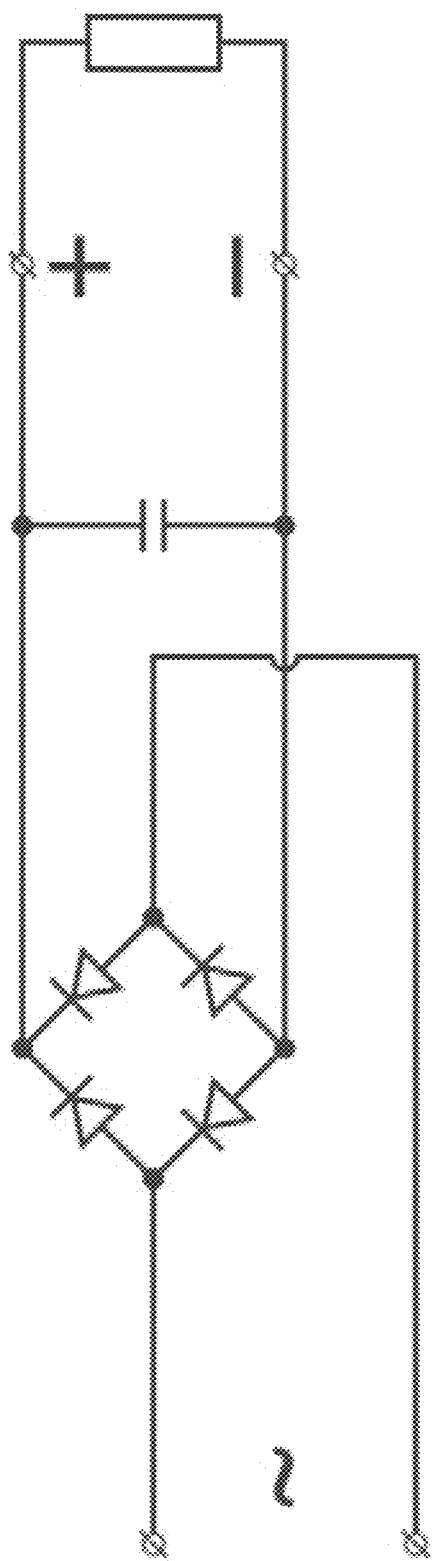
FIG. 41 illustrates a balanced bridge circuit in accordance with some embodiments.

A node consisting of an electret and magnet is actuated by a modulated pulse train of direct current pulses. The alternating current of the above carrier wave must be rectified into direct current before it can be used in the node array. In a diagram, rectification maps the bottom half of the wave into the top half, preserving both carrier and modulation characteristics. This reflection is performed by a balanced bridge circuit. Rectifier bridge circuits present nearly constant resistance to the alternating current source[14]. Such a circuit is shown, in accordance with some embodiments, in FIG. 41.

[14] Wikipedia The Online Encyclopedia, www.wikipedia.org, "Bridge Circuit", 2013.

The wave at the resonant frequency of particle movement modulates the power wave prior to rectifying it. Incidentally, a complex modulating waveform can move particles of different sizes or compositions simultaneously. The phase of the electromagnetic net must tag that of the electrostatic net by a quarter cycle, in order to strobe particles from the first type of device into the second. Instead of two separate power supplies for the electret network and the magnet network, phase difference can come from compensatory components. A large capacitor with the electrets of the electrostatic network, and an inductor with the magnet network are adjusted to introduce the quarter-wave phase differential required of the device. The wiring diagram shows how each component receives its proportional part of the maximum and minimum voltage potentials allotted to its register level. Taps on the alternating current source establish the basic charge potentials for each register level of either electromagnetic or electrostatic network. A single alternating current source powers the networks of the array.

Assigning a potential value to the level determines each and every other potential value in the respective electrets and magnet networks. Potentials are applied to the ends of a chain of cubicles. With reference back to FIG. 8, the wiring diagram of a single cubicle (or node) shows how a node is embedded in both electrets and electromagnetic networks, so that each component is valued in polarity and magnitude like its corresponding spreadsheet entry.

Magnitude and direction of the charge potentials, applied to the mesh circuits, are obtained from the following formulas. It is convenient to number sequentially the data points (corresponding to electrode pairs) from 0 to $2w-1$. This point numbering is offset by one step every two register levels, in order to preserve phase. The number of full cycles of the sinusoidal waves of electricity in these points is $2d$. The filter that is diagrammed above example uses $d=1$. Generating formulas for the zero points of a 6-layer device appear in this table:

$$R0 =\,'$$
$$R1 = -\frac{w}{2 \cdot d} \cdot R0 \qquad R1_{cosine} = -240 \cdot w \cdot d^4$$
$$R2 = -\frac{w}{4 \cdot d} \cdot R0 \qquad R2_{cosine} = -120 \cdot w \cdot d^4$$
$$R3 = \frac{w \cdot \left( w^2 \ldots + 2 \cdot d^2 \right)}{24 \cdot d^3} \cdot R0 \qquad R3_{cosine} = 20 \cdot w \cdot d^2 \cdot (w^2 + 2 \cdot d^2)$$
$$R4 = \frac{w \cdot \left( w^2 \ldots + 2 \cdot d^2 \right)}{48 \cdot d^3} \cdot R0 \qquad R4_{cosine} = 10 \cdot w \cdot d^2 \cdot (w^2 + 2 \cdot d^2)$$
$$R5 = \frac{-2 \cdot w^5 - 5 \cdot w^3 \cdot d^2 - 8 \cdot w \cdot d^4}{480 \cdot d^5} \cdot R0 \qquad R5_{cosine} = -w \cdot (2 \cdot w^4 + 5 \cdot w^2 \cdot d^2 + 8 \cdot d^4)$$

$480 \cdot d^5$

Example of Forward Finite Differences Mesh Levels

A table of forward, finite differences demonstrating sample voltage values for six register layers appears below. This table is a scalable example of finite difference voltage values. These values establish the physical separation between electrodes within each layer and the radial distances between register layers. Values at the top of the table are the voltage potentials to be applied to the zero points at six levels of a 16 point, single cycle electrode array.

| Addend | Augend |
|---|---|
|  | Sum |

The diagram at the above illustrates how to form the forward finite differences of the table. Pulses of the rectangular wave of the left-hand column are transformed by the FFD method into the cosine wave of the right-hand column. The tabled example shows one charge polarity on the first d points of register layer R0; the remaining d points are charged oppositely.

| Step # | R0 | R1 | R2 | R3 | R4 | R5 |
|---|---|---|---|---|---|---|
| 0 | 1.5 | −6.1 |  |  |  |  |
| 1 | 1.5 | −4.6 | −3.1 | 33.8 |  |  |
| 2 | 1.5 | −3.1 | −7.7 | 30.7 | 16.9 | −218.1 |
| 3 | 1.5 | −1.5 | −10.8 | 23.0 | 47.6 | −201.2 |
| 4 | 1.5 | 0.0 | −12.3 | 12.3 | 70.7 | −153.6 |
| 5 | 1.5 | 1.5 | −12.3 | 0.0 | 82.9 | −82.9 |
| 6 | 1.5 | 3.1 | −10.8 | −12.3 | 82.9 | 0.0 |
| 7 | 1.5 | 4.6 | −7.7 | −23.0 | 70.7 | 82.9 |
| 8 | −1.5 | 6.1 | −3.1 | −30.7 | 47.6 | 153.6 |
| 9 | −1.5 | 4.6 | 3.1 | −33.8 | 16.9 | 201.2 |
| 10 | −1.5 | 3.1 | 7.7 | −30.7 | −16.9 | 218.1 |
| 11 | −1.5 | 1.5 | 10.8 | −23.0 | −47.6 | 201.2 |
| 12 | −1.5 | 0.0 | 12.3 | −12.3 | −70.7 | 153.6 |
| 13 | −1.5 | −1.5 | 12.3 | 0.0 | −82.9 | 82.9 |
| 14 | −1.5 | −3.1 | 10.8 | 12.3 | −82.9 | 0.0 |
| 15 | −1.5 | −4.6 | 7.7 | 23.0 | −70.7 | −82.9 |
|  |  |  | 3.1 | 30.7 | −47.6 | −153.6 |
|  |  |  |  |  | −16.9 | −201.2 |

Acquiring and Using Discharge Products

Present ion collection mechanisms and methods produce discharge product consisting primarily of brine and chlorine. Expense of filtering is largely independent of the energy content of components being filtered, as demonstrated in separating uranium from pitchblende. This fact imparts economic value to the disposal of discharge products from this process. Two attributes of this method, not present in other methods, are ion speed and charge. Chemical unions with ions are delayed or disrupted by their exit speed. Presupposing that fast-moving, highly charged ions are emerging from both respective discharge ports, the ion disposal problem reduces to isolating both kinds of ions from chemically reacting with water.

It is proposed to direct both kinds of ions beyond their discharge ports, through an insulating layer (perhaps a petroleum product) into fibrous conductive, highly charged plates. Sodium, as the largest component of metallic ions in seawater, could be electroplated onto to a metallic anhydrous electrode. Carbon fibers, nanotubes, or porous carbon membranes could serve to isolate sodium from reacting with water. There is no upper limit to the quantity of accretion imposed by its conductivity. Charcoal is a form of carbon well-suited to retain chlorine gas and may act to retard a similar chemical reaction. Placing a high, attractive charge between these plates initiates mutual processes of electroplating at poles. Electroplating removes the charges from both kinds of ions. Both elements adhere to their receptors because of an external current source. Exit of speeding ions isolates them from their electrolyte medium. Both products aggregate until their concentrations presented economic opportunities for removal and subsequent use in a fuel cell.

How can ions be wrested from their charge paths through electrolyte, using magnetic forces? One way is to shift the phase of the current supply between electromagnetic and electrostatic networks. The following can be performed—to construct a trough containing two electromagnets, similar to those once found around old-fashioned video displays, mounted end to end, with an electret between them. The power requirement for the electret is a full wave sinusoidal pulse. The first pulse to the electret is to initiate current flow in a transverse direction to the magnetic poles. A second pulse wave, offset by a quarter cycle, is applied to the magnets. The second pulse is to modify the charge path direction through the magnets. The concept is to reduce salinity levels by directing ions of both polarities away from the center of the trough, letting electrical resistance measurements gauge salinity levels.

Figure 42:
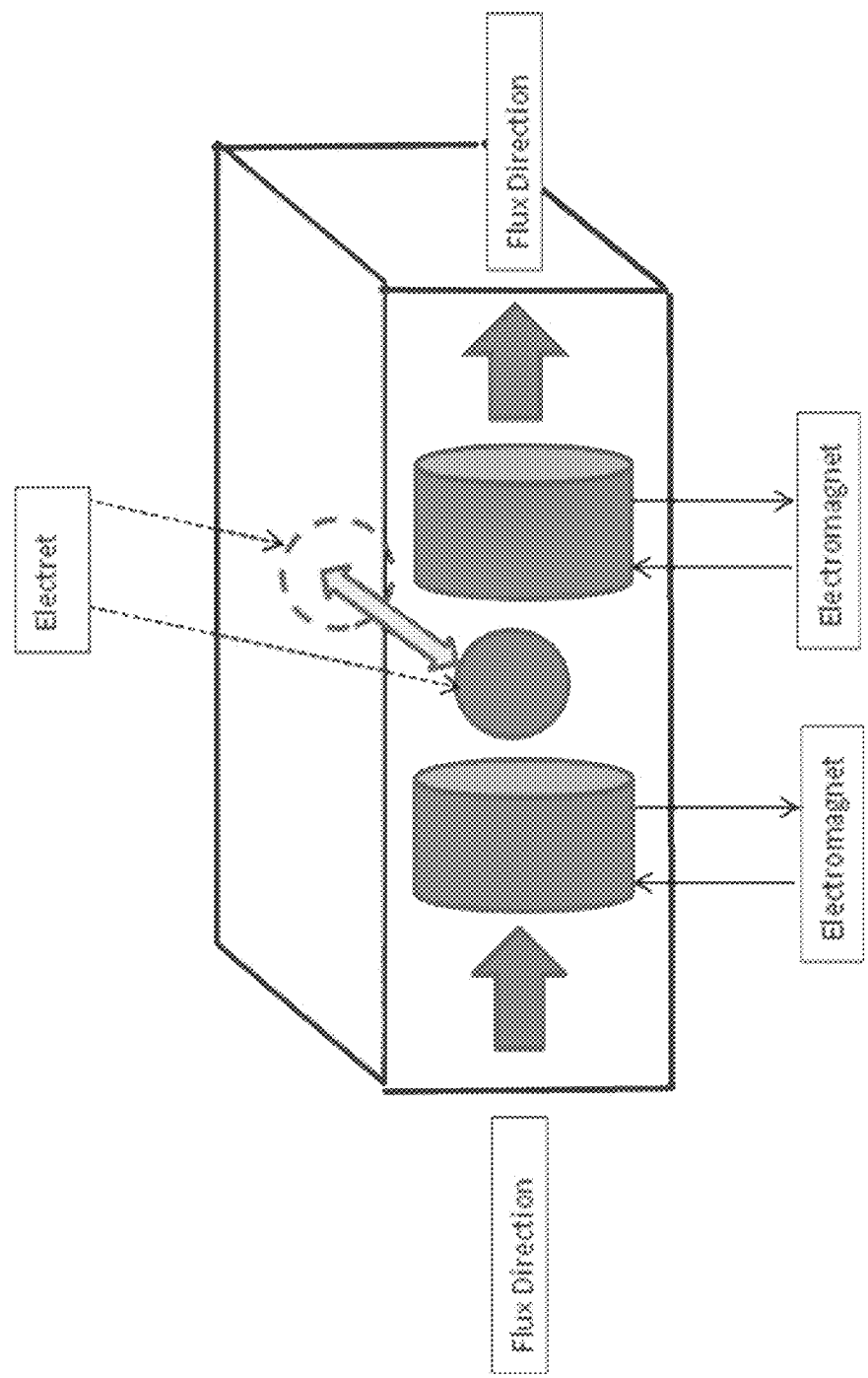
FIG. 42 illustrates a diagram of a proof of concept experiment in accordance with some embodiments.

The experiment relates ion particle movement with simple harmonic motion. Varying the frequency of the power pulses evaluates the resonant frequency. Dividing the power supply into electrode and electromagnetic power using capacitors instead of separate circuits is possible, once the resonant frequency has been detected. What relationship exists between that frequency and the volume of particles moved from center to circumference? A diagram of the proof of concept experiment is shown, in accordance with some embodiments, in FIG. 42.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. An ion gun comprising:
 a first electromagnet; and
 an electret disposed external to and at an end of the first electromagnet,
 wherein the first electromagnet defines a first inner compartment, and wherein the first electromagnet is configured to move ions through the first inner compartment and through the electret as the ion gun functions.

2. The ion gun of claim 1, further comprising a second electromagnet, wherein the electret is disposed between the first electromagnet and the second electromagnet.

3. The ion gun of claim 1, wherein the electret comprises multiple adjacent conductive materials that are oppositely polarized, and wherein the electret produces an electrostatic field when the ion gun functions.

4. The ion gun of claim 1, wherein the first electromagnet defines a first inner compartment, wherein the first electromagnet move ions through the first inner compartment and through the electret when the ion gun operates, wherein the ion gun further comprises a second electromagnet that defines a second inner compartment, wherein the electret is disposed between the first electromagnet and the second electromagnet, wherein the electret comprises multiple adjacent conductive materials that are oppositely polarized, and wherein the electret produces an electrostatic field as the ion gun functions.

5. An ion gun comprising:
a first electromagnet defining a first hollow core;
a second electromagnet defining a second hollow core; and
an electret comprising multiple conductors that run adjacent to each other and that have alternating polarities, wherein the electret is configured to provide an electrostatic field as the ion gun functions.

6. The ion gun of claim 5, wherein the first and second electromagnets each have their polarities aligned.

7. The ion gun of claim 6, wherein the polarity of the first electromagnet and the polarity of the second electromagnet cause ions of opposing polarities to travel in opposite directions through the ion gun as it functions.

8. An ion gun device comprising:
a first support structure comprising a first ion gun, a second ion gun, and a third ion gun, wherein:
the first ion gun comprises a first electromagnet, a second electromagnet, and a first electret, the first electret being disposed between the first and second electromagnets;
the second ion gun comprises a third electromagnet, a fourth electromagnet, and a second electret, the second electret being disposed between the third and fourth electromagnets; and
the third ion gun comprises a fifth electromagnet, a sixth electromagnet, and a third electret, the third electret being disposed between the fifth and sixth electromagnets.

9. The device of claim 8, wherein the first and second electromagnets have their polarities aligned, wherein the third and fourth electromagnets have their polarities aligned, and wherein the fifth and sixth electromagnets have their polarities aligned.

10. The device of claim 8, wherein the first support structure comprises a cubical structure having six sides.

11. The device of claim 10, wherein the first, the second, and the third ion guns are coupled to the first support structure to respectively point in a direction related to a height, a width, and a length of the first support structure.

12. The device of claim 10, wherein the first support structure comprises an impervious material that is configured to insulate the first, the second, and the third ion guns.

13. The device of claim 8, wherein the first support structure is coupled to a first piece of insulating material.

14. The device of claim 13, wherein a second support structure, which comprises a fourth ion gun, a fifth ion gun, and a sixth ion gun, is coupled to the first piece of insulating material.

15. The device of claim 14, wherein the first piece of insulating material is disposed within a second piece of insulating material, and wherein a third support structure comprising a seventh, an eighth, and a ninth ion gun is coupled to the second piece of insulating material.

16. The device of claim 14, wherein a collection of electromagnets of the first support structure and the second support structure are wired together in parallel.

17. The device of claim 14, wherein a collection of electrets of the first support structure and the second support structure are wired together in series.

18. The device of claim 15, wherein a collection of electromagnets of the first support structure, the second support structure, and the third support structure are wired together in parallel.

19. The device of claim 15, wherein a collection of electrets of the first support structure, the second support structure, and the third support structure are wired together in series.

* * * * *